United States Patent

Iida et al.

[11] Patent Number: 5,960,765
[45] Date of Patent: Oct. 5, 1999

[54] CONTROL DEVICE FOR CYLINDER-INJECTION AND SPARK-IGNITION TYPE INTERNAL COMBUSTION ENGINES

[75] Inventors: Kazumasa Iida; Katsuhiko Miyamoto; Masato Yoshida, all of Tokyo, Japan

[73] Assignee: Mitsubishi Jidosha Kogyo Kabushiki Kaisha, Tokyo, Japan

[21] Appl. No.: 08/765,924
[22] PCT Filed: May 15, 1996
[86] PCT No.: PCT/JP96/01285
  § 371 Date: Apr. 21, 1997
  § 102(e) Date: Apr. 21, 1997
[87] PCT Pub. No.: WO96/36802
  PCT Pub. Date: Nov. 21, 1996

[30] Foreign Application Priority Data

May 16, 1995 [JP] Japan .................................. 7-141231

[51] Int. Cl.$^6$ ............................................... F02B 17/00
[52] U.S. Cl. ...................................... 123/295; 123/305
[58] Field of Search ................................ 123/295, 305

[56] References Cited

U.S. PATENT DOCUMENTS

| | | | |
|---|---|---|---|
| 5,170,759 | 12/1992 | Ito ........................................... | 123/305 |
| 5,331,933 | 7/1994 | Matsushita ............................... | 123/295 |
| 5,333,583 | 8/1994 | Matsuura ................................. | 123/305 |
| 5,335,635 | 8/1994 | Kadoi et al. ............................. | 123/305 |
| 5,655,365 | 8/1997 | Worth et al. ............................. | 123/305 |
| 5,666,916 | 9/1997 | Fujieda et al. .......................... | 123/295 |
| 5,724,938 | 3/1998 | Yamada .................................. | 123/305 |

FOREIGN PATENT DOCUMENTS

| | | |
|---|---|---|
| 4241754 | 8/1992 | Japan . |
| 579370 | 3/1993 | Japan . |
| 6193539 | 7/1994 | Japan . |
| 7279729 | 10/1995 | Japan . |

Primary Examiner—Erick R. Solis

[57] ABSTRACT

A control apparatus that changes the fuel injection mode of a cylinder-injection spark-ignition internal combustion engine without causing a misfire or smoke, lowering the exhaust characteristics or fuel-efficiency, or bringing about a changeover shock provided. An electronic control unit (70) of the control apparatus sets a first-term injection mode for fuel injection in a suction stroke or a second-term injection mode for fuel injection in a compression stroke in accordance with the engine operation state, and sets the values of parameters, such as the fuel injection quantity, ignition timing, exhaust gas recirculation quantity, etc., which are concerned in the combustion state in the engine, at values suitable for the set injection mode, thereby controlling the engine operation. When a request for the change of the injection mode is made as the engine operation state is changed, the parameter values are changed from the values suitable for the injection mode before change into the values suitable for the injection mode after change at suitable timings.

29 Claims, 25 Drawing Sheets

FIG. 7

| Ne / θth | N₁ | N₂ | · · · · | Nj-1 | Nj |
|---|---|---|---|---|---|
| $\theta_1$ | Pe₁₁ | Pe₁₂ | · · · · | Pe₁j-1 | Pe₁j |
| $\theta_2$ | Pe₂₁ | Pe₂₂ | · · · · | Pe₂j-1 | Pe₂j |
| ⋮ | ⋮ | ⋮ | · · · · | ⋮ | ⋮ |
| θi-1 | θi-11 | θi-12 | · · · · | Pei-1j-1 | Pei-1j |
| θi | θi1 | θi2 | · · · · | Peij-1 | Peij |

FIG. 8

| Ne / Pb | N₁ | N₂ | · · · · | Nj |
|---|---|---|---|---|
| Pb₁ | Pe₁₁ | Pe₁₂ | · · · · | Pe₁j |
| ⋮ | ⋮ | ⋮ | · · · · | ⋮ |
| Pbi | Pei₁ | Pei₂ | · · · · | Peij |

FIG. 9

| Ne / Pe | $N_1$ | $N_2$ | · · · · | $N_j$ |
|---|---|---|---|---|
| $Pe_1$ | $Ev_{11}$ | $Ev_{12}$ | · · · · | $Ev_{1j}$ |
| ⋮ | ⋮ | ⋮ | · · · · | ⋮ |
| $Pe_i$ | $Ev_{i1}$ | $Ev_{i2}$ | · · · · | $Ev_{ij}$ |

FIG. 10

| Ne / Pb | $N_1$ | $N_2$ | · · · · | $N_j$ |
|---|---|---|---|---|
| $Pb_1$ | $Ev_{11}$ | $Ev_{12}$ | · · · · | $Ev_{1j}$ |
| ⋮ | ⋮ | ⋮ | · · · · | ⋮ |
| $Pb_i$ | $Ev_{i1}$ | $Ev_{i2}$ | · · · · | $Ev_{ij}$ |

| TYPE OF TRANSITION | SETUP |
|---|---|
| S-F/B TO SECOND-TERM LEAN | K1=0 |
| SECOND-TERM LEAN TO S-F/B | K2=0 |
| S-F/B TO FIRST-TERM LEAN | KS=0 |
| FIRST-TERM LEAN TO S-F/B | KL=0 |
| FIRST-TERM LEAN TO SECOND-TERM LEAN | K1=0 |
| SECOND-TERM LEAN TO FIRST-TERM LEAN | K2=0 |

CONTROL DEVICE FOR CYLINDER-INJECTION AND SPARK-IGNITION TYPE INTERNAL COMBUSTION ENGINES

TECHNICAL FIELD

The present invention relates to a control apparatus for controlling the output and the like of a cylinder-injection spark-ignition internal combustion engine mounted in an automobile or the like.

BACKGROUND ART

In order to reduce harmful gas components discharged from, fuel-injection spark-ignition internal combustion engines, which are mounted in automobiles and the like, or improve the fuel-efficiency of the engines, there have recently been proposed various engines of a cylinder-injection type (hereinafter referred to as cylinder-injection gasoline engines) in which the fuel is injected directly into the combustion chamber, in place of conventional manifold-injection engines.

A cylinder-injection gasoline engine is designed so that an air-fuel mixture with an air-fuel ratio close to the theoretical air-fuel ratio is fed locally into a space around a spark plug and a cavity in a piston, thereby enabling ignition with a generally fuel-lean air-fuel ratio. Accordingly, the deliveries of CO and HC are reduced, and the fuel-efficiency during idle operation or steady running of the engine is improved considerably. Moreover, the cylinder-injection gasoline engine can enjoy a much improved response to acceleration and deceleration, since it is free from a delay in fuel transportation through suction pipes in increasing or decreasing the fuel injection quantity. If the fuel injection quantity is increased so that the overall air-fuel ratio (or average air-fuel ratio) comes closer to the theoretical air-fuel ratio as the load increases, however, an excessively fuel-rich state is established in the vicinity of the spark plug, so that the so-called rich misfire takes place. Thus, it is difficult to keep the local air-fuel ratio in the vicinity of the spark plug at an optimum value throughout the entire engine operation region to maintain the stability of the engine operation.

In order to eliminate these drawbacks, a cylinder-injection engine is proposed in, for example, Jpn. Pat. Appln. KOKAI Publication No. 5-79370, which is arranged such that the fuel is injected with an appropriate timing depending on the engine load and that the configuration of the combustion chamber is designed to match such a fuel injection method. In this proposed engine, the injection mode is changed in accordance with the load, between a second-term injection mode for injecting the fuel in a compression stroke and a first-term injection mode for injecting the fuel in a suction stroke. Specifically, during low-load operation, the fuel is injected into the cavity in the final stage of the compression stroke, whereby the air-fuel mixture with the air-fuel ratio close to the theoretical air-fuel ratio is formed locally around the spark plug and in the cavity. As a result, ignition even with a generally lean air-fuel ratio is enabled, the deliveries of CO and HC are reduced, and the fuel-efficiency for idle operation or normal drive is improved considerably. During medium-load operation, the first-term injection mode is selected to inject the fuel into the cavity in the initial stage of the suction stroke, whereby the air-fuel mixture is collected in the cavity to stabilize the combustion. In this case, a relatively rich air-fuel mixture is formed around the spark plug by injecting a small quantity of fuel into the cavity in the latter half of the compression stroke, thereby further stabilizing the ignition and combustion. During high-load operation, on the other hand, the fuel is injected outside the cavity in the suction stroke so that an air-fuel mixture with a uniform air-fuel ratio is formed in the combustion chamber. As a result, the fuel can be burned in a quantity equal to that for manifold-injection gasoline engines, and a required engine output for starting-accelerating operation can be secured.

According to the proposed cylinder-injection gasoline engine described above, the overall air-fuel ratio can be set at a very large value in the secondterm injection mode. Accordingly, lean combustion for low-load operation, such as idling, can be enabled by supplying plenty of suction air through a passage bypassing a throttle valve or by recirculating exhaust gas (hereinafter referred to as EGR) in abundance, so that the deliveries of harmful gas components can be reduced, and the fuel-efficiency can be improved.

In setting the overall air-fuel ratio for the second-term injection mode at a very large value (e.g., 22 to 40) in order to improve the exhaust gas characteristics and fuel-efficiency, however, the value of the air-fuel ratio on the rich side of the engine operation region is restricted to about 20 to 22. If the overall air-fuel ratio is more fuel-rich than this limit value, a rich misfire or smoke may be caused. If an attempt is made to change the control mode from the second-term injection mode, which is subject to such a restrictive condition on the air-fuel ratio, into the first-term injection mode, in which uniform-mixture combustion best suited for acceleration is carried out, the air-fuel ratio changes discontinuously during the mode change, thereby causing a shock and ruining the drivability.

In changing the mode from the second-term injection mode, in which plenty of bypass air and EGR is introduced, into the first-term injection mode, moreover, it is necessary to control the bypass air quantity and EGR value, as well as the fuel injection quantity, injection timing, ignition timing, etc. Thus, it is very difficult smoothly to make all changes (transitions) between the modes in various engine operation states.

DISCLOSURE OF THE INVENTION

The object of the present invention is to provide a control apparatus for a cylinder-injection spark-ignition internal combustion engine, capable of changing the fuel injection mode between a first-term injection mode and a second-term injection mode without causing a misfire or smoke or lowering the exhaust gas characteristics or fuel-efficiency, thereby preventing a changeover shock.

In order to achieve the above object, according to the present invention, there is provided a control apparatus for a cylinder-injection spark-ignition internal combustion engine, in which a fuel is injected directly into the combustion chamber of the internal combustion engine. The control apparatus comprises: operation state detecting means for detecting the operation state of the internal combustion engine; injection mode setting means for setting a first injection mode for injecting the fuel mainly in a suction stroke or a second injection mode for injecting the fuel mainly in a compression stroke, in accordance with the result of detection by the operation state detecting means; combustion parameter setting means for setting the value of at least one of parameters that influence the combustion state in the combustion chamber at a value fit for the injection mode set by the injection mode setting means; combustion parameter changeover means for changing the parameter value from a parameter value before mode change suitable for the injection mode before change into a parameter value after mode change suitable for the injection mode after change when a request for an injection mode change is discriminated as the injection mode set by the injection mode setting means is changed over; and combustion state control means for controlling the combustion state of the internal combustion engine in accordance with the parameter value set by the combustion parameter setting means and changed by the combustion parameter changeover means in response to the injection mode change request.

Preferably, the parameters that influence the combustion state include a target air-fuel ratio correction factor, fuel injection end timing, fuel injection quantity, ignition timing, volumetric efficiency, and the quantity of exhaust gas recirculated in the suction system of the internal combustion engine.

According to the present invention, the values of one or more parameters concerned in combustion, such as the target air-fuel ratio correction factor, fuel injection end timing, fuel injection quantity, ignition timing, volumetric efficiency, and recirculated exhaust gas quantity, are changed from parameter values before mode change into parameter values after mode change when the injection mode change request is made as the engine operation state changes. By doing this, engine combustion state control suitable for the injection mode change can be properly effected irrespective of the kind of the injection mode change, so that a shock attributable to the injection mode change can be reduced or prevented. By carrying out fuel injection in the first injection mode, an air-fuel mixture with an optimum air-fuel ratio can be fed into the combustion chamber while preventing an excessively rich air-fuel mixture from being formed in the vicinity of a spark plug, so that a required engine output can be secured even in accelerative operation or medium- or high-load operation. By carrying out fuel injection in the second injection mode, moreover, the air-fuel mixture with the optimum air-fuel ratio can be supplied locally to the region close to the spark plug so that an air-fuel mixture which is, as a whole, extremely lean can be ignited. Thus, the exhaust gas characteristics and fuel-efficiency for low-load operation can be improved.

Preferably, in the present invention, the combustion parameter setting means, the combustion parameter changeover means, and the combustion state control means operate to establish a first air-fuel ratio state in the internal combustion engine when the first injection mode is set by the injection mode setting means. When the second injection mode is set by the injection mode setting means, moreover, the parameter setting means, the combustion parameter changeover means, and the combustion state control means operate to establish a second air-fuel ratio state, which is more fuel-lean than the first air-fuel ratio state, in the internal combustion engine.

According to this preferred arrangement, an optimum air-fuel mixture for the engine operation state can be supplied to the engine to increase the engine output by carrying out the fuel injection in the first injection mode. Also, a fuel-lean air-fuel mixture can be supplied to the engine to improve the exhaust gas characteristics and fuel-efficiency by carrying out the fuel injection in the second injection mode.

Further preferably, the first injection mode includes a first sub-injection mode. When the first sub-injection mode is set by the injection mode setting means, the combustion parameter setting means, the combustion parameter changeover means, and the combustion state control means operate to establish a theoretical air-fuel ratio state as the first air-fuel ratio state in the internal combustion engine.

According to this preferred arrangement, air-fuel ratio feedback control can be properly effected in accordance with the concentration of oxygen in the exhaust gas, for example.

Further preferably, the first injection mode includes a second sub-injection mode. When the second sub-injection mode is set, the combustion parameter setting means, the combustion parameter changeover means, and the combustion state control means operate to establish an air-fuel ratio state, as the first air-fuel ratio state, more fuel-lean than the theoretical air-fuel ratio state and more fuel-rich than the second air-fuel ratio state in the internal combustion engine.

According to this preferred arrangement, the air-fuel ratio state suitable for the engine operation state is established in the case where the engine operation state requires the engine output that cannot be obtained in the second injection mode, whereby the required engine output can be obtained to reduce a shock attributable to the change between the second injection mode and the second sub-injection mode and to improve the exhaust gas characteristics and fuel-efficiency.

Preferably, in the present invention, the combustion parameter changeover means changes the parameter value from the parameter value before mode change into the parameter value after mode change at a timing corresponding to the injection mode before change and the injection mode after change when the injection mode change request is discriminated.

According to this preferred arrangement, the parameter value can be changed at a timing suitable for the injection mode change irrespective of the kind of the injection mode change, so that the parameter value during the injection mode change can be rationalized, and a shock attributable to the injection mode change can be reduced or prevented.

Further preferably, the combustion parameter changeover means keeps the parameter value at the parameter value before mode change for a predetermined period when the injection mode change request is discriminated.

According to this preferred arrangement, a shock that may be produced when the parameter value is changed immediately in response to the injection mode change request can be prevented by restricting the parameter value change for a predetermined period (e.g., control dead period).

Further preferably, the combustion parameter changeover means suddenly changes the parameter value from the parameter value before mode change into the parameter value after mode change when the predetermined period is over.

According to this preferred arrangement, a delay in the parameter value change, and therefore, a delay in engine control response to the injection mode change request can be reduced while preventing a shock attributable to the parameter value change.

Alternatively, the combustion parameter changeover means suddenly changes the parameter value from the parameter value before mode change into an intermediate parameter value between the parameter value before mode change and the parameter value after mode change, and then gradually changes the parameter value from the intermediate parameter value toward the parameter value after mode change when the predetermined period is over. Further preferably, the combustion parameter changeover means gradually changes the parameter value from the parameter value before mode change toward an intermediate parameter value between the parameter value before mode change and the parameter value after mode change, and then suddenly changes the parameter value from the intermediate parameter value into the parameter value after mode change when the predetermined period is over.

Alternatively, the combustion parameter changeover means gradually changes the parameter value from the parameter value before mode change toward the parameter value after mode change when the predetermined period is over.

According to these preferred arrangements, the contradictory problems, the prevention of a shock attributable to the parameter value change and the prevention of a delay in responding to the injection mode change request, can be solved appropriately.

Preferably, according to the arrangement in which the parameter value is changed at the timing corresponding to the injection modes before and after change, the combustion parameter changeover means gradually changes the parameter value from the parameter value before mode change toward the parameter value after mode change when the injection mode change request is discriminated. Further preferably, the combustion parameter changeover means gradually changes the parameter value from the parameter value before mode change toward an intermediate parameter value between the parameter value before mode change and the parameter value after mode change, and then suddenly changes the parameter value from the intermediate parameter value into the parameter value after mode change when the injection mode change request is discriminated.

Preferably, according to the arrangement in which the parameter value is changed at the timing corresponding to the injection modes before and after change, the combustion parameter changeover means suddenly changes the parameter value from the parameter value before mode change into the parameter value after mode change when the injection mode change request is discriminated.

Also according to these preferred arrangements, the contradictory problems, the prevention of a shock attributable to the parameter value change and the prevention of a delay in responding to the injection mode change request, can be solved appropriately.

Preferably, in the present invention, the control apparatus comprises mode change discriminating means for discriminating the injection mode change request and the kind of the injection mode change in accordance with the changeover in the injection mode set by the injection mode setting means and discrimination flag setting means for setting a mode change discrimination flag indicative of the result of discrimination by the mode change discriminating means. The combustion parameter changeover means changes the parameter value before mode change over to the parameter value after mode change at a timing corresponding to the kind of the injection mode change indicated by the mode change discrimination flag set by the discrimination flag setting means.

According to this preferred arrangement, the parameter value can be changed at a timing suitable for the injection mode change irrespective of the kind of the injection mode change, so that a shock attributable to the injection mode change can be reduced or prevented.

Further preferably, the combustion parameter changeover means includes first correction factor setting means for setting a first correction factor associated with the change of the parameter value. The first correction factor is set at a first set value at the time of start of the injection mode change when the injection mode change request is discriminated by the mode change discriminating means, and is changed thereafter into a second set value at the time of completion of the injection mode change.

According to this preferred arrangement, the first correction factor is used as a control index for the parameter value change, whereby one or more parameter values can be rationalized during the parameter value change, so that a shock attributable to the injection mode change can be reduced.

Further preferably, the combustion parameter changeover means suddenly changes the parameter value from the parameter value before mode change into the parameter value after mode change when the first correction factor is changed from the first set value into the second set value.

According to this preferred arrangement, the parameter value can be changed immediately in response to the mode change request to ensure improved responsiveness in the case where it is appropriate to suddenly change the parameter value in response to the mode change request.

Alternatively, the combustion parameter changeover means gradually changes the value of a specific parameter, among other parameters that influence the combustion state, from a specific parameter value before mode change suitable for the injection mode before change toward a specific parameter value after mode change suitable for the injection mode after change at a predetermined changing rate when the first correction factor is changed from the first set value into the second set value.

According to this preferred arrangement, the value of the specific parameter (e.g., target air-fuel ratio correction factor) that greatly influences the combustion state can be rationalized during the mode change.

Alternatively, the combustion parameter changeover means includes parameter comparing and discriminating means for comparing the value of a specific parameter, among other parameters that influence the combustion state, with a preset reference value, and changes the parameter value from the parameter value before mode change into the parameter value after mode change in accordance with the result of discrimination by the parameter comparing and discriminating means.

According to this preferred arrangement, the values of one or more other parameters can be changed properly while watching the change of the specific parameter value. If a request is made for the change of the second injection mode over to the first injection mode, for example, the target air-fuel ratio correction factor value is caused to change until the target air-fuel ratio correction factor, i.e., the specific parameter, reaches a rich misfire limit value for the second injection mode, i.e., the reference value, whereby the engine output can be increased with good responsiveness to the mode change request. When the target air-fuel ratio correction factor value reaches the reference value, the target air-fuel ratio correction factor value and the values of one or more other parameters (e.g., ignition timing) can be changed into values fit for the injection mode after change, so that a shock attributable to the injection mode change can be prevented without failing to improve the engine output and other characteristics.

Further preferably, the combustion parameter changeover means keeps the parameter value at the. parameter value before mode change when it is concluded by the parameter comparing and discriminating means that the value of the specific parameter is not greater than the reference value, and suddenly changes the parameter value from the parameter value before mode change into the parameter value after mode change when it is concluded by the parameter comparing and discriminating means that the value of the specific parameter is greater than the reference value.

Alternatively, the combustion parameter changeover means keeps the parameter value at the parameter value before mode change when it is concluded by the parameter comparing and discriminating means that the value of the specific parameter is not greater than the reference value, and suddenly changes the parameter value from the parameter value before mode change into an intermediate value between the parameter value before mode change and the parameter value after mode change and then gradually changes the parameter value from the intermediate parameter value toward the parameter value after mode change when it is concluded by the parameter comparing and discriminating means that the value of the specific parameter is greater than the reference value.

Alternatively, the combustion parameter changeover means gradually changes the parameter value from the parameter value before mode change into the parameter value after mode change at a predetermined changing rate as the first correction factor changes when it is concluded by the parameter comparing and discriminating means that the value of the specific parameter does not reach the reference value while the first correction factor changes from the first set value into the second set value, and suddenly changes the parameter value from an intermediate value, varying between the parameter value before mode change and the parameter value after mode change, into the parameter value after mode change when it is concluded by the parameter comparing and discriminating means that the value of the specific parameter reaches the reference value.

According to these preferred arrangements, the values of one or more other parameters than the specific parameter can be changed with proper timings without failing to prevent a shock when the values of the one or more other parameters than the specific parameter are suddenly changed, so that the characteristics of the engine, such as the exhaust characteristics, fuel-efficiency, etc., can be improved without failing to obtain the required engine output.

Alternatively, the combustion parameter changeover means includes second correction factor setting means for setting a second correction factor represented as a function of the first correction factor, and sets the second correction factor at a third set value at the time of start of the injection mode change after the discrimination of the injection mode change request while gradually changing the value of the specific parameter from a specific parameter value before mode change suitable for the injection mode before change toward a specific parameter value after mode change suitable for the injection mode after change at a predetermined changing rate when the injection mode change request is discriminated by the mode change discriminating means, and then changes the second correction factor from the third set value into a fourth set value at the time of completion of the injection mode change.

According to this preferred arrangement, the values of one or more parameters other than the specific parameter and associated with the first and second correction factors can be changed during the change of the value of the specific parameter, so that the injection mode can be smoothly changed without ruining the characteristics of the engine. If a request is made for the change of the second injection mode over to the first injection mode, for example, the value of the target air-fuel ratio correction factor value, i.e., the specific parameter, is changed so that the engine output can be increased with good responsiveness to the mode change request. At the same time, the engine output can be properly adjusted by changing the other parameter values (e.g., by retarding the ignition timing) in conformity with the change of the specific parameter value, so that a shock attributable to the injection mode change can be prevented without failing to obtain the required engine output.

Alternatively, the specific parameter includes at least a target air-fuel ratio correction factor. The combustion parameter changeover means includes tentative target air-fuel ratio correction factor setting means for setting the value of a tentative target air-fuel ratio correction factor used to obtain the target air-fuel ratio correction factor, and changes the value of the target air-fuel ratio correction factor from a correction factor value fit for the injection mode before change into a correction factor value fit for the injection mode after change in accordance with the result of comparison between the value of the tentative target air-fuel ratio correction factor and the reference value by the parameter comparing and discriminating means.

According to this preferred arrangement, the injection mode can be smoothly changed by changing the value of the target air-fuel ratio correction factor, i.e., the specific parameter, at a proper timing.

Further preferably, the combustion parameter changeover means replaces the value of the target air-fuel ratio correction factor with the value of the tentative target air-fuel ratio correction factor when it is concluded by the parameter comparing and discriminating means that the value of the tentative air-fuel ratio correction factor is not greater than the reference value while the value of the tentative target air-fuel ratio correction factor is gradually changed from a second air-fuel ratio correction factor value fit for the second injection mode toward a first air-fuel ratio correction factor value fit for the first injection mode as the first correction factor changes, in the case where a first mode change state flag indicative of a request for the injection mode change from the second injection mode into the first injection mode discriminated by the mode change discriminating means is set by the discrimination flag setting means, and suddenly changes the value of the target air-fuel ratio correction factor from an intermediate air-fuel ratio correction factor value between the second and first air-fuel ratio correction factor values into the first air-fuel ratio correction factor value when it is concluded that the tentative air-fuel ratio correction factor exceeds the reference value.

According to this preferred arrangement, the tentative air-fuel ratio correction factor value smaller than the reference value (e.g., rich misfire limit value for the second injection mode) is used as the target air-fuel ratio correction factor value if a request is made for the change of the second injection mode over to the first injection mode. By doing this, the engine output can be increased with good responsiveness to this mode change request which requires the engine output increase. Moreover, the target air-fuel ratio correction factor value can be substantially changed when the tentative air-fuel ratio correction factor value reaches the reference value, so that a shock attributable to the injection mode change can be prevented without failing to obtain the required engine output.

Further preferably, the parameters include a fuel injection end timing and an ignition timing. When it is concluded by the parameter comparing and discriminating means that the value of the tentative air-fuel ratio correction factor is not greater than the reference value, the combustion parameter changeover means keeps the respective values of the fuel injection end timing and ignition timing at a second injection end timing value and a second ignition timing value, respectively, suitable for the second injection mode. When it is concluded that the reference value is exceeded by the value of the tentative air-fuel ratio correction factor, moreover, the combustion parameter changeover means suddenly changes the fuel injection end timing from the second fuel injection end timing value into a first fuel injection end timing value suitable for the first injection mode, and suddenly changes the value of the ignition timing into an intermediate ignition timing value between the second ignition timing value and a first ignition timing value suitable for the first injection mode and further gradually changes the ignition timing value from the intermediate ignition timing value toward the first ignition timing value as the first correction factor changes.

According to this preferred arrangement, the fuel injection end timing value and the ignition timing value can be changed at proper timings during the change of the target air-fuel ratio correction factor value, so that occurrence of a misfire or smoke can be prevented without failing to carry out the injection mode change smoothly.

Preferably, in the arrangement in which the target air-fuel ratio correction factor value is changed in accordance with the result of comparison between the value of the tentative target air-fuel ratio correction factor and the reference value, the combustion parameter changeover means keeps the target air-fuel ratio correction factor at a first air-fuel ratio correction factor value suitable for the first injection mode when it is concluded by the parameter comparing and discriminating means that the tentative air-fuel ratio correction factor exceeds the reference value while the value of the tentative air-fuel ratio correction factor is gradually changed from the intermediate air-fuel ratio correction factor value toward a second air-fuel ratio correction factor value fit for the second injection mode as the first correction factor changes, in the case where a second mode change state flag indicative of a request for the injection mode change from the first injection mode into the second injection mode discriminated by the mode change discriminating means is set by the discrimination flag setting means. The combustion parameter changeover means suddenly changes the target air-fuel ratio correction factor from the first air-fuel ratio correction factor value into the intermediate air-fuel ratio correction factor value between the first air-fuel ratio value and the second air-fuel ratio correction factor value suitable for the second injection mode and then replaces the value of the target air-fuel ratio correction factor with the tentative target air-fuel ratio correction factor when it is concluded that the value of the tentative air-fuel ratio correction factor is not greater than the reference value.

According to this preferred arrangement, the injection mode change can be carried out smoothly by changing the value of the target air-fuel ratio correction factor from the value suitable for the first injection mode into the value suitable for the second injection mode at a proper timing if a request is made for the change of the first injection mode over to the second injection mode.

Further preferably, the combustion parameters include a fuel injection end timing and an ignition timing. When it is concluded by the parameter comparing and discriminating means that the tentative air-fuel ratio correction factor exceeds the reference value, the combustion parameter changeover means keeps the value of the fuel injection end timing at the first injection end timing value suitable for the first injection mode and gradually changes the ignition timing from the first ignition timing value suitable for the first injection mode toward the second ignition timing value suitable for the second injection mode as the first correction factor changes. When it is concluded that the tentative air-fuel ratio correction factor is not greater than the reference value, furthermore, the combustion parameter changeover means suddenly changes the fuel injection end timing from the first fuel injection end timing value into the second fuel injection end timing value suitable for the second injection mode and suddenly changes the ignition timing from an intermediate ignition timing value between the first ignition timing value and the second ignition timing value into the second ignition timing value.

According to this preferred arrangement, the injection mode change can be carried out smoothly by changing the respective values of the fuel injection end timing and the ignition timing to be suitable for the change of the target air-fuel ratio correction factor value if a request is made for the change of the first injection mode over to the second injection mode.

BRIEF DESCRIPTION OF THE DRAWINGS

FIG. 7 is a diagram showing an outline of a target average effective pressure calculation map 70c of FIG. 6 and illustrating the target average effective pressure Pe calculated in accordance with a valve opening θth of a throttle valve 28 and the engine speed Ne;

FIG. 8 is a diagram showing an outline of a target average effective pressure calculation map 70r of FIG. 6 and illustrating the target average effective pressure Pe calculated in accordance with a suction pipe pressure Pb and the engine speed Ne;

FIG. 9 is a diagram showing an arrangement of a map used to calculate a volumetric efficiency Ev in accordance with the target average effective pressure Pe and the engine speed Ne during first-term injection mode control;

FIG. 10 is a diagram showing an arrangement of a map used to calculate the volumetric efficiency Ev in accordance with the suction pipe pressure Pb and the engine speed Ne during second-term injection mode control;

BEST MODE OF CARRYING OUT THE INVENTION

A cylinder-injection spark-ignition internal combustion engine and a control apparatus, attached to the engine, according to one embodiment of the present invention will now be described in detail with reference to the accompanying drawings.

Figure 1:
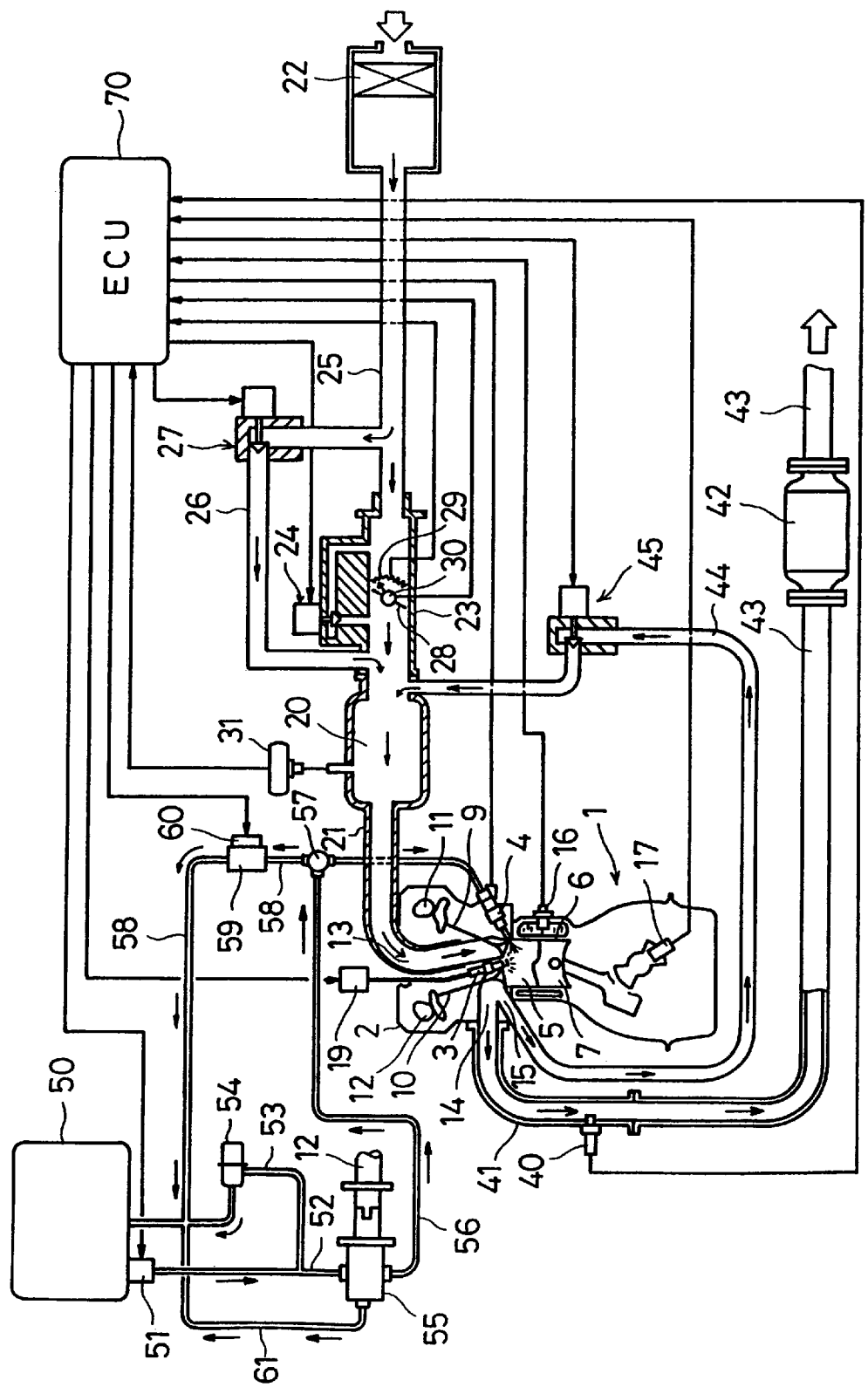
FIG. 1 is a schematic view showing one embodiment of an engine control apparatus according to the present invention.
Figure 2:
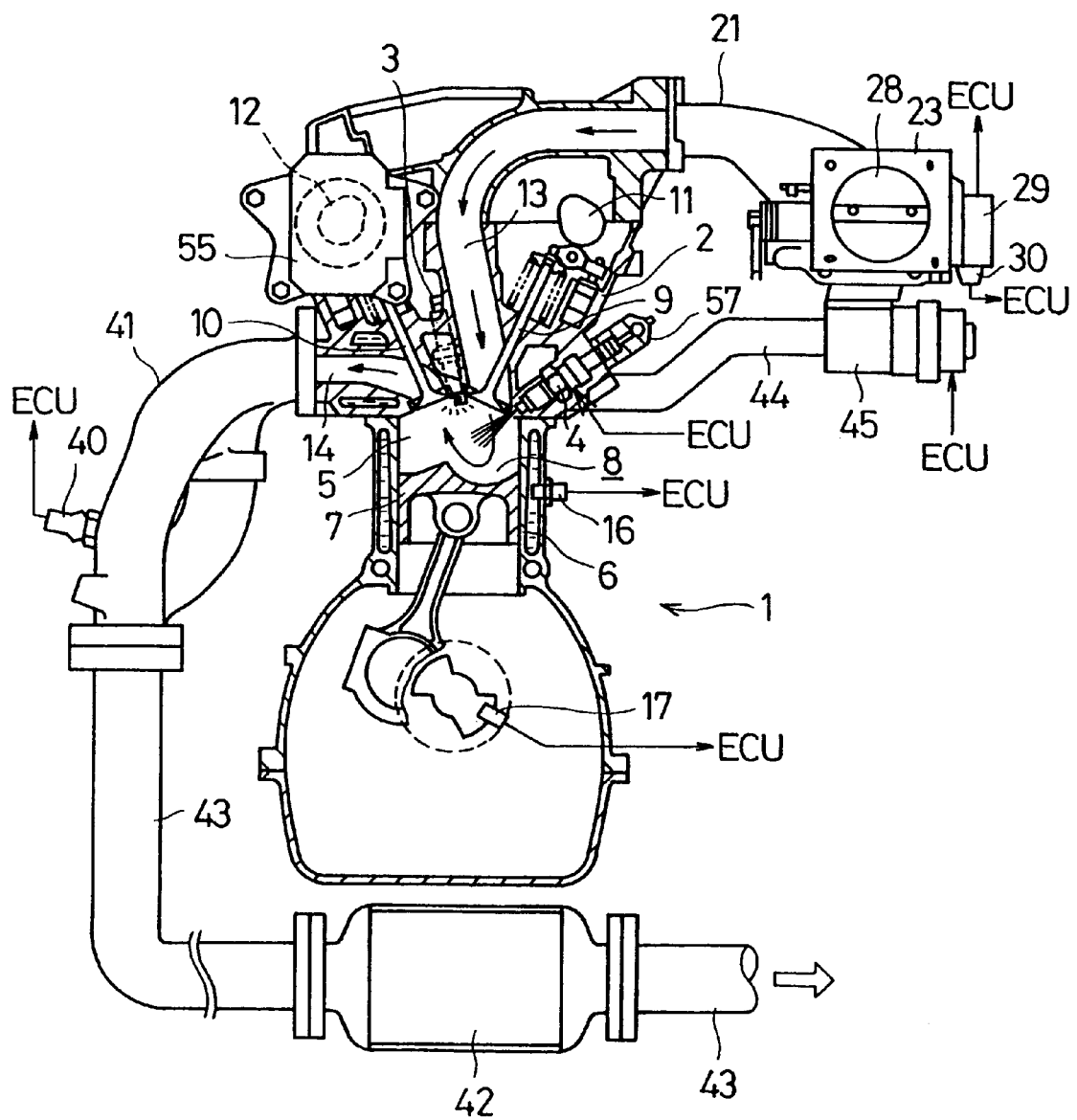
FIG. 2 is a vertical sectional view of a cylinder-injection gasoline engine according to the embodiment.

In FIGS. 1 and 2, reference numeral 1 denotes a straight-type cylinder-injection four-cylinder gasoline engine (hereinafter referred to simply as engine) for automobile, whose combustion chamber, suction system, EGR system, etc. are designed exclusively for cylinder injection.

In the present embodiment, a cylinder head 2 of the engine 1 is suitableted with a solenoid-operated fuel injection valve 4, as well as a spark plug 3, for each cylinder, so that a fuel is injected directly into a combustion chamber 5. Also, a hemispherical cavity 8 is formed in the top face of a piston 7, which reciprocates by sliding in a cylinder 6, in a position close to the top dead center that is reached by a fuel spray from the fuel injection valve 4 (FIG. 2). The theoretical compression ratio of this engine 1 is set to be higher (about 12 according to the present embodiment) than that of a manifold-injection type. A DOHC four-valve system is used as a valve driving mechanism. A suction-side camshaft 11 and an exhaust-side camshaft 12 are rotatably held in the upper portion of the cylinder head 2, in order to drive a suction valve 9 and an exhaust valve 10, respectively.

The cylinder head 2 is formed with suction ports 13, which extend substantially upright between the two camshafts 11 and 12, so that suction air currents having passed through the suction ports 13 generate reverse tumbling flows, which will be mentioned later, in the combustion chamber 5. An exhaust port 14, like that of a conventional engine, extends substantially in the horizontal direction, while a large-diameter EGR port 15 (not shown in FIG. 2) diverges diagonally from the port 14. In the drawings, 16 denotes a water temperature sensor for detecting a cooling water temperature TW, 17 denotes a crank angle sensor that outputs a crank angle signal SGT in predetermined crank positions (5° BTDC and 75° BTDC according to the present embodiment) for each cylinder, and 19 denotes an ignition coil that delivers high voltage to the spark plug 3. Each camshaft, which rotates at half the speed of a crankshaft, is suitableted with a cylinder discriminating sensor (not shown), which outputs a cylinder discriminating signal SGC, whereby the cylinder for which the crank angle signal SGT is outputted is discriminated.

The suction ports 13 are connected with a suction pipe 25, which is provided with an air cleaner 22, a throttle body 23, and an ISCV (idle speed control valve) 24 of a stepper-motor type, through a suction manifold 21 having a surge tank 20. Further, the suction pipe 25 is connected in parallel with a large-diameter air bypass pipe 26 through which suction air is introduced into the suction manifold 21, bypassing the throttle body 23, and this pipe 26 is provided with a large-sized ABV (air bypass valve) 27 of a linear-solenoid type. The air bypass pipe 26 has a flow area substantially equal to that of the suction pipe 25, so that a required quantity of suction air for a low or medium speed region of the engine 1 can flow through the pipe 26 when the ABV 27 is fully open. On the other hand, the ISCV 24 has a flow area smaller than that of the ABV 27, and is used when accurately adjusting the suction rate.

The throttle body 23 is provided with a butterfly-type throttle valve 28 for opening and closing the passage, a throttle sensor 29 for detecting an opening θTH of the valve 28 and an idle switch 30 for detecting a fully-closed state of the throttle valve. In the drawing, 31 denotes a boost pressure (MAP: manifold absolute pressure) sensor for detecting a suction pipe pressure Pb, which is connected to the surge tank 20.

The exhaust port 14 is connected with an exhaust pipe 43, which is provided with a three-way catalyst 42, muffler (not shown), etc., through an exhaust manifold 41, which is suitableted with an $O_2$ sensor 40. Also, the EGR port 15 is connected to the downstream side of the throttle valve 28 and the upstream side of the suction manifold 21 through a large-diameter EGR pipe 44 whose line is provided with an EGR valve 45 of a stepper-motor type.

A fuel tank 50 is set in the rear portion of a vehicle body (not shown). The fuel stored in the fuel tank 50 is sucked up by means of a motor-operated low-pressure fuel pump 51, and supplied to the engine 1 through a low-pressure feed pipe 52. The fuel pressure in the feed pipe 52 is adjusted to a relatively low pressure (3.0 kg/mm² according to the present embodiment; hereinafter referred to as low fuel pressure) by means of a first fuel pressure regulator 54, which is inserted in a return pipe 53. The fuel supplied toward the engine 1 is fed into each fuel injection valve 4 through a high-pressure feed pipe 56 and a delivery pipe 57 by means of a high-pressure fuel pump 55, which is attached to the cylinder head 2. In the case of the present embodiment, the high-pressure fuel pump 55 is of a swash-plate axial-piston type, and is driven by the exhaust-side camshaft 12. The pump 55 produces a discharge pressure of 50 kg/mm² or more even when the engine 1 is in idle operation. The fuel pressure in the delivery pipe 57 is adjusted to a relatively high pressure (50 kg/mm² according to the present embodiment; hereinafter referred to as high fuel pressure) by means of a second fuel pressure regulator 59, which is inserted in a return pipe 58. In the drawing, 60 denotes a motor-operated fuel pressure selector valve, attached to the second fuel pressure regulator 59, and relieves the fuel to lower the fuel pressure in the delivery pipe 57 to a predetermined level (e.g., 3.0 kg/mm²) when it is on. Further, 61 denotes a return pipe through which the fuel is returned to the fuel tank 50 after it is used to lubricate or cool the high-pressure fuel pump 55.

An ECU (electronic control unit) 70 is placed in a cabin of the vehicle. The ECU 70 is furnished with an input-output unit, storage unit (ROM, RAM, nonvolatile RAM, etc.) used to store control programs, control maps, etc., central processing unit (CPU), timer counter, etc., which are not shown, and carries out general control of the engine 1.

The input side of the ECU 70 is connected with switches, such as, an air conditioner switch (A/C.SW) 33, power steering switch (P/S.SW) 34, inhibitor switch (INH.SW) 35, etc. (see FIG. 6), which serve to detect the operating conditions of an air conditioner, power steering system, automatic speed change gear, etc., which constitute loads on the engine 1 when actuated, and supply detection signals to the ECU 70. Besides the sensors and switches described above, many other switches and sensors (not shown) are connected to the input side of the ECU 70, and various warning lamps and devices are connected also to the output side.

In response to input signals from the aforesaid various sensors and switches, the ECU 70 determines fuel injection mode, fuel injection quantity, ignition timing, EGR gas introduction rate, etc., and drivingly controls the fuel injection valve 4, ignition coil 19, EGR valve 45, etc.

As will be evident from the following description, the ECU 70, singly or in conjunction with its corresponding ones of the aforesaid various elements, functions as operation state detecting means, injection mode setting means, combustion parameter setting means, combustion parameter changeover means, combustion state control means, mode change discriminating means, decision flag setting means, first correction factor setting means, parameter comparing-discriminating means, second correction factor setting means, and tentative target air-fuel ratio correction factor setting means.

The basic flow of engine control will now be described in brief.

If a vehicle driver turns on the ignition key when the engine is cold, the ECU 70 switches on the low-pressure fuel pump 51 and the fuel pressure selector valve 60, whereupon the fuel injection valves 4 are supplied with the fuel at low fuel pressure. The low fuel pressure is necessary because when the engine 1 is nonoperating or being cranked, the high-pressure fuel pump 55 does not operate at all or operates only imperfectly, so that the fuel injection quantity must inevitably be determined in accordance with the discharge pressure of the low-pressure fuel pump 51 and the valve-opening time of each fuel injection valve 4. When the driver then turns the ignition key to start operation of the engine 1, the engine 1 is cranked by a self starter (not shown), and at the same time, fuel injection control by the ECU 70 is initiated. At this point in time, the ECU 70 selects a first-term injection mode (first injection mode), whereupon the fuel is injected such that the air-fuel ratio is relatively rich. This mode is selected because a misfire or discharge of unburned fuel (HC) is unavoidable if the fuel is injected in a second-term injection mode (i.e., compression stroke), since the vaporization rate of the fuel is low when the engine is cold. Since the ECU 70 closes the ABV 27 at the time of starting the engine, moreover, the suction air is fed into the combustion chamber 5 through a gap of the throttle valve 28 or the ISCV 24. The ISCV 24 and the ABV 27 are controlled unitarily by the ECU 70, and their respective openings are settled depending on the required introduction rate of the suction air (bypass air) that bypasses the throttle valve 28.

When the engine 1 starts idle operation after the starting is completed, the high-pressure fuel pump 55 initiates a rated discharge operation, so that the ECU 70 turns off the fuel pressure selector valve 60, and supplies the fuel at high fuel pressure to the fuel injection valve 4. Naturally, in doing this, the fuel injection quantity is determined in accordance with the high fuel pressure and the valve-opening time of the fuel injection valve 4. Until the cooling water temperature TW reaches a predetermined value, the ECU 70 selects the first-term injection mode to inject the fuel, and the ABV 27 continues to be closed, just as at the time of the starting. The idle speed control that is based on the variation of the loads of the auxiliaries, such as the air conditioner, is carried out by means of the ISCV 24 (ABV 27 is also opened as required), as in the case of the manifold-injection type. When the $O_2$ sensor 40 reaches an active temperature after the execution of predetermined cycles, moreover, the ECU 70 starts air-fuel ratio feedback control in accordance with the output voltage of the $O_2$ sensor 40, and causes the three-way catalyst 42 to remove harmful exhaust gas components. Thus, when the engine is cold, fuel injection control is effected substantially in the same manner as in the case of the manifold-injection engine. Since no fuel drops adhere to the wall surface of the suction pipe 25, however, the response and accuracy of control are high.

Figure 3:
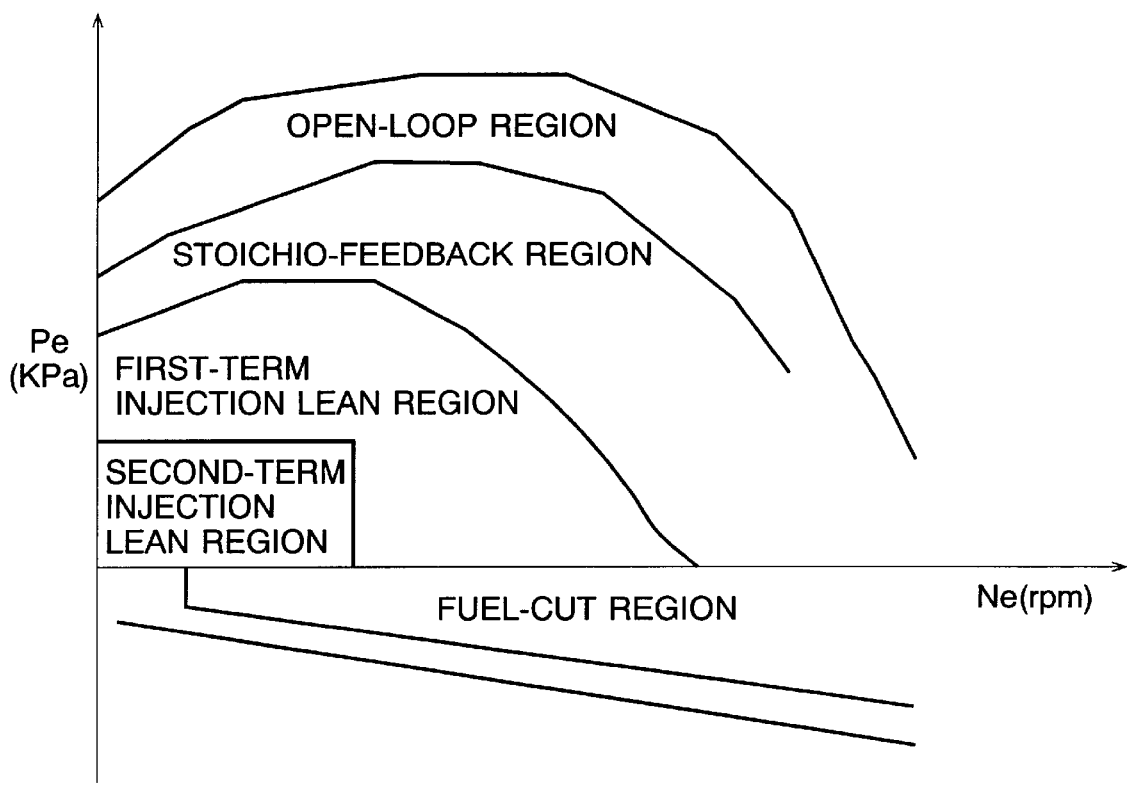
FIG. 3 is a fuel injection control map according to the embodiment, prescribed on the basis of an average effective engine cylinder pressure Pe and engine speed Ne and showing a second-term injection lean operation region, first-term injection lean operation region, first-term injection stoichio-feedback operation region, etc.

When the engine 1 has warmed up, the ECU 70 retrieves a present fuel injection control region from the fuel injection control map of FIG. 3 in accordance with an effective cylinder pressure (target average effective pressure) Pe, which is obtained from the suction pipe pressure Pb, throttle opening θTH, etc., and an engine speed Ne, determines the fuel injection mode and the fuel injection quantity, and drives the fuel injection valve 4. Besides, the ECU 70 carries out valve opening control for the ABV 27 and the EGR valve 45 and the like.

Figure 4:
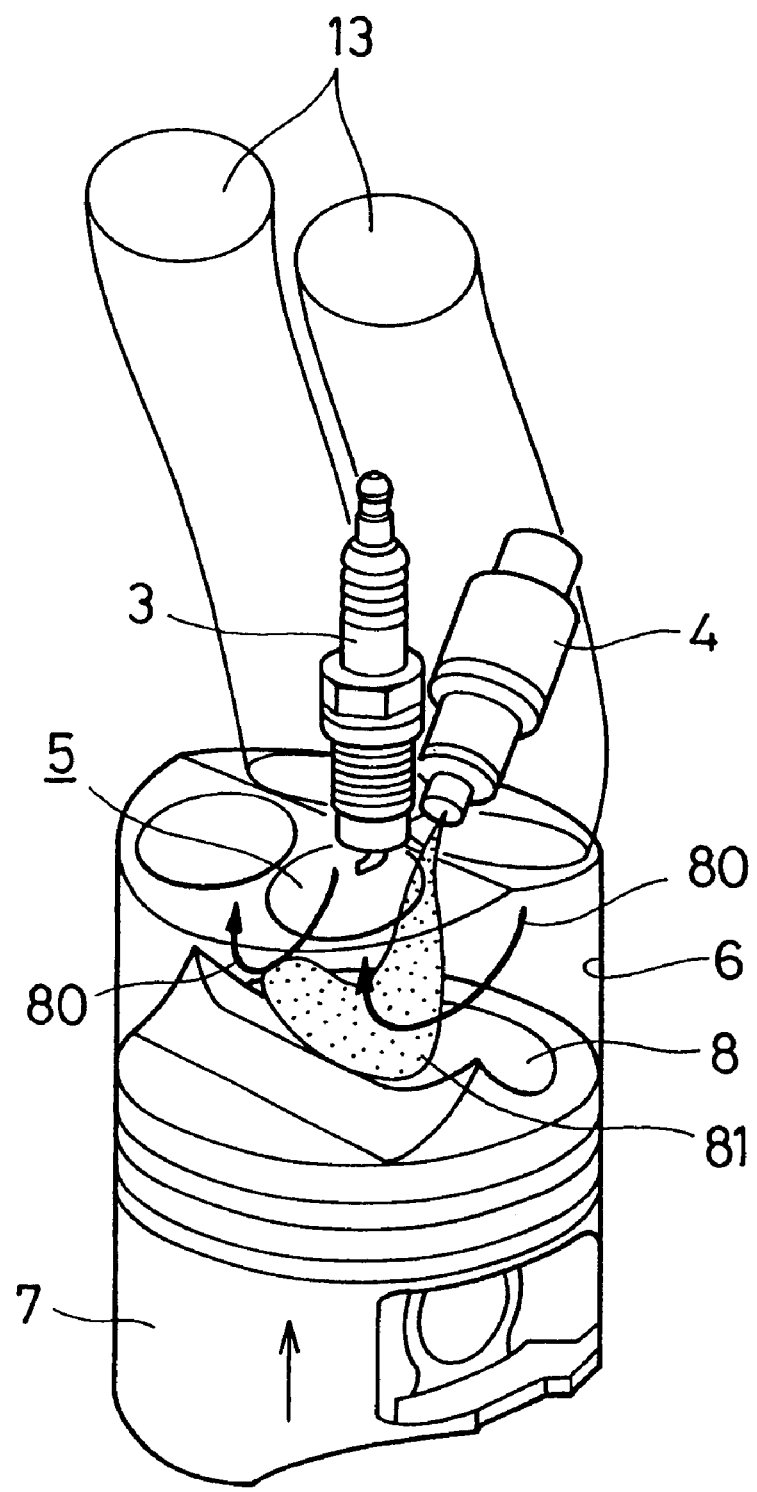
FIG. 4 is a view illustrating the way of fuel injection in a second-term injection mode according to the embodiment.

When the engine is running under low-load, low-speed operation, such as idle operation, the engine load is lower than a predetermined load (injection mode setting load) represented by a horizontal boundary line between first-term and second-term injection lean regions shown in FIG. 3. Therefore, engine 1 is operated in the second-term injection lean region. Accordingly, the ECU 70 selects the secondterm injection mode (also referred to as second-term lean mode), causes the ABV 27 and the EGR valve 40 to open, depending on the operation state of the engine, and injects the fuel so that the air-fuel ratio is lean (about 20 to 40 according to the present embodiment). At this point in time, the vaporization rate of the fuel increases, and the suction air currents introduced through the suction ports 13 generate reverse tumbling flows 80, as indicated by arrows in FIG. 4, so that a fuel spray 81 is kept in the cavity 8 of the piston 7. As a result, an air-fuel mixture of an air-fuel ratio close to the theoretical air-fuel ratio is formed around the spark plug 3 at the time of ignition, so that the fuel is ignited can even with a very lean overall air-fuel ratio (e.g., overall air-fuel ratio of about 40). Thus, discharge of CO and HC is reduced to very small quantities, and the delivery of NOx can be also reduced to a low level by a recirculation of the exhaust gas. Since a pumping loss is reduced by opening the ABV 27 and the EGR valve 40, moreover, the fuel-efficiency is improved considerably. The control of the idle speed, which corresponds to the variation of the load, is carried out by increasing or decreasing the fuel injection quantity, so that the control response is very high.

In the second-term injection mode, the fuel spray injected from the fuel injection valve 4 must reach the spark plug 3, borne by the aforesaid reverse tumbling flows, and the fuel must have evaporated to form an easily ignitable air-fuel mixture before the time of ignition after the arrival. If the average air-fuel ratio is 20 or below, a locally overrich air-fuel mixture is formed near the spark plug 3, thereby causing a so-called rich misfire. If the average air-fuel ratio is 40 or above, on the other hand, the lean limit is exceeded, so that a misfire (so-called lean misfire) also takes place. Thus, the beginning and ending timings for fuel injection are accurately controlled, and the average air-fuel ratio is set within the range of 20 to 40. If this range is exceeded, the mode is changed into the first-term injection mode (mentioned later) or the like.

In a low- or medium-speed drive mode, the engine is operated in the first-term injection lean region or a stoichio-feedback region (theoretical air-fuel ratio feedback control region, also referred to as S-F/B region) shown in FIG. 3, depending on the load state and the engine speed Ne, so that the ECU 70 selects a first-term lean mode or S-F/B mode (these two modes and an open-loop control mode, which will be mentioned later, are referred to generically as first-term injection mode), and injects the fuel to obtain a predetermined air-fuel ratio.

Figure 5:
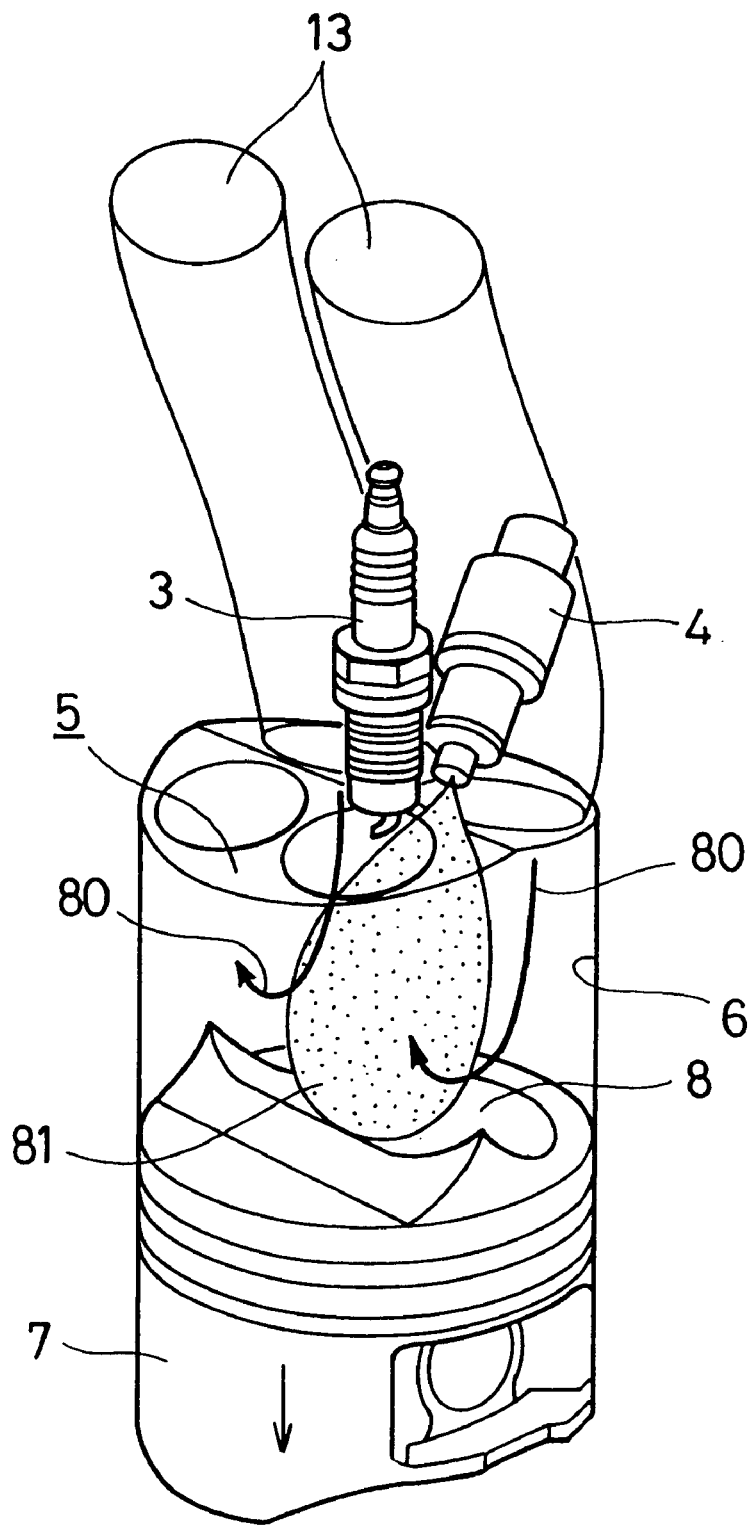
FIG. 5 is a view illustrating the way of fuel injection in a first-term injection mode according to the embodiment.

More specifically, the opening of the ABV 27 and the fuel injection quantity are controlled to obtain a relatively lean air-fuel ratio (about 20 to 23 according to the present embodiment) in the first-term lean mode. In the S-F/B mode, the ABV 27 and the EGR valve 45 are subjected to open-close control, and the air-fuel ratio feedback control is carried out in accordance with the output voltage of the O$_2$ sensor 40. Also in this case, the suction air currents introduced through the suction ports 13 form the reverse tumbling flows 80, as shown in FIG. 5. Even in the first-term injection lean region, therefore, the fuel can be ignited with a lean air-fuel ratio, due to a turbulence effect attributable to reverse tumbling, by adjusting the fuel injection beginning or end timing. Even in the first-term injection lean region, moreover, the ECU 70 opens the EGR valve 45 to introduce a suitable quantity of EGR gas into the combustion chamber 5, thereby greatly reducing the quantity of NOx generated with a lean air-fuel ratio. In the S-F/B region, a high output can be obtained with a relatively high compression ratio, and the harmful exhaust gas components can be removed by means of the three-way catalyst 42.

In a sudden acceleration mode or high-speed drive mode, an open-loop control region shown in FIG. 3 is reached, so that the ECU 70 selects the first-term injection mode, closes the ABV 27, and injects the fuel to obtain a relatively rich air-fuel ratio in accordance with the throttle opening θTH, the engine speed Ne, etc. In doing this, a high output can be obtained due to the effect of inertia, since the suction ports 13 extend substantially upright from the combustion chamber 5, as well as due to the high compression ratio and the reverse tumbling flows 80 formed by the suction air currents.

Since a fuel-cut region shown in FIG. 3 is reached when the vehicle is coasting in a medium- or high-speed drive mode, moreover, the ECU 70 stops the fuel injection entirely. Thereupon, the fuel-efficiency is improved, and the delivery of the harmful exhaust gas components is reduced. Fuel-cut operation is suspended immediately when the engine speed Ne falls below the return speed or when the driver steps on the accelerator pedal.

In relation to the present invention, the following is a description of setting procedures for parameter values, i.e., valve-opening time Tinj of the fuel injection valve 4, ignition timing Tig, valve opening value Legr of the EGR valve 45, etc., which influence the state of combustion in the engine combustion chamber set in accordance with target average effective pressure information, and control procedures for mode changes between the second-term lean mode and the S-F/B mode, between the first-term lean mode and the S-F/B mode, and between the first-term lean mode and the second-term lean mode, for example.

Figure 6:
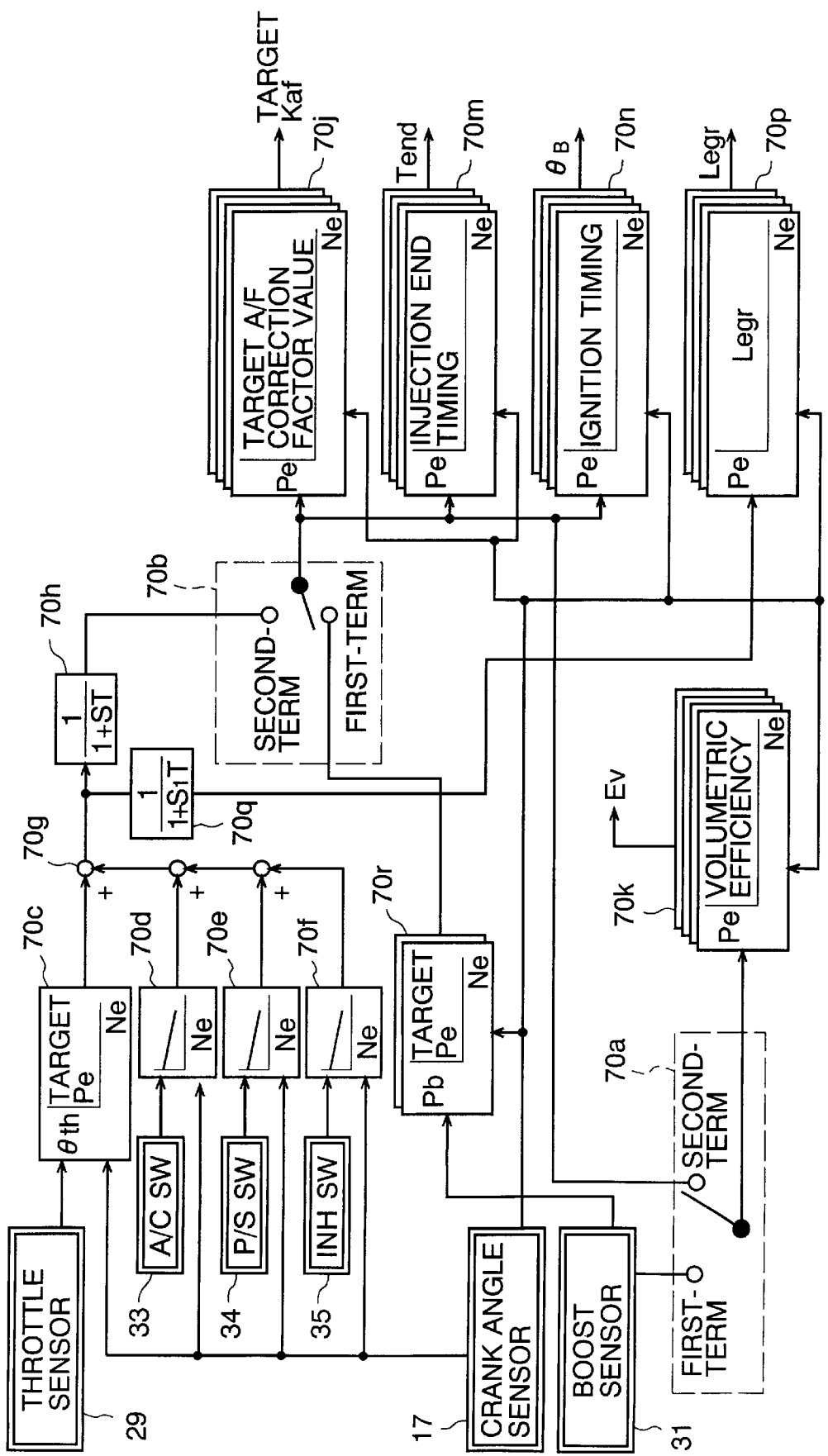
FIG. 6 is a block diagram showing processes for calculating a target average effective pressure Pe, target air-fuel ratio correction factor value Kaf, fuel injection end timing Tend, basic ignition timing θB, valve opening Legr of an EGR valve 45, etc.

FIG. 6 is a block diagram showing processes in which the target average effective pressure Pe is calculated and a target A/F, injection end timing Tend, basic ignition timing θB, valve opening Legr of the EGR valve 45, etc. are computed according to this target average effective pressure Pe. FIGS. 14 to 25 are flowcharts showing control procedures for the discrimination of the engine control mode and the transition to that mode and control procedures in that mode. Referring now to these flowcharts, engine control procedures according to the present invention will be described in succession. A combustion parameter setting routine shown in FIGS. 14 to 22 is executed every time the predetermined crank angle position of each cylinder is detected by the ECU 70.

Figure 14:
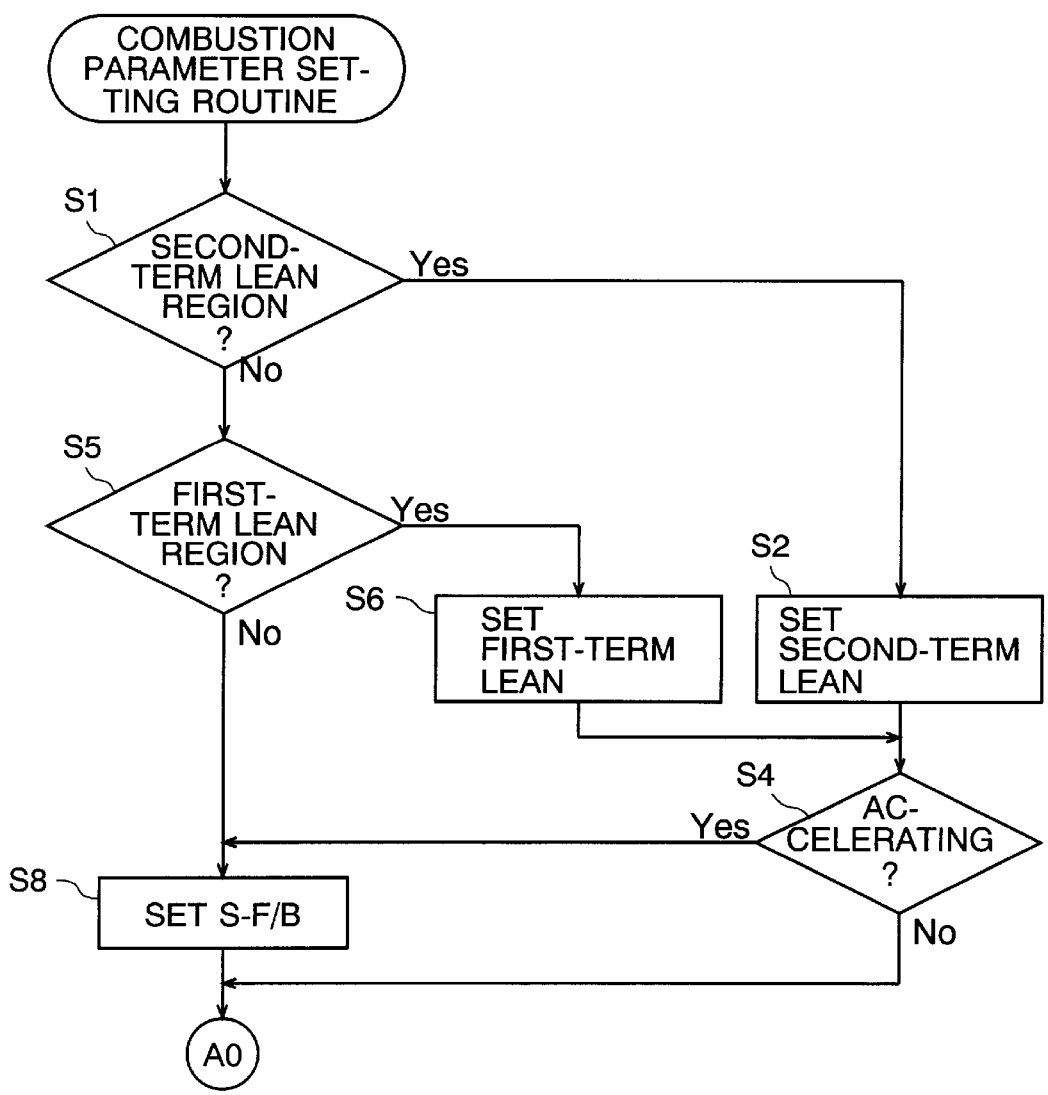
FIG. 14 is a part of a flowchart for a combustion parameter setting routine for setting various combustion parameter values.

First, in Steps S1 to S8 shown in FIG. 14, the ECU 70 carries out decision and setup of the control mode. Since the control contents in the control mode to be executed have been described in brief with reference to FIG. 3, a detailed description of them is omitted. The control mode to be executed is discriminated in accordance with detected information from the various sensors and switches. If the second-term lean mode, for example, is discriminated in Step S1 (or in the case where the result of decision in Step S1 is Yes), various control flags and control variables are set in order to execute control for the second-term lean mode in Step S2. If the first-term lean mode is discriminated in Step S5 (or in the case where the result of decision in Step S5 is Yes), on the other hand, the various control flags and control variables are set in order to execute control for the first-term lean mode in Step S6.

After the control flags and the like for the second-term lean mode and the first-term lean mode are set in Steps S2 and S6, the ECU 70 executes Step S4 to determine whether or not the engine 1 is accelerating.

Whether or not the engine 1 is accelerating is determined by a deviation (time-based rate of change) Δθ between preceding and present values of the throttle valve opening θth detected by the throttle sensor 29 and a deviation (time-based rate of change of the engine speed) ΔN between preceding and present values of the engine speed Ne detected by the crank angle sensor 17. Thus, the engine is concluded to be accelerating if the deviation Δθ or ΔN exceeds its predetermined discrimination value (α, β). If the deviation Δθ or ΔN becomes less than its predetermined discrimination value (α−Δα, β−Δβ) after the engine is once concluded to be accelerating, on the other hand, it is concluded that the engine is no longer accelerating. Here the values Δα and Δβ are infinitesimal values that give a hysteresis characteristic in order to stabilize the control, and both of these values can be also set at suitable values including 0.

If the result of decision in Step S4 is Yes and it is concluded that the engine 1 is accelerating, the program advances to Step S8, whereupon the previously set various control flags and control variables are changed into ones based on the S-F/B mode in order to execute acceleration control in the S-F/B mode compulsorily. As long as the aforesaid accelerating conditions are met, Step S8 is repeatedly executed to carry out the acceleration control. The method of the acceleration control in the S-F/B mode is not limited in particular, and a conventional acceleration control method may be used. Once the acceleration is discriminated, the control in the S-F/B mode can be continued for a given period even if conditions for the cancellation of acceleration are met during a predetermined period. By doing this, the control in the S-F/B mode is stabilized, and the drivability is improved.

If the result of decision in Step S4 is No, that is, if the accelerating state of the engine 1 is not detected or the acceleration is concluded to have been finished, the control is carried out in the discriminated mode without any change to the control flags and the like set in Step S2 or S6.

In the case neither the second-term lean mode nor the first-term lean mode is established (if both the decisions in Steps S1 and S5 are No), the first-term S-F/B mode is discriminated, and the program advances to Step S8, whereupon the various control flags and control variables for the S-F/B mode are set.

Figures 25, 26:
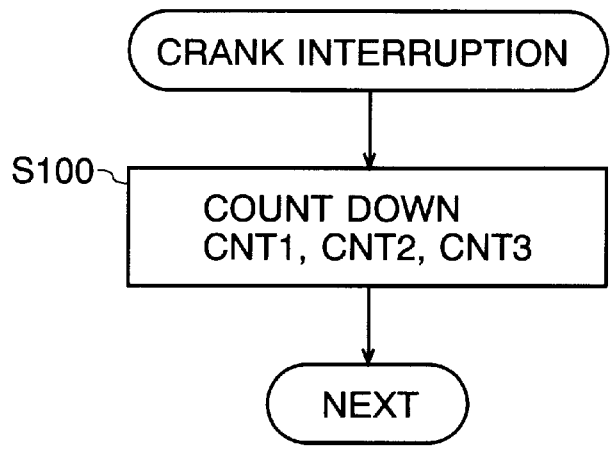
FIG. 25 is a flowchart for a crank interruption routine executed by the ECU 70 every time a predetermined crank angle position of the engine 1 is detected.
FIG. 26 is a diagram for illustrating various tailing coefficient values used for mode change control and set in accordance with the way of control mode change.

In Steps S2, S6, and S8, tailing coefficients K1, K2, KS, and KL (mentioned later) are set individually. When a mode transition (also referred to as injection mode transition request) is discriminated, that tailing coefficient, among the aforesaid tailing coefficients, which corresponds to the type of the mode transition is set at 0, as shown in FIG. 26. For example, the tailing coefficient K1 is reset at 0 when the transition from the S-F/B mode to the second-term lean mode is discriminated for the first time. Further, the tailing coefficient KL is reset at 0 when the transition from the first-term lean mode to the S-F/B mode is discriminated for the first time.

Figure 15:
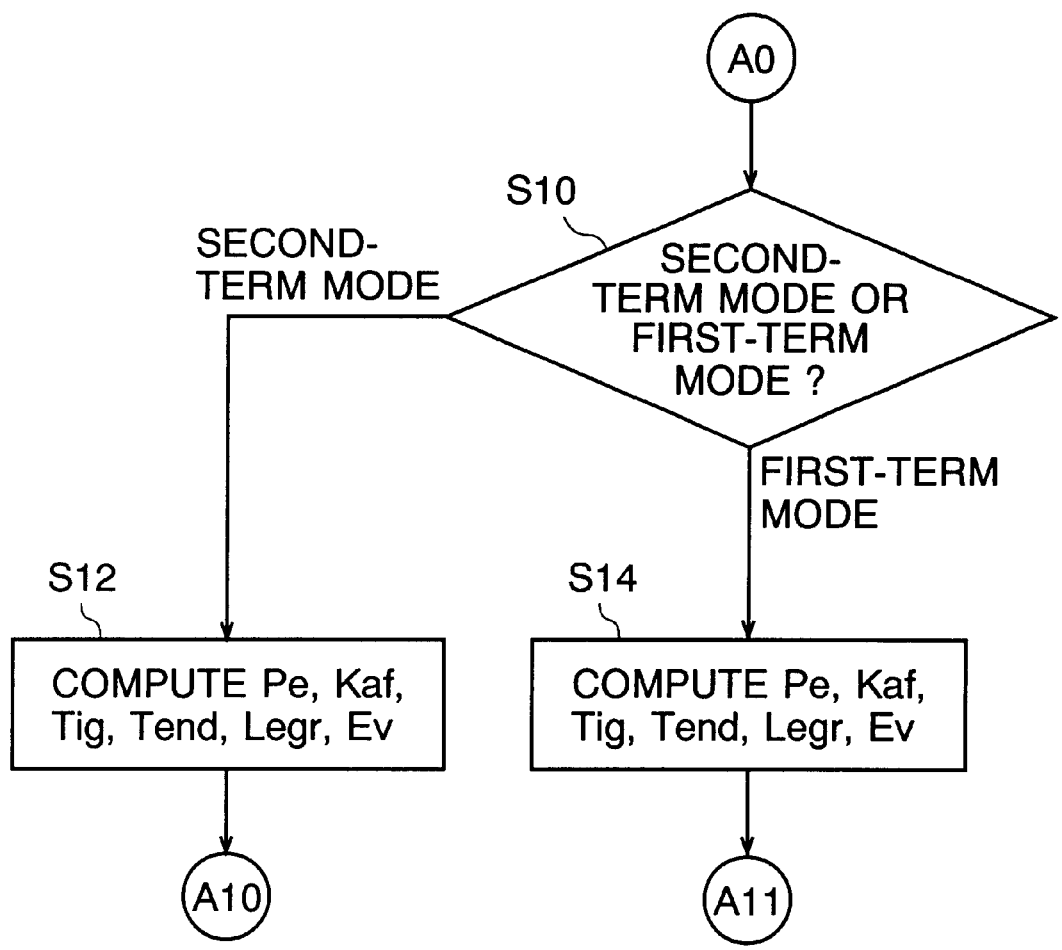
FIG. 15 is another part of the flowchart for the combustion parameter setting routine, continued from the flowchart of FIG. 14.

When this setup of the various control flags and the like is completed, the ECU 70 advances to Step S10 and the subsequent steps of FIG. 15, whereupon it executes transition control for each mode and control for the mode concerned. Referring now to the timing charts of FIGS. 27 to 29, which show time-based changes of various control parameter values, those control procedures will be described.

For ease of explanation, a case in which the second-term lean mode is being executed with the tailing coefficient value K1 set at 1.0 will be described first (before time t0 of FIG. 27). In Step S10, the ECU 70 determines which of the second-term and first-term modes corresponds to the present engine operation state. In this state, the second-term mode implies the second-term lean mode, and the first-term mode includes the first-term lean mode and the S-F/B mode. Since the present operation mode of the engine 1 is the second-term lean mode, as mentioned before, the program advances from Step S10 to Step S12, whereupon various parameter values Pe, Kaf, Tig, Tend, Legr, Ev, etc. that are essential to the engine control are computed. Referring now to the block diagram of FIG. 6, a method of computing these parameter values will be described. In the case where it is concluded by the ECU 70 that the engine 1 is in an operation state such that second-term lean mode control is to be executed, changeover switches 70a and 70b shown in FIG. 6 are shifted to the second-term mode side.

First, the computation of various variables associated with the valve-opening time Tinj of the fuel injection valve 4 will be described. Based on a target average effective pressure map 70c previously stored in the aforesaid storage unit, the ECU 70 calculates the target average effective pressure Pe corresponding to the throttle valve opening θth and the engine speed Ne detected by the throttle sensor 29 and the crank angle sensor 17, respectively. FIG. 7 shows the details of the target average effective pressure map. As shown in FIG. 7, target average effective pressures Peij corresponding to the driver's desired outputs, which correspond to the throttle valve opening θth and the engine speed Ne, are mapped and stored in the storage unit of the ECU 70. These individual data are values that are set experimentally with respect to target average effective pressure information (e.g., net average effective pressure) for which data can be easily collected in a bench test of the engine. Referring to this map, the ECU 70 calculates the optimum target average effective pressure Pe, corresponding to the detected throttle valve opening θth and engine speed Ne, by the conventional four-point interpolation method or the like, for example.

Although the net average effective pressure Pe is used as the target average effective pressure information according to this embodiment, various values, such as the indicated average effective pressures, net outputs, etc., may be used instead if they constitute no special hindrance to the collection of the data in the bench test of the engine.

The storage unit of the ECU 70 is provided with output correction maps 70d to 70f (FIG. 6) for various load devices, such as the air conditioner, power steering system, transmission system, etc., which constitute mechanical and electrical loads on the engine 1 in operation. In response to on-signals from the switches 33 to 35 (FIG. 6) for detecting the operations of these load devices, target average effective pressure correction values corresponding to the engine speed Ne are outputted. An adder 70g adds these correction values to the target average effective pressure Pe obtained from the map 70c, thereby modifying its value.

Data on the target average effective pressure Pe calculated in this manner is filtered by a first-order lag filter 70h, and delivered, e.g., to a calculation map 70j for a target air-fuel ratio correction factor value Kaf used as the combustion parameter setting means. The first-order lag element (filter) 70h is provided for the following reason. In the case of cylinder fuel injection, a sudden change of the fuel injection quantity develops changes in the outputs and the like. The throttle valve opening θth, which is used to determine the fuel injection quantity, is the detected information that can be detected without a delay, unlike the detection of the suction air quantity, etc. The drivability may possibly be ruined if a fuel injection quantity corresponding to the detected valve opening θth is supplied directly to the engine 1. The first-order lag element 70h need not be provided in some cases, such as the case where the control response is given priority.

Figure 11:
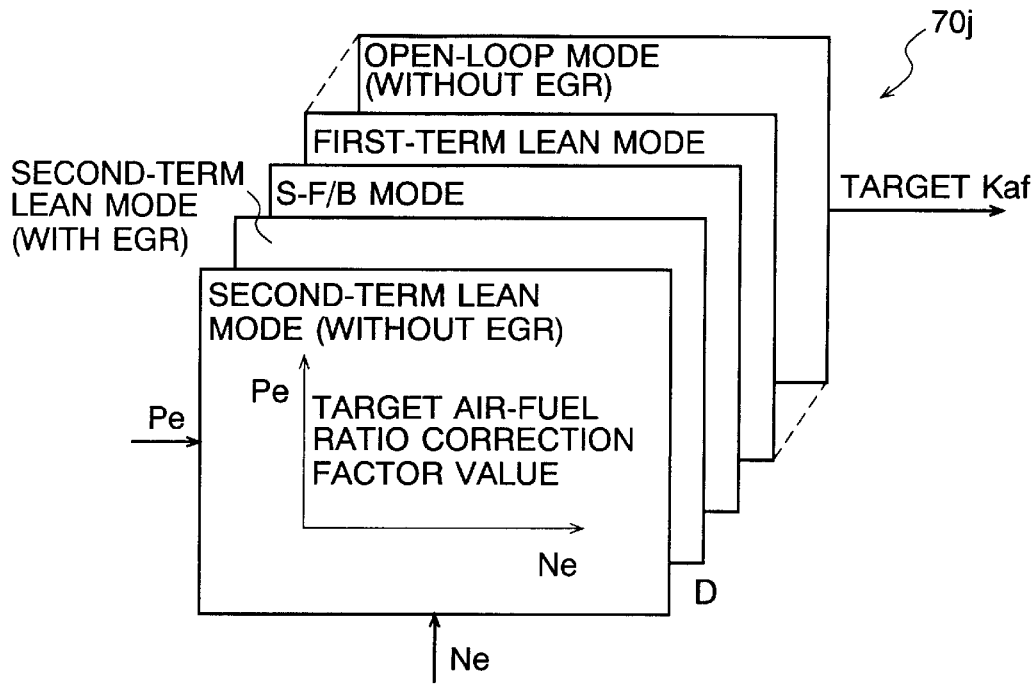
FIG. 11 is a diagram showing an outline of a target air-fuel ratio correction factor value calculation map 70j of FIG. 6 and illustrating the target air-fuel ratio correction factor value Kaf computed in accordance with the target average effective pressure Pe and the engine speed Ne.

The details of the target air-fuel ratio correction factor value calculation map 70j are shown in FIG. 11, and a plurality of maps are prepared for each mode and depending on the presence of EGR or the like. The details of each map, like the ones shown in FIG. 7, are experimentally set beforehand in accordance with the target average effective pressure Pe and the engine speed Ne, and are stored in the aforesaid storage unit. Based on the target air-fuel ratio correction factor value calculation map 70j, the ECU 70 calculates the target air-fuel ratio correction factor value Kaf corresponding to the target average effective pressure Pe and the engine speed N in the calculation map 70j, and uses the value for the computation of the valve-opening time, which will be mentioned later.

In volumetric efficiency calculating means 70k, on the other hand, a volumetric efficiency Ev is calculated in accordance with the target average effective pressure Pe, filtered in the aforesaid manner by the first-order lag filter, and the engine speed Ne. FIG. 9 shows a volumetric efficiency map used for the second-term lean mode control. The volumetric efficiency map values shown in this map, like the ones shown in FIG. 7, are also experimentally set beforehand in accordance with the target average effective pressure Pe and the engine speed Ne, and are stored in the aforesaid storage unit.

The target air-fuel ratio correction factor value Kaf and the volumetric efficiency Ev obtained in this manner are applied to the following equation (F1), whereupon the valve-opening time Tinj of each fuel injection valve 4 is computed at a timing mentioned later.

$$Tinj=K \cdot Pb \cdot Ev \cdot Kaf \cdot (Kwt \cdot Kat \cdot \ldots) \cdot Kg+TDEC, \qquad (F1)$$

where Pb is a suction pipe pressure (pressure in suction passage) detected by the boost pressure sensor 31, and Kwt, Kat, etc. are correction factors set in accordance with an engine water temperature Tw, atmospheric temperature Tat, atmospheric pressure Tap, etc. Kg is a gain correction factor of each injection valve 4, and TDEC is a dead time correction value, which is set in accordance with the target average effective pressure Pe and the engine speed Ne. K is a conversion coefficient, i.e., a constant, used in converting the fuel quantity into the valve-opening time.

Kaf is set in accordance with the engine operation state. Equation (F1) is also applied to any mode other than the second-term lean mode control. Among the aforesaid various correction factors, the air-fuel ratio correction factor value Kaf is set by the method mentioned later when the mode is changed between the second-term lean mode and the S-F/B mode. The factor Kaf is set in accordance with the output voltage of the $O_2$ sensor 40 in the S-F/B mode control, and is adjusted to an optimum value in any other mode. As for the volumetric efficiency Ev, it is to be understood that its value suited to each mode is set and used.

The volumetric efficiency Ev, which is used for the computation of the valve-opening time Tinj in the aforesaid equation (F1), is an index associated with the quantity of oxygen that can be supplied to each combustion chamber 5 and can be concerned in combustion for each unit suction stroke (for each cylinder). Similar indexes include the charging efficiency, suction efficiency, etc., which can be used in place of the volumetric efficiency Ev. Values obtained on the basis of the volumetric efficiency Ev and the suction pipe pressure Pb are associated with the suction air quantity for each unit suction stroke. In this respect, a suction air quantity (A/N) for each unit suction stroke, obtained directly on the basis of the airflow quantity detected by means of an airflow sensor and the engine speed, can be used in place of the volumetric efficiency Ev and the suction pipe pressure Pb. The volumetric efficiency, charging efficiency, suction air quantity (A/N) for each unit suction stroke, etc. are referred to generically as effective suction parameters.

Data on the valve-opening time Tinj calculated in this manner is delivered to an injector driver circuit (not shown) for driving each fuel injection valve 4 at a given timing.

The following is a description of the way of setting the injection end timing Tend. In injection end timing setting means (combustion parameter setting means) 70m shown in FIG. 6, the ECU 70 sets the injection end timing Tend suited for the currently selected control mode in accordance with the target average effective pressure Pe and the engine speed Ne. If the injection end timing for the fuel injection in the second-term lean mode is delayed, a period for fully evaporating the injected fuel spray cannot be secured, so that black smoke may be emitted. If the injection end timing is too early, in contrast with this, an optimum air-fuel mixture cannot be formed for the reason, e.g., that the injected fuel runs against the cylinder wall, possibly causing a misfire. This injection end timing Tend is previously experimentally adjusted to an optimum value and mapped for each control mode or depending on the execution of EGR or the like. Data on the injection end timing Tend, which is set in accordance with the target average effective pressure Pe and the like, is further corrected by means of the engine water temperature and the like, and fed to the aforesaid injector driver circuit. In the injector driver circuit, an injection beginning timing is computed in the accordance with data on the fed injection end timing Tend and the valve-opening time Tinj. When the computed injection beginning timing is reached, a driving signal is delivered to the fuel injection valve 4 of the cylinder to be subjected to injection for a period corresponding to the valve-opening time Tinj.

The ignition timing Tig is computed according to the following equation (F2) by the ECU 70:

$$Tig=\theta B+(\text{various retard correction values}). \qquad (F2)$$

Figure 12:
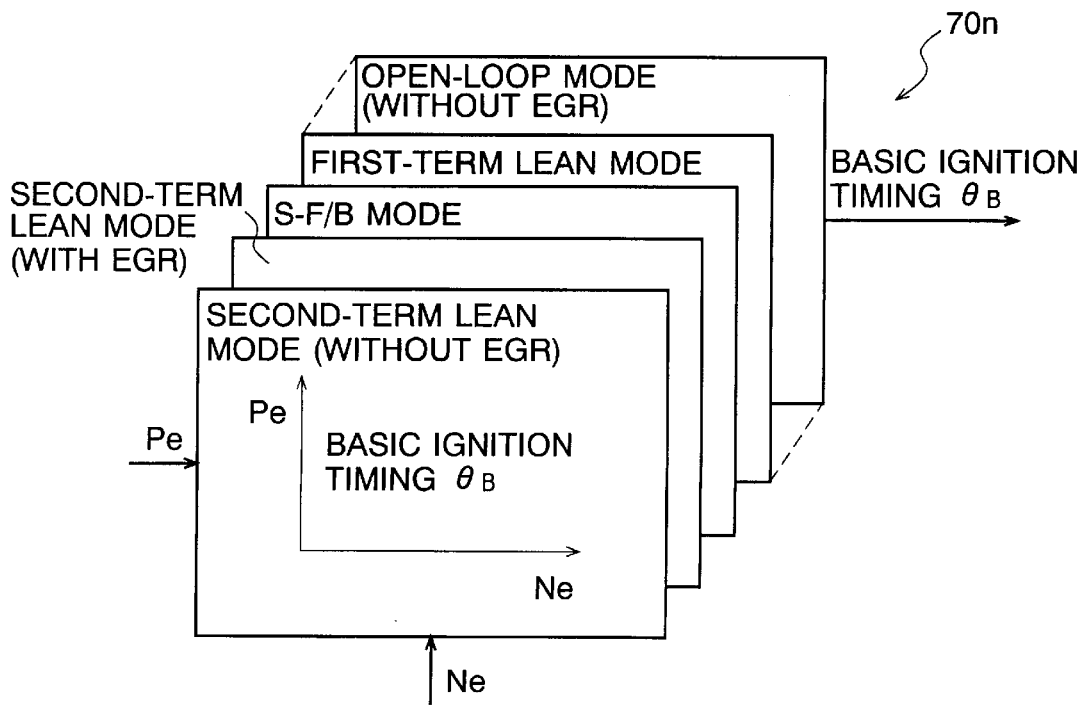
FIG. 12 is a diagram showing an outline of ignition timing setting means 70n of FIG. 6 and illustrating the basic ignition timing θB computed in accordance with the target average effective pressure Pe and the engine speed Ne.

The basic ignition timing $\theta B$ in the above equation is calculated in ignition timing setting means (combustion parameter setting means) 70n of FIG. 6. As shown in FIG. 12, the ignition timing setting means 70n includes a plurality of basic ignition timing setting maps for the individual modes and the individual operation states such as the presence of EGR. In the second-term lean mode control, the data on the target average effective pressure Pe set in accordance with the throttle valve opening $\theta$th with reference to the aforesaid target average effective pressure map 70c is fed to the ignition timing setting means 70n, and the basic ignition timing $\theta B$ corresponding to this target average effective pressure Pe and the engine speed N is calculated according to a map for the second-term lean mode.

Various retard values (second correction factors) include transitional retard correction values R1(K) and R2(K) (mentioned later) for transition between the second-term lean mode and the S-F/B mode, besides normal correction values such as an engine water temperature correction value. The transitional retard correction values R1(K) and R2(K) are set at 0 at any time other than the time of transition. The ignition timing for the second-term lean mode control is adjusted to the timing at which the optimum air-fuel mixture will reach the spark plug 3, and this set timing is regarded as an optimum ignition timing.

Data for the ignition timing Tig set in this manner is fed to an ignition coil driver circuit (not shown), whereupon this driver circuit applies high voltage to the spark plug 3 of the cylinder to be ignited, thereby igniting the cylinder, at a point of time corresponding to the set ignition timing Tig.

Figure 13:
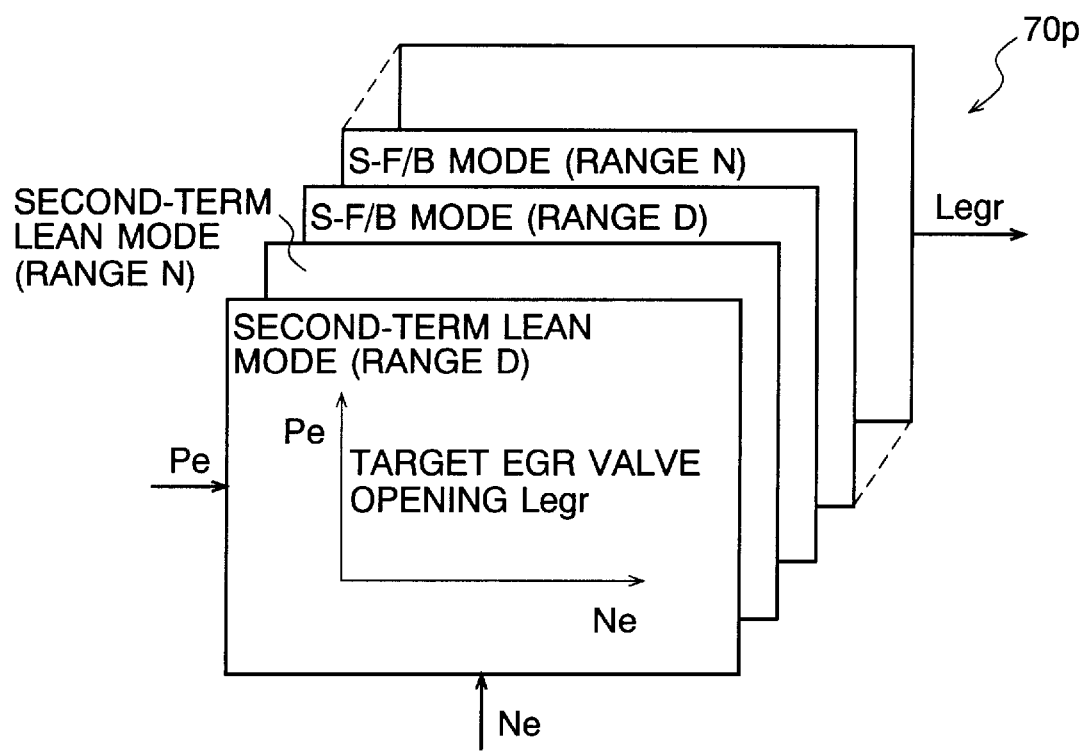
FIG. 13 is a diagram showing an outline of EGR setting means 70p of FIG. 6 and illustrating the valve opening Legr of the EGR valve 45 computed in accordance with the target average effective pressure Pe and the engine speed Ne.

The valve opening Legr of the EGR valve 45 is calculated in EGR quantity setting means (combustion parameter setting means) 70p of FIG. 6. As shown in FIG. 13, the EGR quantity setting means 70p includes a plurality of EGR valve opening maps which are prepared for the individual operation modes where the exhaust gas is to be recirculated and which correspond to the selected position (range D or N) of the transmission apparatus and the like. In calculating the valve opening Legr, the data on the target average effective pressure Pe, set in accordance with the throttle valve opening θth with reference to the aforesaid target average effective pressure map 70c, is not subjected to the first-order lag filtering process, the data on the set target average effective pressure Pe is simply fed to the EGR quantity setting means 70p through a low-pass filter 70q, and the valve opening Legr corresponding to the target average effective pressure Pe and the engine speed Ne is calculated according to the map for the second-term lean mode.

As the exhaust gas is supplied to the engine 1 through the EGR valve 45, a substantial time lag is caused before an EGR quantity that matches the modified valve opening degree is supplied to the engine 1. In consideration of this time lag, it is advisable to quickly compute an optimum EGR quantity for the operation state, so that the data on the target average effective pressure Pe set with reference to the target average effective pressure map 70c is fed to the EGR quantity setting means 70p without delay.

Data on the valve opening Legr calculated in this manner is fed to an EGR driver circuit (not shown) after correction such as engine water temperature correction is made, whereupon a valve driving signal corresponding to the valve opening Legr is delivered to the EGR valve 45.

Figure 16:
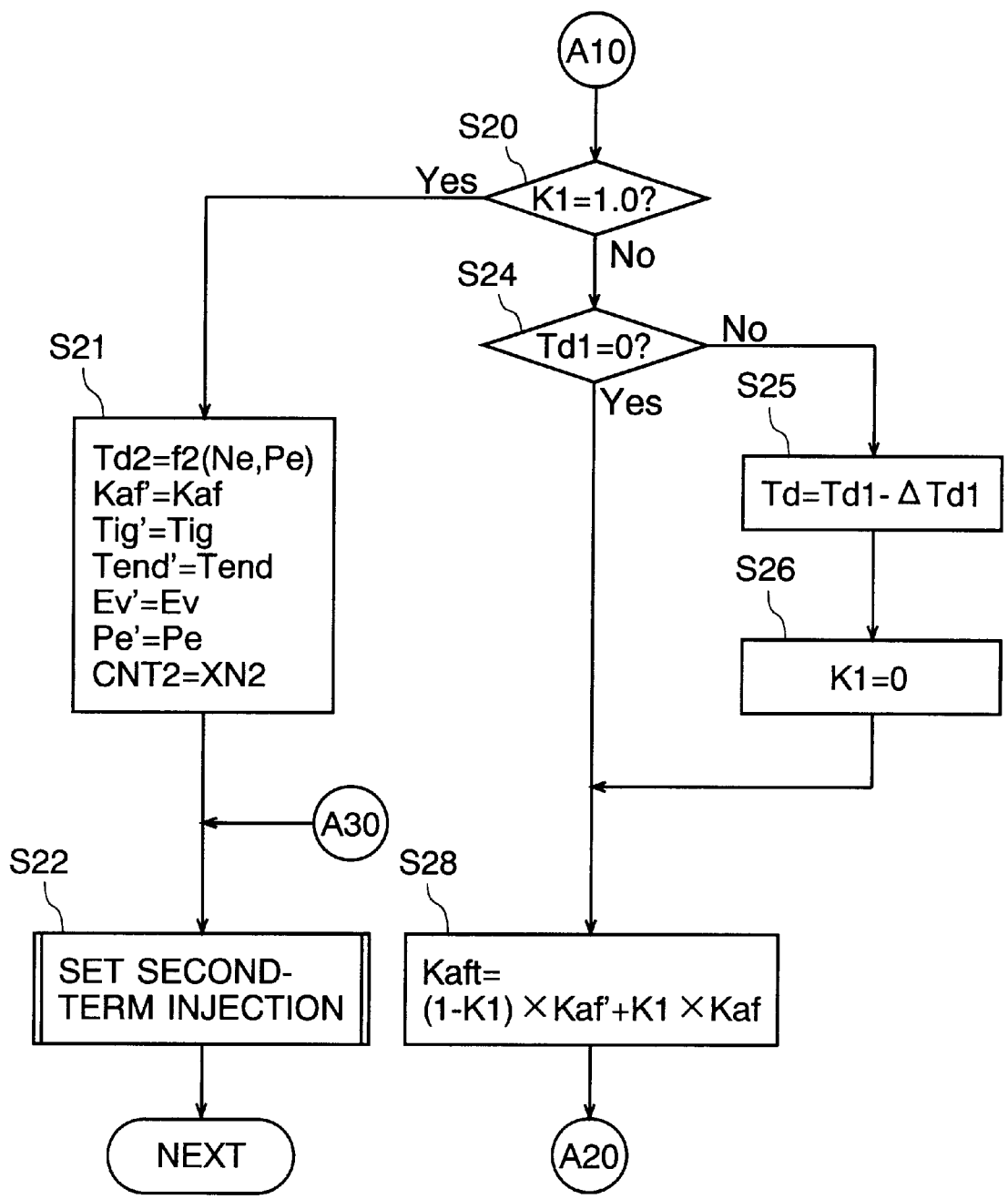
FIG. 16 is another part of the flowchart for the combustion parameter setting routine, continued from the flowchart of FIG. 15.

When the calculation of the various combustion parameter values and the like is completed in the aforesaid manner, in Step S12 of FIG. 15, the program advances to Step S20 of FIG. 16. In this step, it is determined whether or not the tailing coefficient K1 is at 1.0. In the case where the transition to the second-term lean mode is completed, the tailing coefficient K1 is at 1.0, as mentioned before. At the present point in time, the engine control in the second-term lean mode after the completion of the transition is being carried out, so that the tailing coefficient K1 is set at 1.0. Accordingly, the result of decision in Step S20 is Yes, so that the program advances to Step S21, whereupon preparations are made for the transition from the second-term mode to the first-term mode. The preparations for the transition include setting the initial values of control variables for the transition and previous storage of the various values, including the correction factor value Kaf, combustion parameter values Tig, Tend, and EV, target average effective pressure Pe, etc., calculated in Step S12, as described above and used in the present second-term lean mode control. The control variables for the transition include a dead period counter Td2 and a boost pressure delay counter CNT2. A value f2(Ne, Pe), which is determined depending on the target average effective pressure Pe and the engine speed Ne, is set as an initial value in the former counter Td2, and a value XN2 is set in the latter counter CNT2. The initialization of the aforesaid control variables and the stored values such as the correction factor value Kaf are updated for new values every time Step S21 is executed.

When the setup of the initial values, such as the control variables, in Step S21 is completed, the program advances to Step S22, whereupon a second-term injection set routine is executed, and the aforesaid various control operations, including the fuel injection control, ignition timing control, EGR quantity control, etc., are carried out.

Then, supposing it is concluded that the operation state of the engine 1 is changed so that a transition from the second-term lean mode to the S-F/B mode is made (a mode transition request is made), the tailing coefficient K2 is set at 0 in Step S8 of FIG. 14 mentioned before (at time t0 of FIG. 27), as shown in FIG. 26. In this case, the ECU 70 executes Step S14 after discriminating the first-term mode in Step S10 of FIG. 15, whereupon it computes the various combustion parameter values Pe, Kaf, Tig, Tend, Legr, Ev, etc. in the same manner as in Step S12 mentioned before.

In this case, the changeover switches 70a and 70b shown in FIG. 6 are shifted to the first-term mode side at the timing mentioned later, and the target average effective pressure Pe is calculated according to a target average effective pressure map 70r as a second calculation map. In the second-term lean mode or the S-F/B mode, as in the case of conventional manifold-injection type, the engine loads required by the driver substantially correspond to the suction pipe pressure Pb, and the detected suction pipe pressure Pb itself includes a first-order lag element. Thus, the first-order lag processing, which is required in the case where the target average effective pressure Pe is set in accordance with the throttle valve opening θth, is unnecessary, so that the suction pipe pressure Pb is used to set the target average effective pressure Pe. Data on the suction pipe pressure Pb detected by the boost sensor 31 is fed to the target average effective pressure map 70r, whereupon the target average effective pressure Pe corresponding to the suction pipe pressure Pb and the engine speed Ne is computed. The target average effective pressure Pe is computed in the same manner as in the case of the target average effective pressure map 70c. The map 70r is provided with a required number of maps similar to the one shown in FIG. 7, depending on the engine operation state such as the presence/absence of EGR and the like, as shown in FIG. 8.

In this first-term mode, a suction air quantity detected by the airflow sensor or another parameter may be used in place of the suction pipe pressure Pb. Also, the volumetric efficiency Ev associated with the quantity of air sucked in by the engine 1 may be obtained on the basis of the suction pipe pressure Pb or the suction air quantity detected by the airflow sensor or another parameter, so that the target average effective pressure Pe can be calculated in accordance with the obtained volumetric efficiency Ev and the engine speed Ne.

When the target average effective pressure Pe is calculated, the data on this target average effective pressure Pe is fed to the target air-fuel ratio correction factor value calculation map 70j, injection end timing setting means 70m, ignition timing setting means 70n, and EGR quantity setting means 70p, individually, whereupon the target A/F, Tend, Tig, and Legr are computed by using the maps corresponding to the operation state.

The volumetric efficiency calculating means 70k is also fed with the data on the suction pipe pressure Pb detected by the boost sensor 31, and the volumetric efficiency Ev corresponding to the suction pipe pressure detection Pb and the engine speed Ne is computed with use of a map shown in FIG. 10, which resembles the one shown in FIG. 7. Also in this case, the volumetric efficiency Ev may be calculated by using the suction air quantity detected by the airflow sensor or another parameter in place of the suction pipe pressure Pb.

Then, the valve-opening time Tinj of each fuel injection valve 4 is computed in the same manner as in the secondterm lean mode by applying the target A/F and the volumetric efficiency Ev obtained in the aforesaid manner to the aforementioned equation (F1).

Figure 19:
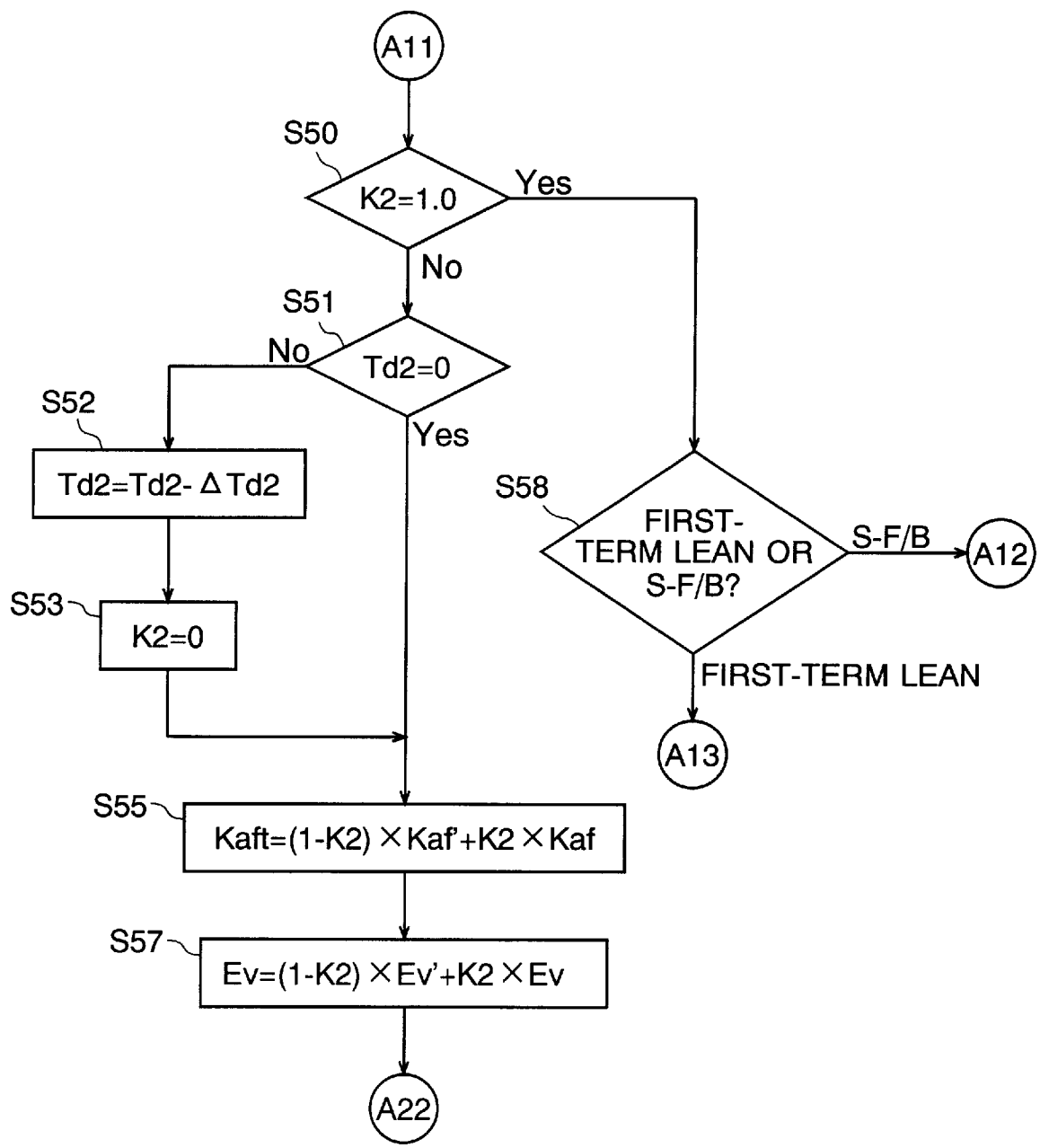
FIG. 19 is another part of the flowchart for the combustion parameter setting routine, continued from the flowchart of FIG. 15.

Referring again to FIG. 15, when the calculation of the various combustion parameter values and the like is completed in the aforesaid manner in Step S14, the program advances to Step S50 of FIG. 19. In this step, it is determined whether or not the tailing coefficient K2 is at 1.0. Immediately after the request is made for the transition to the second-term lean mode, this tailing coefficient K2 is set at 0, as mentioned before. Accordingly, the result of decision in Step S50 is No, so that Step S51 and the subsequent steps are executed to make a transition from the second-term lean mode to the S-F/B mode. The tailing coefficient K2 becomes 1.0 when the transition process is completed. Before this is done, an infinitesimal value ΔK2 smaller than 1.0 is added repeatedly to the value K2 according to a timer routine (mentioned later) shown in FIGS. 23 and 24. A transition process corresponding to the tailing coefficient value K2 is carried out until the coefficient value K2 becomes 1.0.

Figure 23:
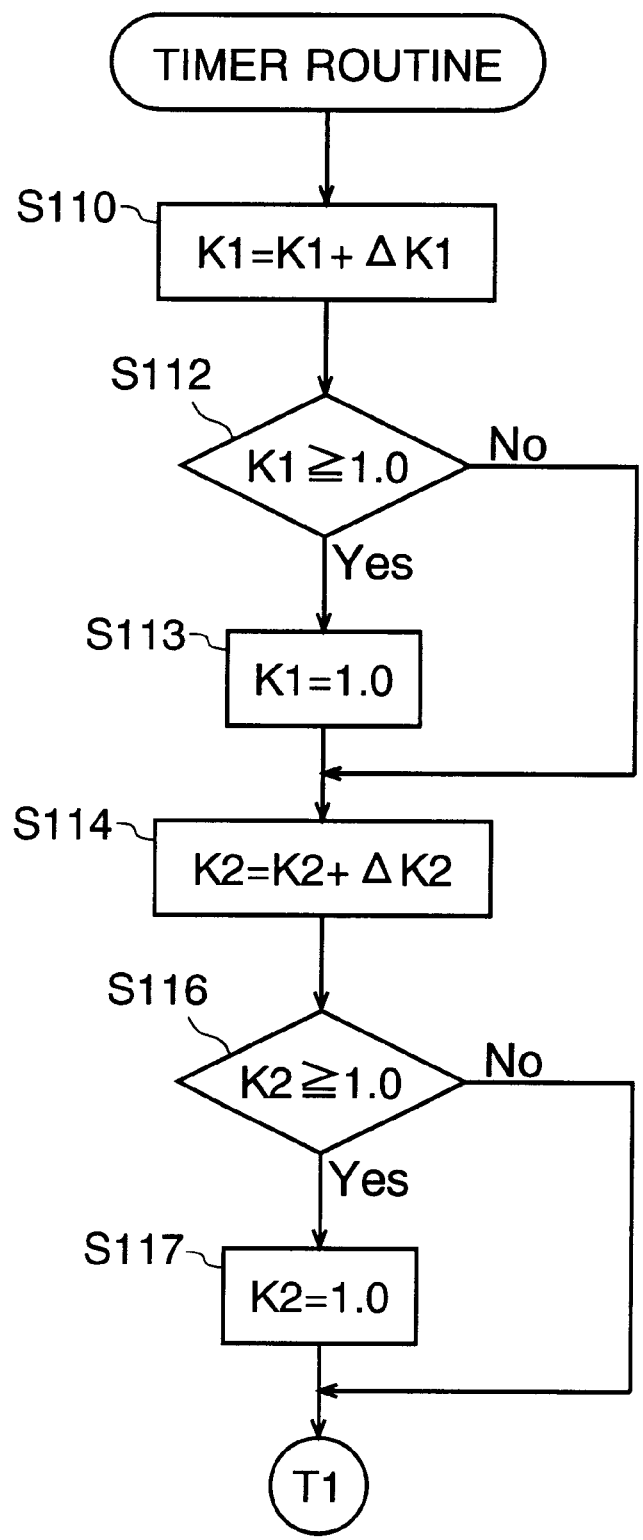
FIG. 23 is a part of a flowchart for a timer routine executed by an ECU 70 every time a clock pulse of a predetermined cycle is generated.
Figure 24:
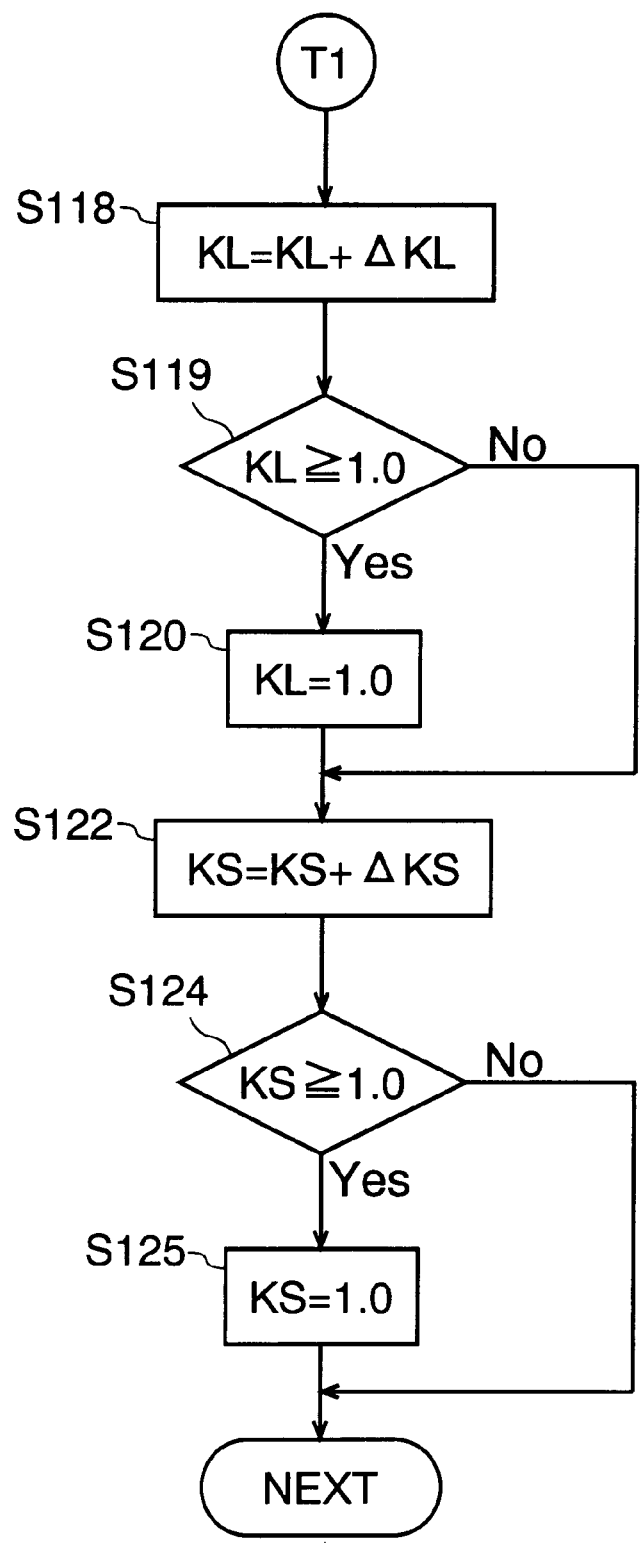
FIG. 24 is the remaining part of the flowchart for the timer routine, continued from the flowchart of FIG. 23.

FIGS. 23 and 24 show flowcharts for the timer routine executed on the basis of clock pulses with a predetermined period that are generated by a built-in clock of the ECU 70, and illustrate the way various tailing coefficient values K1, K2, KL, and KS are counted up based on the clock pulses. First, the tailing coefficient K1 is counted up in Steps S110 to S113. An infinitesimal value ΔK1 smaller than 1.0 is added to the coefficient value K1 (Step S110), and the resultant coefficient value K1 is compared to 1.0 (Step S112). If the coefficient value K1 is greater than 1.0, it is readjusted to 1.0 in advance at Step S113, and the program advances to Step S114. If the coefficient value K1 is not greater than 1.0, the program advances from Step S112 to Step S114. Thus, once the tailing coefficient value K1 is reset at 0, the infinitesimal value ΔK1 is added every time this routine is executed. When the added value attains 1.0, it is kept at this value.

The other tailing coefficient values are handled in like manner. The tailing coefficient value K2 is counted up in Steps S114 to S117, while the tailing coefficient values KL and KS are counted up in like manner in Steps S118 to S120 and in Steps S122 to S125, respectively. The infinitesimal values ΔK1, ΔK2, etc. added to the individual coefficient values determine the necessary length of a mode transition control period, and normally, are set at different values for the individual tailing coefficients. Alternatively, however, these infinitesimal values may be set at the same value.

Referring again to FIG. 19, it is determined in Step S51 whether or not a count value in the dead period counter Td2 is 0, that is, whether or not a dead period corresponding to the initial value f2(Ne, Pe) in the counter Td2 is over. The initial value f2(Ne, Pe) in the counter Td2 is set by executing Step S21 of FIG. 16 mentioned before, and the counter value Td2 is equal to this initial value f2(Ne, Pe) at the point of time when Step S51 is executed immediately after the mode transition request is made. Accordingly, the result of decision in Step S51 is No, and the program advances to Step S52, whereupon a predetermined value ΔTd2 is subtracted from the counter value Td2. In Step S53, the tailing coefficient value K2 is readjusted to 0. Steps S52 and S53 are repeatedly executed until the aforesaid dead period is over, and the tailing coefficient value K2 is kept at 0 during this period. Both the tailing coefficient K2 and the dead period counter Td2 serve to prevent sudden changes in the cylinder combustion conditions during transition, thereby improving the drivability.

Then, the ECU 70 executes Steps S55 and S57, thereby computing a tentative target air-fuel ratio correction factor value Kaft and the volumetric efficiency Ev according to the following equations (F3) and (F4), respectively:

$$Kaft=(1-K2)\cdot Kaf'+K2\cdot Kaf, \tag{F3}$$

$$Ev=(1-K2)\cdot Ev'+K2\cdot Ev, \tag{F4}$$

where Kaf' and Ev' are the target air-fuel ratio correction factor value and volumetric efficiency, respectively, computed last in the second-term lean mode control and stored as values Kaf' and Ev', respectively, when Step S21 of FIG. 16 mentioned before is executed last. The final terms Kaf and Ev in the respective right sides of the equations are set individually during the execution of the present S-F/B mode control, and the value Kaf is a value set corresponding to the output value of the $O_2$ sensor 40 (value calculated in an S-F/B mode process).

Figure 27:
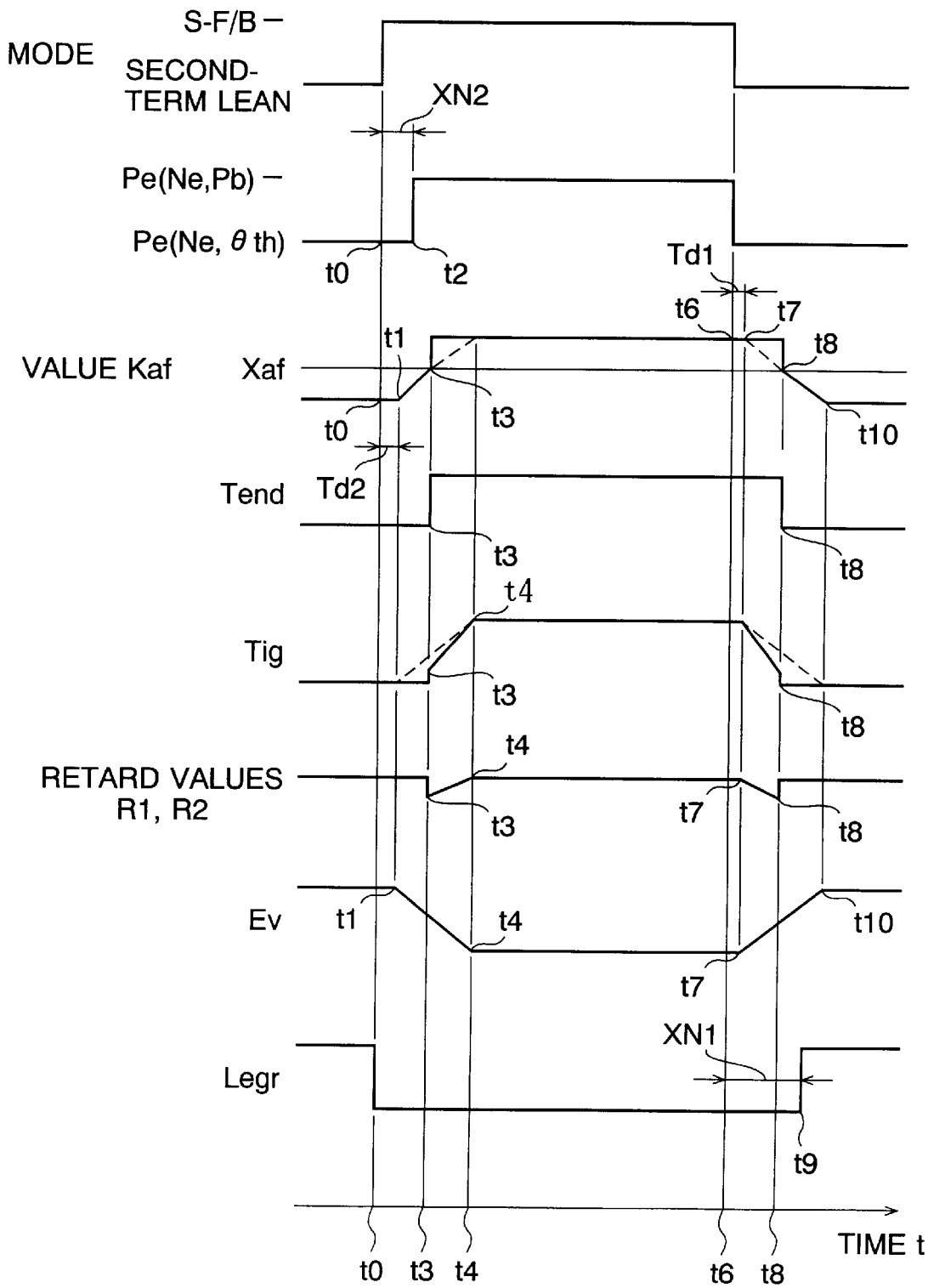
FIG. 27 is a timing chart showing changes of various control variables and combustion parameter values with time during control for the mode change between a second-term lean mode and an S-F/B mode.

Thus, the tentative target air-fuel ratio correction factor value Kaft and the volumetric efficiency Ev are set at their respective preceding values, that is, the values set last in the second-term lean mode control, during the period in which the coefficient value K2 is at 0 (dead period from time t0 to time t1 shown in FIG. 27). While the coefficient value K2 increases from 0 toward 1.0, moreover, the values Kaft and Ev are set at values weighed corresponding to the coefficient value K2. When the coefficient value K2 attains 1.0, furthermore, the values Kaft and Ev are set at values calculated for the S-F/B mode control. As the tailing coefficient value K2 changes in this manner, the target air-fuel ratio correction value Kaf changes in the manner mentioned later during the mode transition, and the volumetric efficiency Ev gradually and linearly changes its value during the period from time t1 to time t4, as shown in FIG. 27. On and after time t4, the efficiency Ev is kept at a value calculated for the S-F/B mode.

Then, in Step S60 of FIG. 20, the ECU 70 determines whether or not the boost pressure delay counter CNT2 is counted down to 0 in a countdown process mentioned later. If it is concluded that the boost pressure delay counter value CNT2 is not counted down to 0 yet (the result of decision in Step S60 is No), Step S61 is executed, whereupon the target average effective pressure Pe is rewritten to be at a value Pe', and the value set last in the second-term lean mode control is maintained for a predetermined period (period from time t0 to t2 shown in FIG. 27, corresponding to the initial value XN2 in the counter). The period corresponding to the initial value XN2 is set in association with a delay in the rise of the boost pressure behind the valve-opening operation of the throttle valve 28, and the initial value XN2 is set corresponding to a predetermined number of strokes of the engine 1. The change of the map for the calculation of the target average effective pressure Pe is delayed with use of the boost pressure delay counter value CNT2.

The count value in the counter CNT2 is counted down one by one in a crank interruption routine that is executed every time a predetermined crank angle position of each cylinder is detected. In this routine, count values in counters CNT1 and CNT3, like the value in the counter CNT2, are also counted down one by one.

Figure 20:
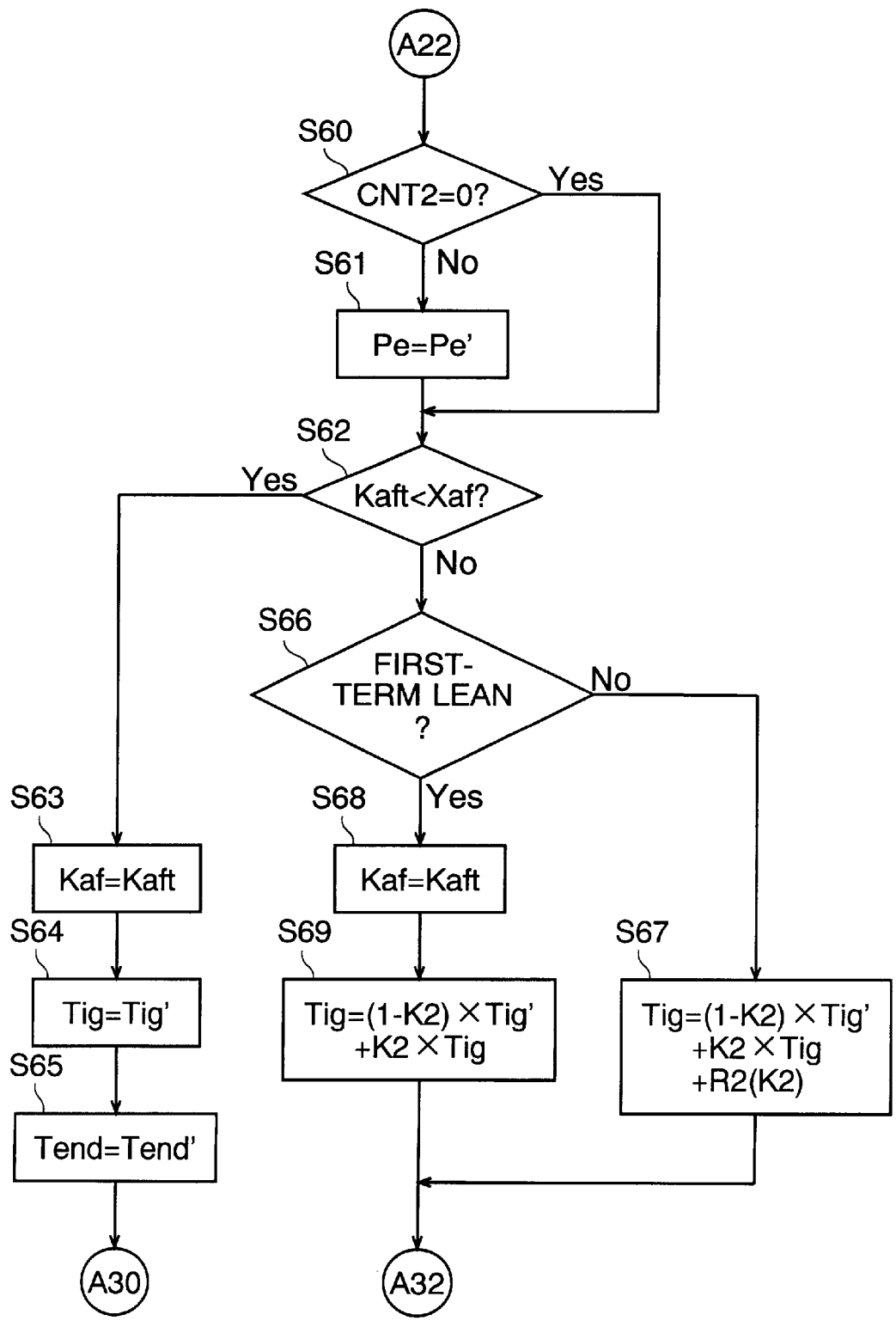
FIG. 20 is another part of the flowchart for the combustion parameter setting routine, continued from the flowchart of FIG. 19.

If the result of decision in Step S60 of FIG. 20 is Yes (or if a boost pressure delay period is over),values calculated according to the target average effective pressure map 70r of FIG. 6 are used in the S-F/B mode control afterward (on and after time t2 of FIG. 27).

Subsequently, the program advances to Step S62, whereupon it is determined whether or not the tentative target air-fuel ratio correction factor value Kaft computed according to equation (F3) mentioned before is less than a value Xaf. This discrimination value Xaf is determined to such a value that a rich misfire may possibly be caused in the engine combustion chamber 5 when the engine is controlled in the second-term lean mode using the target air-fuel ratio correction factor value Kaf thereat, and is equivalent to about 20 (theoretical air-fuel ratio: 14.7) in terms of the overall air-fuel ratio. More specifically, if the target air-fuel ratio correction factor value Kaf is less than the value Xaf, then it implies that the engine output can be controlled by the fuel injection quantity adjustment according to the second-term lean mode. Before the tentative target air-fuel ratio correction factor value Kaft reaches the value Xaf (until time t3 shown in FIG. 27), the target air-fuel ratio correction factor value Kaf is set at a value corresponding to the tailing coefficient K2, that is, at the tentative target air-fuel ratio correction factor value Kaft (Step S63). In order to continue the execution of the second-term lean mode control, moreover, the ignition timing Tig is kept at its last value Tig' that is set in the second-term lean mode (Step S64), and the fuel injection end period Tend is also kept at its last value Tend' that is set in the second-term lean mode (Step S65).

Kaf=Kaft,

Tig=Tig',

Tend=Tend'.

After the individual combustion parameter values are readjusted in this manner, Step S22 of FIG. 16 mentioned before is executed, whereupon the engine control in the second-term lean mode is carried out.

When the tailing coefficient value K2 increases so that the tentative target air-fuel ratio correction factor value Kaft exceeds the discrimination value Xaf, the result of decision in Step S62 becomes No, so that the program advances to Step S66 without the execution of Steps S63 to S65 mentioned before. As a result, the respective values of the target air-fuel ratio correction factor value Kaf and the fuel injection end period Tend calculated for the S-F/B mode are directly used without being rewritten any longer into the tentative target air-fuel ratio correction factor value Kaft and the last value Tend' calculated in the second-term lean mode, respectively. As seen from the change of the correction factor value at time t3 shown in FIG. 27, in this case, the target air-fuel ratio correction factor value Kaf changes at a stroke in a stepwise fashion into a suitable value corresponding to a value close to the theoretical air-fuel ratio and suited to the S-F/B mode, whereupon a transition to the S-F/B mode is made. Thus, when the air-fuel ratio reaches a value (about 20) corresponding to the critical value Xaf against a rich misfire during the second-term lean mode control, the air-fuel ratio does not gradually change between that value, 20, and the theoretical air-fuel ratio, but is suddenly changed close to the theoretical air-fuel ratio for the S-F/B mode. As this is done, the fuel injection end period Tend is also changed into a suitable value for the S-F/B mode control (at time t3 of FIG. 27).

In Step S66, the mode to which the present engine operation state corresponds, that is, the first-term lean mode included in the first-term mode or the S-F/B mode included in the first-term mode, is discriminated, and the engine is controlled in a different manner according to the result of the discrimination. Since the S-F/B mode is discriminated in the present loop (the result of decision in Step S66 is No), Step S67 is executed, whereupon the ignition timing Tig is replaced by a value computed according to the following equation (F5):

$$Tig=(1-K2) \cdot Tig'+K2 \cdot Tig+R2(K2), \quad (F5)$$

where R2(K2) is a retard value set to prevent a sudden change of the engine output that is involved in the mode transition. R2(K2) temporarily takes a negative value as a function of the tailing coefficient value K2, as indicated by a change during the period between times t3 and t4 of FIG. 27, and thereafter, gradually changes from that value and is set at 0 at time t4 (K2=1.0). As a result, the ignition timing Tig changes during the period between times t3 and t4 of FIG. 27. A drastic increase of the output attributable to the start of the S-F/B mode control can be prevented by thus controlling the ignition timing Tig.

Figure 18:
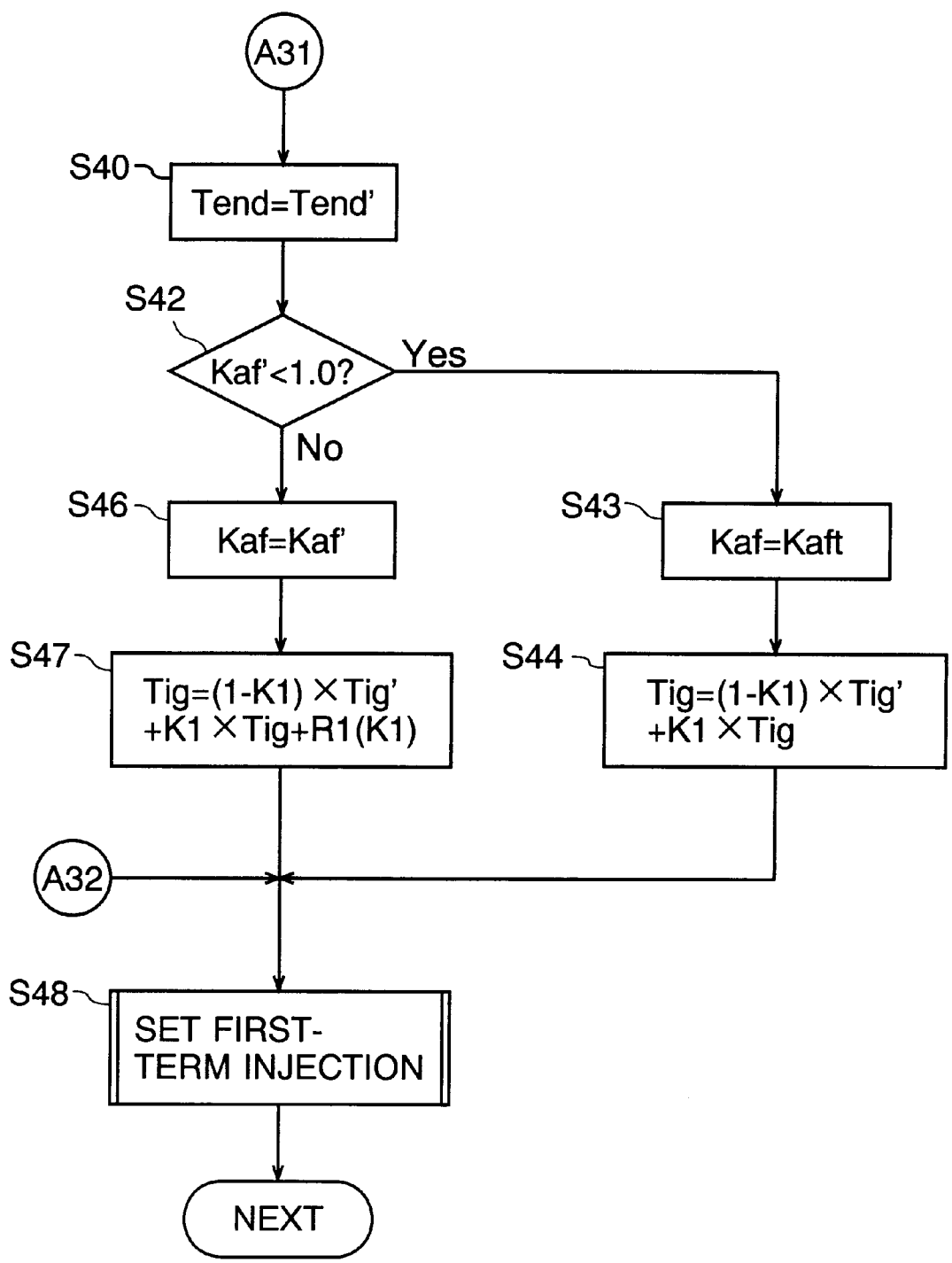
FIG. 18 is another part of the flowchart for the combustion parameter setting routine, continued from the flowchart of FIG. 17.

After the individual combustion parameter values are set in this manner, Step S48 of FIG. 18 is executed, whereupon the engine control in the first-term injection mode is carried out.

When the tailing coefficient value K2 gradually increases to 1.0, the result of decision in Step S50 of FIG. 19 becomes Yes, whereupon Step S58 is executed. In Step S58, the mode for the first-term mode control, whether the first-term lean mode or the S-F/B mode, is determined, and the alternative control is executed depending on the result of the determination. If the S-F/B mode is then discriminated, the ECU 70 makes preparations for the transition to the second-term lean mode control or the first-term lean mode control in Step S70 of FIG. 21. The preparations for the transition include setting the initial values of control variables for the transition and previous storage of the various values, including the correction factor value Kaf, combustion parameter values Tig, Tend, and EV, target average effective pressure Pe, etc., calculated in the present control mode. The control variables for the transition include a dead period counter Td1 and an EGR delay counter CNT1. A value f1 (Ne, Pe), which is determined depending on the target average effective pressure Pe and the engine speed Ne, and a value XN1 are set as initial values in the former and latter counters Td1 and CNT1, respectively. These transition control variables and the like are updated for new values every time the control in the S-F/B mode is repeated and Step S70 is repeatedly executed.

When the setup of the initial values of the control variables and the like in Step S70 is completed, he program advances to Step S72, whereupon it is determined whether or not the tailing coefficient value KL used in the control for the transition from the first-term lean mode to the S-F/B mode is at 1.0. At present, the transition to the S-F/B mode is completed, and the control in this mode is being carried out, so that the coefficient value KL is at 1.0, and the program advances to Step S74 skipping Step S73. In Step S74, a count value in an EGR delay counter CNT3 (mentioned later) is discriminated. This counter CNT3 is counted down continually in the aforementioned crank interruption routine shown in FIG. 25. Even though the counter CNT3 is once set at its initial value, therefore, it ought to be counted down to 0 except during the control for the transition from the first-term lean mode to the S-F/B mode, which will be mentioned later. As long as the S-F/B mode after the completion of the mode transition is being executed, after all, the result of decision in Step S74 is also No, so that the program advances to Step S48 of FIG. 18 mentioned before, skipping Step S75, whereupon the control in the first-term injection mode is executed. Steps S73 and S75 will be described in connection with the control of the transition from the first-term lean mode to the S-F/B mode (mentioned later).

The following is a description of the control for the transition from the present S-F/B mode back to the second-term lean mode.

If the engine operation in the second-term lean region is discriminated in Step S1 of FIG. 14 during the S-F/B mode control (at time t6 of FIG. 27), the tailing coefficient K1 is set at 0 in Step S2. A request for the transition to the second-term mode is discriminated in Step S10 of FIG. 15, and the individual combustion parameter values and the like are computed in Step S12 mentioned before. Thereafter, Step S20 of FIG. 16 is executed, whereupon it is determined whether or not K1 is equal to 1.0. Immediately after the second-term lean mode is discriminated, the tailing coefficient value K1 is at 0, as mentioned before, so that the result of decision in Step S20 is No. Thereupon, Step S24 and the subsequent steps are executed to make a transition from the S-F/B mode to the second-term lean mode. The tailing coefficient K1 becomes 1.0 when the transition process is completed. Before this is done, an infinitesimal value ΔK1 smaller than 1.0 is added repeatedly to the value K1 according to the aforesaid timer routine shown in FIGS. 23 and 24. A transition process corresponding to the tailing coefficient value K1 is carried out until the coefficient value K1 becomes 1.0.

In Step S24, it is determined whether or not a value in the dead period counter Td1 is 0, that is, whether or not a dead period corresponding to the initial value f1(Ne, Pe) in the counter Td1 is over. The initial value f1(Ne, Pe) in the counter Td1 is set by executing Step S70 of FIG. 21 mentioned before during the S-F/B mode control immediately before the transition, and the counter value Td1 is equal to this initial value f1(Ne, Pe) at the point of time when Step S24 is executed immediately after the mode transition. Accordingly, the result of decision in Step S24 is No, and the program advances to Step S25, whereupon a predetermined value ΔTd1 is subtracted from the counter value Td1. In Step S26, the tailing coefficient value K1 is readjusted to 0. Steps S25 and S26 are repeatedly executed until the aforesaid dead period is over (from time t6 to time t7 of FIG. 27), and the tailing coefficient value K1 is kept at 0 during this period.

Figure 17:
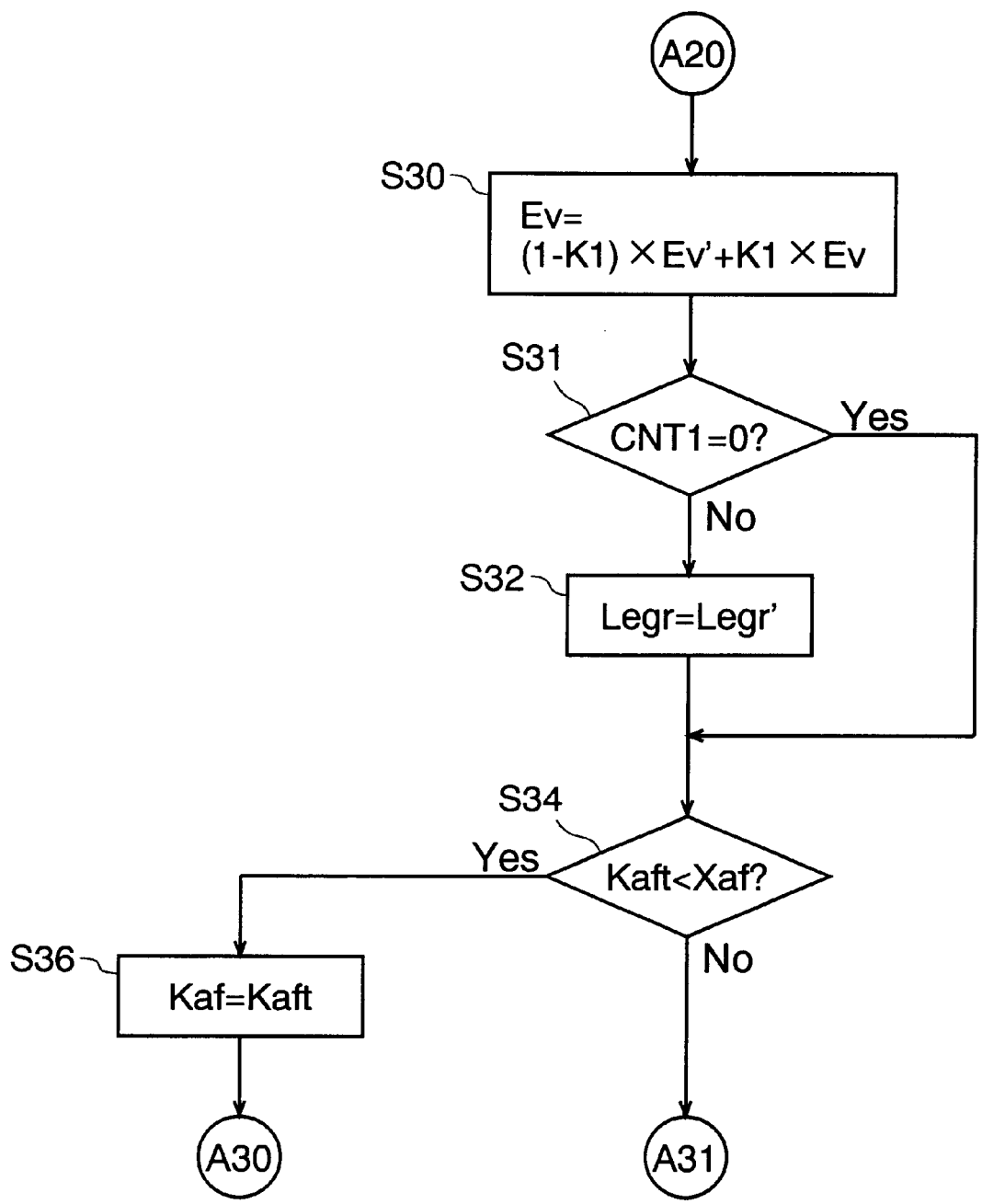
FIG. 17 is another part of the flowchart for the combustion parameter setting routine, continued from the flowchart of FIG. 16.

Then, the ECU 70 executes Steps S28 and Step S30 of FIG. 17, thereby computing the tentative target air-fuel ratio correction factor value Kaft and the volumetric efficiency Ev according to the following equations (F6) and (F7):

$$Kaft = (1-K1) \cdot Kaf' + K1 \cdot Kaf, \qquad (F6)$$

$$Ev = (1-K1) \cdot Ev' + K1 \cdot Ev. \qquad (F7)$$

Figure 21:
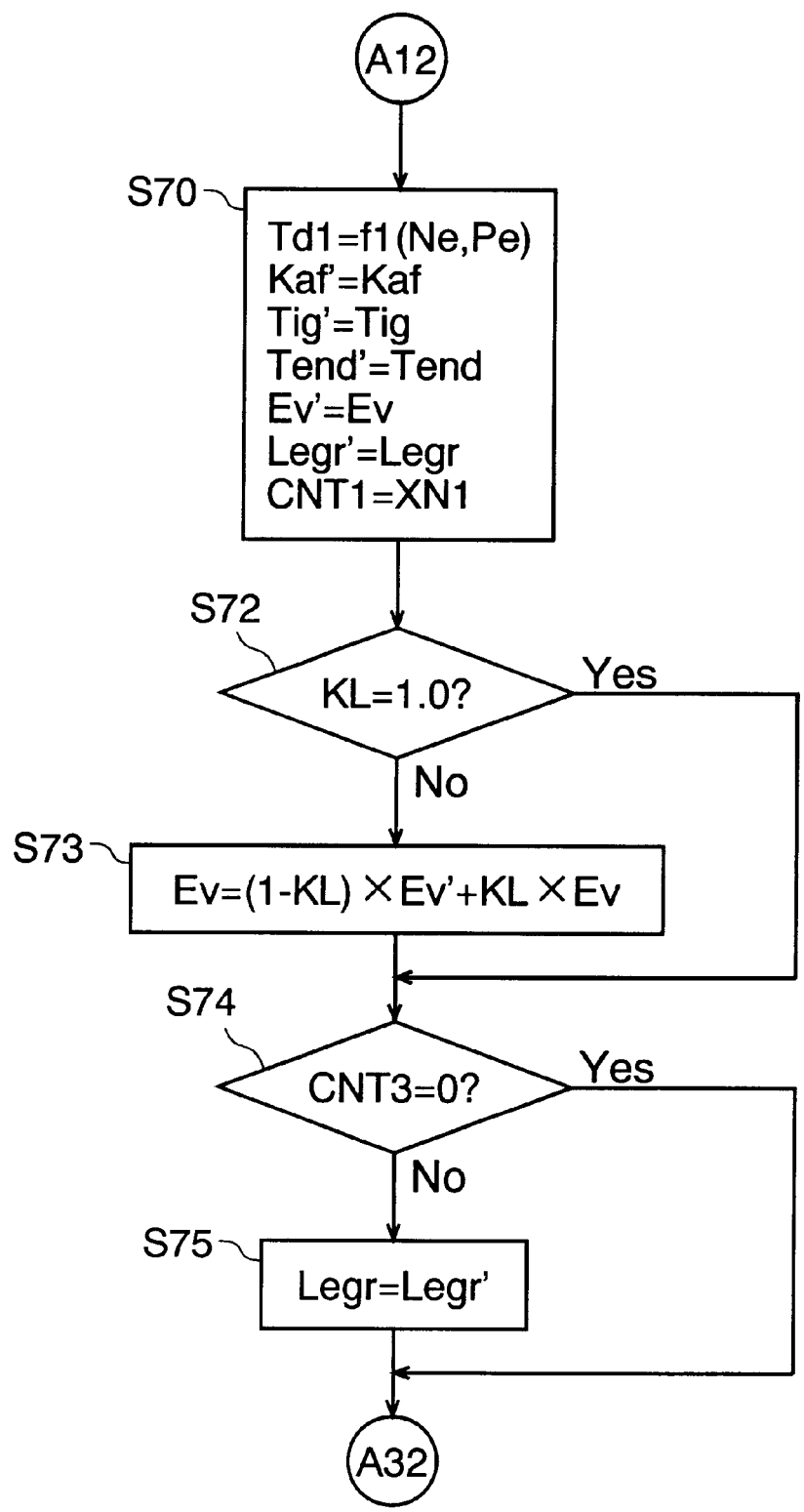
FIG. 21 is another part of the flowchart for the combustion parameter setting routine, continued from the flowchart of FIG. 19.

In the above equations (F6) and (F7), which resemble the aforesaid equations (F3) and (F4), respectively, Kaf' and Ev' are the target air-fuel ratio correction factor value and volumetric efficiency, respectively, which are computed last in the S-F/B mode control and stored as the values Kaf' and Ev', respectively, when Step S70 of FIG. 21 mentioned before is executed last. The final terms Kaf and Ev in the respective right sides of the equations are values that are calculated individually in the present second-term lean mode process.

Thus, during the period in which the coefficient value K1 is at 0 (dead period from time t6 to time t7 shown in FIG. 27), the tentative target air-fuel ratio correction factor value Kaft and the volumetric efficiency Ev are kept maintained at their respective preceding values, that is, the values set last in the S-F/B mode control. As the coefficient value K1 increases from 0 toward 1.0, thereafter, the values Kaft and Ev are set at values weighed corresponding to the value K1. When the coefficient value K1 attains 1.0, moreover, the values Kaft and Ev are set at values calculated for the second-term lean mode. As the tailing coefficient value K1 changes in this manner, the target air-fuel ratio correction value Kaf during the mode transition changes in the manner mentioned later, and the volumetric efficiency Ev gradually linearly changes its value during the period between times t7 and t10, as shown in FIG. 27. On and after time t10, the efficiency Ev is kept at the value calculated for the second-term lean mode.

Then, the ECU 70 advances to Step S31 of FIG. 17, whereupon it determines whether or not the EGR delay counter CNT1 is counted down to 0. This counter CNT1, which is provided for the purpose of delaying the EGR control in the second-term lean mode, prevents an excessive EGR state during the control for the transition from the S-F/B mode to the second-term lean mode in which plenty of EGR is introduced. If it is concluded that the EGR delay counter value CNT1 is not counted down to 0 yet, Step S32 is executed, whereupon the valve opening Legr of the EGR valve 45 is rewritten to be at a value Legr', and the value set last in the S-F/B mode control is maintained for a predetermined period (period from time t6 to t9 shown in FIG. 27, corresponding to the initial value XN1 in the counter). The period corresponding to the initial value XN1 is set in consideration of an intentional delay in the transition of the EGR quantity to a value suited for the second-term lean mode.

If the result of decision in Step S31 is Yes (or if an EGR delay period is over), Step S32 mentioned before is skipped, and values calculated by the EGR quantity setting means 70p are used in the second-term lean mode control afterward (on and after time t9 of FIG. 27).

Subsequently, the program advances to Step S34, hereupon it is determined whether or not the tentative target air-fuel ratio correction factor value Kaft computed according to equation (F6) mentioned before is less than the value Xaf. As described in connection with Step S62 of FIG. 20, this discrimination value Xaf is set at a value such that a misfire is caused if the mixture is fuel-rich in the second-term lean mode, that is, at a value equivalent to about 20 (theoretical air-fuel ratio: 14.7) in terms of the air-fuel ratio. In some cases, however, the value Xaf need not be set on the same level as the value set in Step S62. If the target air-fuel ratio correction factor value Kaf is less than the value Xaf, then it implies that the engine output can be controlled by the fuel injection quantity adjustment according to the second-term lean mode, and whether or not the second-term lean mode is allowed to be started is determined by the decision in Step S34. If the target air-fuel ratio correction factor value Kaf is not less than the value Xaf, the S-F/B mode control continues to be executed.

During the period in which the result of decision in Step S34 is No, that is, before the tentative target air-fuel ratio correction factor value Kaft reaches the value Xaf (from time t7 to time t8 shown in FIG. 27), the ECU 70 rewrites the injection end timing Tend to be at the last value Tend', in step S40 of FIG. 18, that is calculated in the S-F/B mode process, and keeps it at that value. In order to determine whether the control mode prior to the discrimination of the transition request is the first-term lean mode or the S-FIB mode, it is determined whether or not the correction factor value Kaf', set and stored immediately before the discrimination of the transition request, is less than 1.10 (Step S42). In the case where the first-term lean mode control is executed, the correction factor Kaf is always set at a value less than 1.0.

If the result of decision in Step S42 is No, that is, if the control mode prior to the discrimination of the transition request is the S-F/B mode, the target air-fuel ratio correction factor value Kaf is kept at the value Kaf', obtained immediately before the discrimination of the transition request, in Step S46. The adjustment of the engine output made by continuing the execution of the S-F/B mode control is controlled in accordance with the ignition timing, and the program advances to Step S47, whereupon the ignition timing Tig is replaced by a value computed according to the following equation (F5):

$$Tig=(1-K1)\cdot Tig'+K1\cdot Tig+R1(K1), \tag{F8}$$

where R1(K1) is a retard value (second correction factor) set to prevent a sudden change of the output that is involved in the mode transition. R1(K1) Is set at a value that gradually increases as a function of the tailing coefficient value K1 (first correction factor), as indicated by a change during the period between times t7 and t8 of FIG. 27, and is set at a maximum retard value at time t8. When the transition to the second-term lean mode is completed (on and after time t8 of FIG. 27), R1(K1) is set at a retard value 0. As the timing (time t8 of FIG. 27) for the transition to the second-term lean mode is approached in this manner, the engine output is adjusted by increasing the retard value for the ignition timing, whereby a sudden change of the output attributable to the start of the second-term lean mode control is prevented.

After the individual combustion parameter values are set in this manner, Step S48 is executed, whereupon the engine control in the first-term injection mode is carried out.

If it is concluded in Step S42 of FIG. 18 that the control mode prior to the discrimination of the transition request is the first-term lean mode (or if the result of decision is Yes), the ECU 70 executes Steps S43 and S44. Both of Steps S43 and S44 are executed during the transition from the first-term lean mode to the second-term lean mode, and the details of these steps will be described later.

When the tailing coefficient value K1 increases so that the tentative target air-fuel ratio correction factor value Kaft becomes less than the discrimination value Xaf during the control for the transition from the S-F/B mode to the second-term lean mode, the result of decision in Step S34 of FIG. 17 becomes Yes, so that the program advances to Step S36 without the execution of Steps S40, S46 and S47 mentioned before. As a result, the target air-fuel ratio correction factor value Kaf is set at the tentative target air-fuel ratio correction factor value Kaft (Kaf=Kaft) without being kept at the value for the S-F/B mode control any longer. At the same time, as for the fuel injection end period Tend and the ignition timing Tig, the values calculated for the second-term lean mode are used directly. As seen from the change of the correction factor value at time t8 shown in FIG. 27, in this case, the target air-fuel ratio correction factor value Kaf changes at a stroke in a stepwise fashion from a value close to the theoretical air-fuel ratio and suitable to the S-F/B mode into that value which matches the second-term lean mode and which can never cause a rich misfire, whereupon the control makes a transition to the second-term lean mode. Thus, when the engine output, gradually adjusted by the ignition timing adjustment during the mode transition control, becomes substantially equal to the output obtained at the air-fuel ratio of about 20, i,e., the rich misfire limit for the second-term lean mode control, the target air-fuel ratio is suddenly changed at a stroke into the rich misfire limit air-fuel ratio for the second-term lean mode. As this is done, the fuel injection end period Tend and the ignition timing Tig are also changed into suitable values for the second-term lean mode control (at time t8 of FIG. 27).

After the individual combustion parameter values are set in this manner, Step S22 of FIG. 16 is executed, whereupon the engine control in the second-term lean mode is carried out.

When the tailing coefficient value K1 gradually increases to 1.0, then it is concluded that the transition from the S-F/B mode to the second-term lean mode is completed, whereupon the result of decision in Step S20 of FIG. 16 mentioned before becomes Yes. After preparations for the transition to the first-term mode control are made in Step S21, in this case, the engine control in the second-term lean mode is carried out in Step S22, and Steps S21 and S22 are repeatedly executed.

The following is a description of the control for the transition from the second-term lean mode to the first-term lean mode.

When a request for the transition from the second-term lean mode to the first-term lean mode is made after the engine operation state is changed, the tailing coefficient K2 is set at 0 in Step S6 of FIG. 14 mentioned before (at time t20 of FIG. 28), as shown in FIG. 26. In this case, the ECU 70 executes Step S14 after discriminating the first-term mode in Step S10 of FIG. 15, whereupon it computes the various combustion parameter values Pe, Kaf, Tig, Tend, Legr, Ev, etc. in the same manner as in the case of the aforementioned transition to the S-F/B mode control.

During the control for the transition to the first-term lean mode control, as in the case of the aforesaid S-F/B mode control, the changeover switches 70a and 70b shown in FIG. 6 are shifted to the first-term mode side at a predetermined timing (mentioned later), and the target average effective pressure Pe is computed in accordance with the suction pipe pressure Pb and the engine speed Ne with reference to the target average effective pressure map 70r as the second calculation map. When the target average effective pressure Pe is calculated, moreover, the data on this target average effective pressure Pe is fed to the target air-fuel ratio calculation map 70j, injection end timing setting means 70m, ignition timing setting means 70n, and EGR quantity setting means 70p, individually, whereupon the target A/F. Tend, Tig, and Legr are computed by using the maps corresponding to the operation state in the first-term lean mode. Also, Ev is computed in accordance with the data on the target average effective pressure Pe.

When the calculation of the various combustion parameter values and the like is finished in the aforesaid manner, the program advances to Step S50 of FIG. 19, whereupon it is determined whether or not the tailing coefficient K2 is at 1.0. Immediately after he request is made for the transition to the first-term lean mode, this tailing coefficient K2 is set at 0, as mentioned before. Accordingly, the result of decision in Step S50 is No, so that Step S51 and the subsequent steps are executed to make a transition from the second-term lean mode to the first-term lean mode.

In Step S51, as in the case of the control for the transition from the second-term lean mode to the S-F/B mode, it is determined whether or not the value in the dead period counter Td2 is 0, that is, whether or not the dead period corresponding to the initial value f2(Ne, Pe) in the counter Td2 is over. The initial value f2(Ne, Pe) in the counter Td2 is set by executing Step S21 of FIG. 16 mentioned before, and is equal to the initial value f2(Ne, Pe) immediately after the mode transition request is made. Accordingly, the result of decision in Step S51 is No, and the program advances to Step S52, whereupon the predetermined value ΔTd2 is subtracted from the counter value Td2. In Step S53, the tailing coefficient value K2 is readjusted to 0. Steps S52 and S53 are repeatedly executed until the aforesaid dead period (period from time t20 to time t21 shown in FIG. 28) is over, and the tailing coefficient value K2 is kept at 0 during this period.

Figure 28:
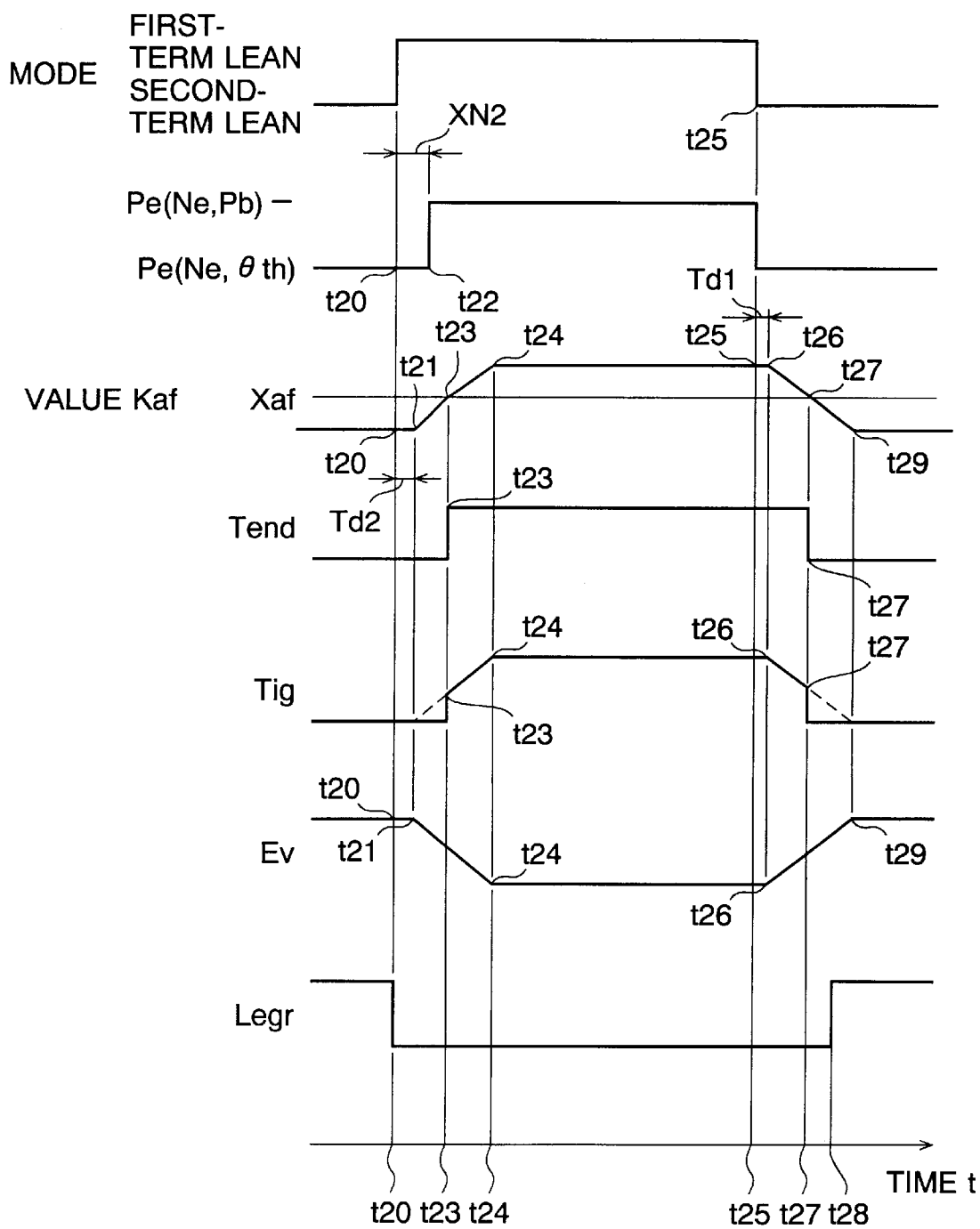
FIG. 28 is a timing chart showing changes of the various control variables and combustion parameter values with time during control for the mode change between the second-term lean mode and a first-term lean mode.

Subsequently, the ECU 70 executes Steps S55 and S57, thereby computing the tentative target air-fuel ratio correction factor value Kaft and the volumetric efficiency Ev according to the aforesaid equations (F3) and (F4), respectively. During the period in which the coefficient value K2 is at 0 (dead period from time t20 to time t21 shown in FIG. 28), the tentative target air-fuel ratio correction factor value Kaft and the volumetric efficiency Ev are set at their respective preceding values, that is, the values calculated last in the second-term lean mode process. When the coefficient value K2 increases, the values Kaft and Ev are set at values weighed corresponding to the value K2. When the coefficient value K2 attains 1.0, the values Kaft and Ev are set at values calculated for the first-term lean mode process. As the tailing coefficient value K2 changes in this manner, the target air-fuel ratio correction value Kaf and the volumetric efficiency Ev at the time of the mode transition gradually linearly change their values during the period from time t21 to time t24, as shown in FIG. 28, and are kept at values calculated for the first-term lean mode on and after time t24.

Then, the ECU 70 discriminates the boost pressure delay counter value CNT2 in Step S60 of FIG. 20 mentioned before. If it is concluded that the boost pressure delay counter value CNT2 is not counted down to 0 yet (the result of decision in Step S60 is No), Step S61 is executed, whereupon the target average effective pressure Pe is rewritten to be at the value Pe', and the value calculated last in the second-term lean mode control is maintained for a predetermined period (period from time t20 to t22 shown in FIG. 28). The change of the map for the calculation of the target average effective pressure Pe is delayed with use of the boost pressure delay counter value CNT2. Depending on the engine, the period corresponding to the initial value XN2 may be adjusted to a value different from the aforesaid set value for the S-F/B mode.

If the result of decision in Step S60 is Yes (or if the boost pressure delay period is over), the values calculated according to the target average effective pressure map 70r of FIG. 6 are used in the first-term lean mode control afterward (on and after time t22 of FIG. 27).

Then, the program advances to Step S62, whereupon it is determined whether or not the tentative target air-fuel ratio correction factor value Kaft computed according to equation (F3) mentioned before is less than the value Xaf. If the target air-fuel ratio correction factor value Kaf is less than the value Xaf, the target air-fuel ratio correction factor value Kaf is set at the value corresponding to the tailing coefficient K2, that is, the tentative target air-fuel ratio correction factor value Kaft (Step S63) until the tentative target air-fuel ratio correction factor value Kaft reaches the value Xaf (until time t23 shown in FIG. 28). In order to execute the second-term lean mode control, moreover, the ignition timing Tig is kept at the last value Tig' that is calculated in the second-term lean mode (Step S64), and the fuel injection end period Tend is also kept at the last value Tend' that is calculated in the second-term lean mode (Step S65).

After the individual combustion parameter values are readjusted in this manner, Step S22 of FIG. 16 mentioned before is executed, whereupon the engine control in the second-term injection mode is carried out.

The above processes are executed in the same manner as in the case of the control for the transition from the second-term lean mode to the S-F/B mode. In the control for the transition from the second-term lean mode to the first-term lean mode, however, when the tailing coefficient value K2 increases so that the tentative target air-fuel ratio correction factor value Kaft exceeds the discrimination value Xaf, control different from the control for the transition to the S-FIB mode is executed in the following manner.

In the first-term lean mode, the air-fuel ratio can be set at a value leaner than the theoretical air-fuel ratio and richer than the rich misfire limit value for the second-term lean mode. Thus, the engine output can be controlled by adjusting the air-fuel ratio, whereby a sudden change of the output can be prevented during the transition. If the tentative target air-fuel ratio correction factor value Kaft exceeds the discrimination value Xaf so that the result of decision in Step S62 is No, therefore, the program advances to Step S66, whereupon the first-term lean mode is discriminated. Thereafter, Steps S68 and S69 are executed to calculate the target air-fuel ratio correction factor value Kaf and the ignition timing Tig. The target air-fuel ratio correction factor value Kaf is rewritten to be the aforesaid tentative target air-fuel ratio correction factor value Kaft, while the ignition timing Tig is replaced by a value computed according to the following equation (F9). Even though the tentative target air-fuel ratio correction factor value Kaft exceeds the aforesaid discrimination value Xaf, therefore, the target air-fuel ratio correction factor value Kaf is set at a value corresponding to the tailing coefficient value K2, and continues to increase gradually, as shown in FIG. 28. When the value K2 reaches 1.0, the value Kaf is changed into the value calculated for the first-term lean mode.

$$\text{Tig}=(1-K2)\cdot\text{Tig}'+K2\cdot\text{Tig}. \tag{F9}$$

In the control for the transition to the first-term lean mode, moreover, the retard value R2(K2) used in the control for the transition to the S-F/B mode is not set, and the ignition timing Tig is set at a value corresponding to the tailing coefficient value K2. This is done because a sudden change of the output can be prevented by adjusting the air-fuel ratio in the control for the transition to the first-term lean mode, unlike the control for the transition to the S-F/B mode. Accordingly, the ignition timing Tig suddenly changes at time t23, as shown in FIG. 28, and thereafter, gradually changes toward a value suited for the first-term lean mode control, and is set at the value calculated in the first-term lean mode on and after time t24 when the transition to the first-term lean mode is completed.

If the tentative target air-fuel ratio correction factor value Kaft exceeds the discrimination value Xaf, moreover, Step S65 mentioned before is not executed, so that the value calculated in the first-term lean mode process is used directly for the fuel injection end period Tend. As a result, according to the control for the transition to the first-term lean mode, the first-term lean mode control is executed when the tentative target air-fuel ratio correction factor value Kaft exceeds the discrimination value Xaf. At this point in time, the fuel injection end period Tend is changed at once into the value calculated in the first-term lean mode (on and after time t23 of FIG. 28), and the ignition timing Tig gradually increases in accordance with the tailing coefficient value K2 (from time t23 to time t24 of FIG. 28).

After the individual combustion parameter values are set in this manner, Step S48 of FIG. 18 is executed, whereupon the engine control in the first-term injection mode is carried out.

When the tailing coefficient value K2 gradually increases to 1.0, the result of decision in Step S50 of FIG. 19 becomes Yes, and Step S58 is executed. In Step S58, it is concluded that the present control mode is the first-term lean mode. Accordingly, the ECU 70 makes preparations for the transition to the second-term lean mode control or to the S-F/B mode control in Step S80 of FIG. 22. The preparations for the transition include setting the initial values of control variables for the transition and previous storage of the various values, including the correction factor value Kaf, combustion parameter values Tig, Tend, and EV, target average effective pressure Pe, etc., calculated in the present control mode. The control variables for the transition include the dead period counter Td1 and the EGR delay counter CNT3 (mentioned later). The value f1(Ne, Pe), which is determined depending on the target average effective pressure Pe and the engine speed Ne, and a value XN3 are set as initial values in the former and latter counters Td1 and CNT3, respectively. These transition control variables and the like are updated for new values every time the control in first-term lean mode is repeated and Step S80 is repeatedly executed. In Step S80, the initial value in the EGR delay counter value CNT1, which is used in the control for the aforesaid transition from the S-F/B mode to the second-term lean mode, is not set.

When the setup of the initial values of the control variables and the like in Step S80 is completed, the program advances to Step S82, whereupon it is determined whether or not the tailing coefficient value KS used in the control for the transition from the S-F/B mode to the first-term lean mode is at 1.0. At present, the transition to the first-term lean mode is completed, and the control in the first-term lean mode is being carried out, so that the coefficient value KS is at 1.0, and the program advances to Step S48 of FIG. 18 mentioned before, skipping Steps S84 and S86, whereupon the control in the first-term injection mode is executed. The skipped steps, Steps S84 and S85, are executed during the transition from the S-F/B mode to the first-term lean mode, and the details of these steps will be described later.

The following is a description of the control for the transition from the first-term lean mode to the second-term lean mode.

If it is concluded in Step S1 of FIG. 14 that a request for the transition to the second-term lean mode is made after the engine operation state is changed during the first-term lean mode control (at time t25 of FIG. 28), the tailing coefficient K1 is set at 0 in Step S2. If it is concluded in Step S10 of FIG. 15 that the present engine operation state corresponds to the second-term mode, moreover, the various combustion parameter values and the like are computed in Step S12 mentioned before, and it is then determined in Step S20 of FIG. 16 whether or not K1 is equal to 1.0. Since the tailing coefficient value K1 is at 0 immediately after the second-term lean mode is discriminated, the result of decision in Step S20 is No, so that Step S24 and the subsequent steps are executed to make a transition from the first-term lean mode to the second-term lean mode.

In Step S24, it is determined whether or not the value in the dead period counter Td1 is 0, that is, whether or not the dead period corresponding to the initial value f1(Ne, Pe) in the counter Td1 is over. The initial value f1(Ne, Pe) in the counter Td1 is set by executing Step S80 of FIG. 22 mentioned before during the first-term lean mode control immediately before the transition, and the counter value Td1 is equal to this initial value f1(Ne, Pe) at the point of time when Step S24 is executed immediately after the mode transition request. Accordingly, the result of decision in Step S24 is No, and the program advances to Step S25, whereupon the predetermined value ΔTd1 is subtracted from the counter value Td1. In Step S26, the tailing coefficient value K1 is readjusted to 0. Steps S25 and S26 are repeatedly executed until the aforesaid dead period is over (until time t26 of FIG. 28), and the tailing coefficient value K1 is kept at 0 during this period.

Subsequently, the ECU 70 executes Step S28 and Step S30 of FIG. 17, thereby computing the tentative target air-fuel ratio correction factor value Kaft and the volumetric efficiency Ev according to the aforesaid equations (F6) and (F7), respectively, as in the case of the aforesaid control for the transition from the S-F/B mode to the second-term lean mode. In this case, Kaf' and Ev' in the aforesaid equations (F6) and (F7) are the target air-fuel ratio correction factor value and volumetric efficiency, respectively, computed last in the first-term lean mode process and stored as the values Kaf' and Ev', respectively, when Step S80 of FIG. 22 mentioned before is executed last.

Thus, the tentative target air-fuel ratio correction factor value Kaft and the volumetric efficiency Ev are set at their respective preceding values, that is, the values set last in the first-term lean mode control, during the period in which the coefficient value K1 is at 0 (dead period from time t25 to time t26 shown in FIG. 28). When the coefficient value K1 increases, the values Kaft and Ev are set at values weighed corresponding to the value K1. When the coefficient value K1 attains 1.0, the values Kaft and Ev are set at values set in the second-term lean mode control. As the tailing coefficient value K1 changes in this manner, the target air-fuel ratio correction value Kaf and the volumetric efficiency Ev at the time of the mode transition gradually linearly change their values during the period from time t26 to time t29 of FIG. 28, and are kept at values set in the second-term lean mode process on and after time t29.

Then, in Step S31 of FIG. 17, the ECU 70 determines whether or not the EGR delay counter CNT1 is counted down to 0. This counter CNT1, which is provided for the purpose of delaying the EGR control in the second-term lean mode, prevents excessive EGR during the control for the transition from the first-term lean mode to the second-term lean mode in which plenty of EGR is introduced. If it is concluded that the EGR delay counter value CNT1 is not counted down to 0 yet, Step S32 is executed, whereupon the valve opening Legr of the EGR valve 45 is rewritten to be at a value Legr', and the value set last in the first-term lean mode control is maintained for a predetermined period (period from time t25 to t28 shown in FIG. 28, corresponding to the initial value XN1 in the counter). The period corresponding to the initial value XN1 is set in consideration of the intentional delay in the transition of the EGR quantity to the value suited for the second-term lean mode. If the result of decision in Step S31 is Yes (or if the EGR delay period is over), Step S32 mentioned before is skipped, and the values calculated by the EGR quantity setting means 70p are used in the second-term lean mode control afterward (on and after time t28 of FIG. 28).

Subsequently, the program advances to Step S34, whereupon it is determined whether or not the tentative target air-fuel ratio correction factor value Kaft computed according to equation (F6) mentioned before is less than the value Xaf, whereby it is determined whether or not the second-term lean mode is allowed to be started. If the result of decision in Step S34 is No, that is, if the target air-fuel ratio correction factor value Kaf is not less than the value Xaf, the first-term lean mode control continues to be executed. Thus, during the period in which the result of decision in Step S34 is No, that is, before the tentative target air-fuel ratio correction factor value Kaft reaches the value Xaf (from time t26 to time t27 shown in FIG. 28), the ECU 70 rewrites the injection end timing Tend to be at the last value Tend' that is calculated in the first-term lean mode, and keeps it at that value (during period from time t26 to time t27 shown in FIG. 28), at Step S40 of FIG. 18. In order to determine whether the control mode before the discrimination of the transition request is the first-term lean mode or the S-F/B mode, it is determined whether or not the correction factor value Kaf' set and stored immediately before the discrimination of the transition request is less than 1.0.

Since the control for the transition from the first-term lean mode is being executed, the result of the present decision in Step S42 is Yes, so that the target air-fuel ratio correction factor value Kaf is rewritten to be at the tentative target air-fuel ratio correction factor value Kaft in Step S43. Depending on the tailing coefficient value, moreover, the ignition timing Tig is replaced by a value computed according to the following equation (F10). As a result, the target air-fuel ratio correction factor value Kaf and the ignition timing Tig gradually change in accordance with the tailing coefficient value K1 during the period from time t26 to time t27 of FIG. 28.

$$Tig=(1-K1)\cdot Tig'+K1\cdot Tig. \tag{F10}$$

During the transition from the S-F/B mode to the second-term lean mode, the retard value R1(K1) is provided to prevent a sudden change of the output that is involved in the transition. However, the above equation (F10) does not contain the retard value R1(K1). In the case of the transition from the first-term lean mode to the second-term lean mode, the output is controlled by adjusting the air-fuel ratio, so that correction by means of the retard value R1(K1) is unnecessary, and the ignition timing Tig is set at a value corresponding to the tailing coefficient value K1.

After the individual combustion parameter values are set in this manner, Step S48 is executed, whereupon the engine control in the first-term injection mode is carried out.

When the tailing coefficient value K1 increases so that the tentative target air-fuel ratio correction factor value Kaft becomes less than the discrimination value Xaf, the result of decision in Step S34 of FIG. 17 becomes Yes, so that the program advances to Step S36 without the execution of Steps S40 and S44 mentioned before. As a result, the target air-fuel ratio correction factor value Kaf is set at the tentative target air-fuel ratio correction factor value Kaft (Kaf=Kaft). As for the fuel injection end period Tend and the ignition timing Tig, the values calculated for the second-term lean mode process are used directly. As seen from the change at time t27 of FIG. 28, in this case, the fuel injection end period Tend and the ignition timing Tig are changed stepwise into the suitable values for the second-term lean mode control.

After the individual combustion parameter values are set in this manner, Step S22 of FIG. 16 is executed, whereupon the engine control in the second-term injection mode is carried out.

When the tailing coefficient value K1 gradually increases to 1.0, then it is concluded that the transition to the second-term lean mode is completed, whereupon the result of decision in Step S20 of FIG. 16 mentioned before becomes Yes. After the preparations for the transition to the first-term mode control are made in Step S21, the engine control in the second-term injection mode is carried out in Step S22, and Steps S21 and S22 are repeatedly executed thereafter.

The following is a description of the control for the transition from the first-term lean mode to the S-F/B mode. When a request for the mode transition is made, the tailing coefficient KL is set at 0 in Step S8 of FIG. 14 mentioned before (at time t30 of FIG. 29), as shown in FIG. 26. In this case, the ECU 70 advances to Step S14 after discriminating the first-term mode in Step S10 of FIG. 15, whereupon it computes the aforementioned various combustion parameter values Pe, Kaf, Tig, Tend, Legr, Ev, etc.

When the calculation of the various combustion parameter values and the like is finished, the program advances to Step S50 of FIG. 19, whereupon it is determined whether or not the tailing coefficient K2 is at 1.0. Since the present loop is a loop immediately after the request for the transition from the first-term lean mode to the S-F/B mode, this tailing coefficient K2 ought to be at 1.0, so that the result of decision in Step S50 is Yes, whereupon the program advances to Step S58. Then, after discriminating the S-F/B mode in Step S58, the ECU 70 advances to Step S70 of FIG. 21, whereupon it makes the aforesaid preparations for the transition to the second-term lean mode control or to the first-term lean mode control. After the preparations for the transition are finished, the program advances to Step S72.

Since the tailing coefficient value KL is just set at 0 immediately after the discrimination of the request for the transition to the S-F/B mode, the result of decision in Step S72 is No, so that the volumetric efficiency Ev is computed in Step S73 according to the following equation (F11):

$$Ev=(1-KL)\cdot Ev'+KL\cdot Ev. \tag{F11}$$

Figure 22:
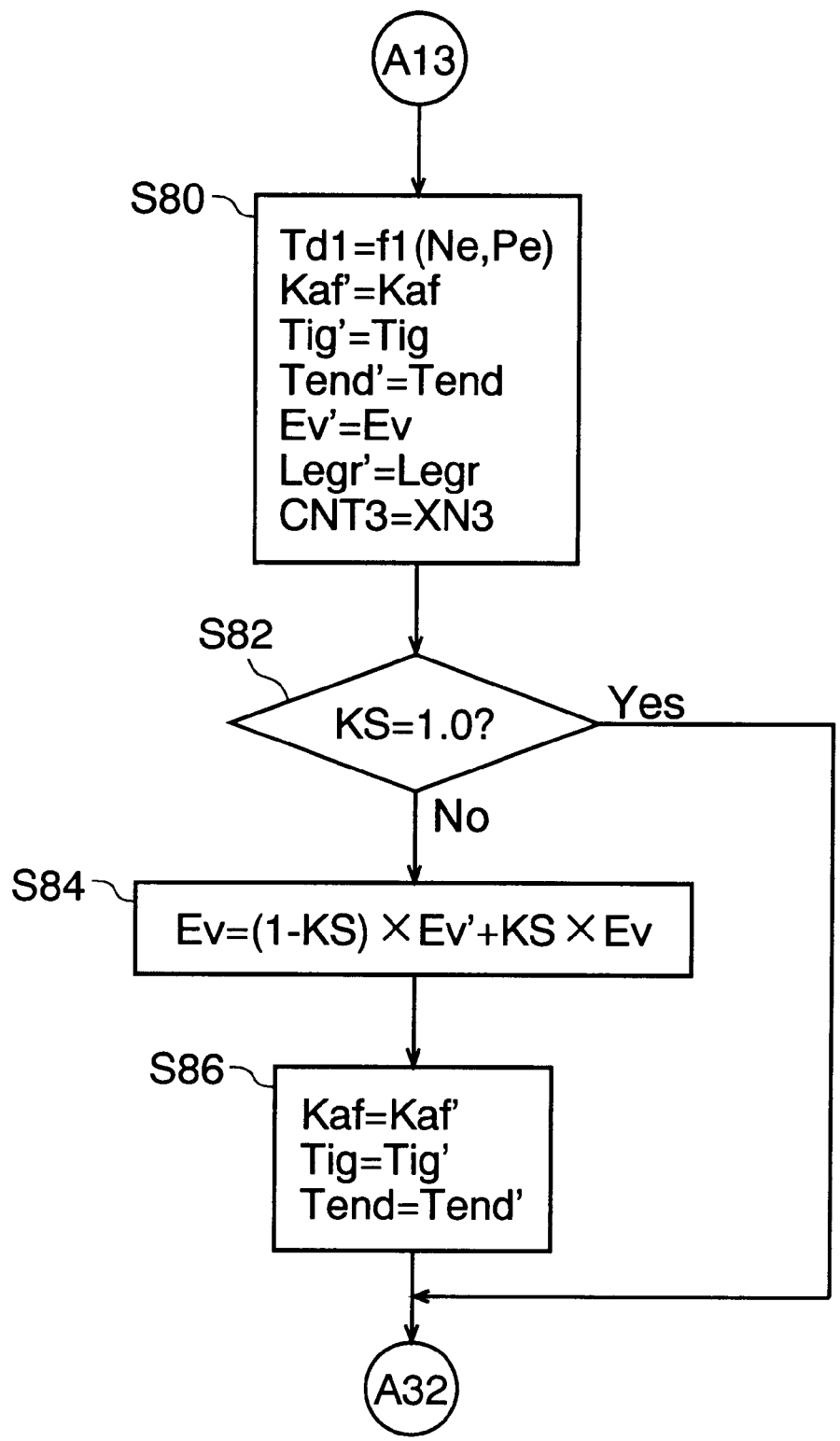
FIG. 22 is the remaining part of the flowchart for the combustion parameter setting routine, continued from the flowchart of FIG. 19.

In the above equation (F11), which resembles the aforesaid equation (F4), Ev' is the volumetric efficiency calculated last in the first-term lean mode control and stored as the value Ev' when Step S80 of FIG. 22 mentioned before is executed last. The final term Ev in the right side of the above equation is a value that is calculated in the present S-F/B mode process.

Thus, when the coefficient value KL increases, the volumetric efficiency value Ev is set at a value weighed corresponding to the value KL. When the coefficient value KL attains 1.0, moreover, the value Ev is set at a value calculated in the S-F/B mode process. As the tailing coefficient value KL changes in this manner, the volumetric efficiency Ev for the mode transition gradually linearly changes its value during the period between times t30 and t32 of FIG. 29, and is kept at the value calculated for the S-F/B mode on and after time t32.

Then, in Step S74 of FIG. 21, the ECU 70 determines whether or not the EGR delay counter CNT3 is counted down to 0. This counter CNT3, which is provided for the purpose of delaying the EGR control in the S-F/B mode, serves to stabilize the control during the mode transition. The counter value CNT3 is readjusted to the initial value XN3 in Step S80 of FIG. 22 mentioned before every time the first-term lean mode control is repeatedly executed. Every time the crank angle sensor 17 detects a predetermined crank angle position, moreover, Step S100 of the crank interruption routine shown in FIG. 25 is executed to count down the value CNT3.

If the result of decision in Step S74 is No, that is, if it is concluded that the EGR delay period (period from time t30 to t31 of FIG. 29, corresponding to the initial value XN3), is not over, the valve opening Legr of the EGR valve 45 is set at the preceding value, that is, the value Legr' for the first-term lean mode control carried out immediately before the discrimination of the transition to the S-F/B mode. This value Legr' is stored and updated every time Step S80 of FIG. 22 mentioned before is executed. If the result of decision in Step S74 is Yes, that is, if it is concluded that the period corresponding to the initial value XN3 is over (on and after time t31 of FIG. 29), the valve opening Legr is set at a value calculated for the S-F/B mode, and the valve opening of the EGR valve 45 is controlled in accordance with the set valve opening Legr.

Figure 29:
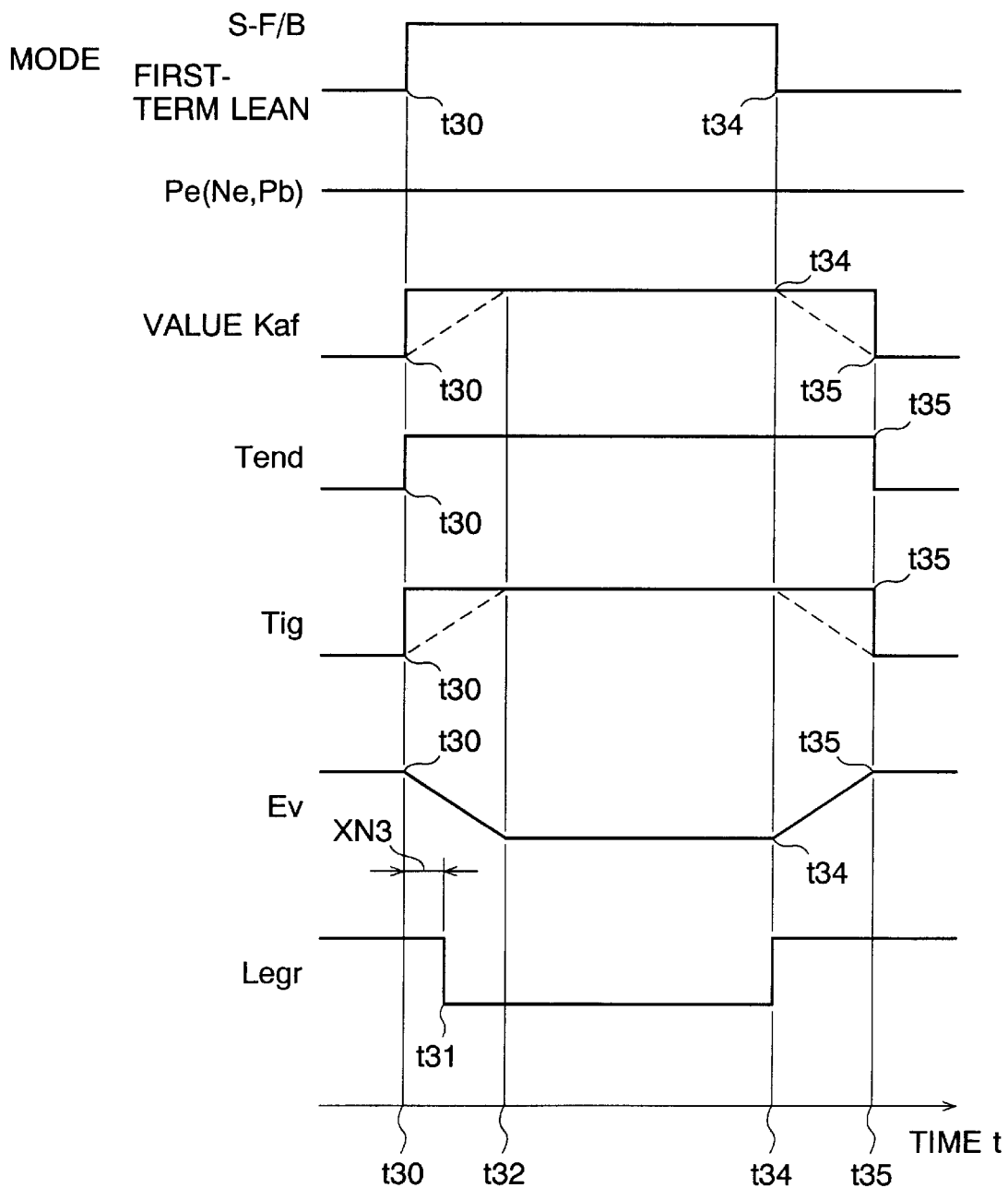
FIG. 29 is a timing chart showing changes of the various control variables and combustion parameter values with time during control for the mode transition between the first-term lean mode and the S-F/B mode.

The transition from the first-term lean mode to the S-F/B mode is a transition in the same first-term injection mode, so that the same map is used for the calculation of the target average effective pressure Pe (see FIG. 29). Since the driver is supposed to make a request for the increase of the output by stepping on the accelerator pedal, moreover, the target air-fuel ratio correction factor value Kaf, fuel injection end period Tend, and ignition timing Tig are immediately changed over to their respective values calculated for the S-F/B mode at time t30 when the mode transition request is discriminated (see FIG. 29).

After the various combustion parameter values are calculated in this manner, the program advances to Step S48 of FIG. 18 mentioned before, whereupon the control in the first-term injection mode is executed.

Finally, the control for the transition from the S-F/B mode to the first-term lean mode will be described. When a request for the mode transition is made, in this case, the ECU 70 sets the tailing coefficient value KS at 0 according to control rules shown in FIG. 26 by executing Step S6 of FIG. 14. After the first-term mode is discriminated in Step S10 of FIG. 15, moreover, the various combustion parameter values and the like are computed in Step S14, whereupon the program advances to Step S50 of FIG. 19. In Step S50, it is determined whether or not the tailing coefficient K2 is at 1.0. Since the present loop is a loop immediately after the discrimination of the request for the transition from the S-F/B mode to the first-term lean mode, the tailing coefficient K2 ought to be at 1.0, so that the result of decision in Step S50 is Yes, whereupon the program advances to Step S58. In this Step S58, the request for the control in the first-term lean mode is discriminated, and Step S80 of FIG. 22 is executed. In Step S80, as mentioned before, the initial values of the control variables for the transition are set, and the various values, including the correction factor value Kaf, combustion parameter values Tig, Tend, and EV, target average effective pressure Pe, etc., calculated in the present control mode, are previously stored, as preparations for the transition to the second-term lean mode control or to the S-F/B mode control.

When the setup of the initial values of the control variables and the like in Step S80 is completed, the program advances to Step S82, whereupon it is determined whether or not the tailing coefficient value KS used in the control for the transition from the S-F/B mode to the first-term lean mode is at 1.0. The present loop is a loop immediately after the discrimination of the request for the transition to the first-term lean mode, and the tailing coefficient value KS is just set at 0, so that the result of decision in Step S82 is No. In the case where the result of decision in Step S82 is No, the ECU 70 repeatedly executes Steps S84 and S86. In Step S84, the ECU 70 computes the volumetric efficiency Ev according to the following equation (F12):

$$Ev=(1-KS)\cdot Ev'+KS\cdot Ev. \tag{F12}$$

In the above equation (F12), which resembles the aforesaid equations (F11) and (F4), Ev' is the volumetric efficiency calculated last in the S-F/B mode and stored as the value Ev' when Step S70 of FIG. 21 mentioned before is executed last. The final term Ev in the right side of the above equation is a value that is calculated in the present first-term lean mode process.

Thus, when the coefficient value KS increases, the volumetric efficiency value Ev is set at a value weighed corresponding to the value KS. When the coefficient value KS attains 1.0, the value Ev is set at the value calculated for the first-term lean mode process. As the tailing coefficient value KS changes in this manner, the volumetric efficiency Ev for the mode transition gradually linearly changes its value during the period between times t34 and t35 of FIG. 29 in which the tailing coefficient value KS varies from 0 to 1.0, and is kept at the value calculated for the S-F/B mode on and after time t32.

Then, in Step S86, the target air-fuel ratio correction factor value Kaf, ignition timing Tig, and injection end period Tend are set at the values Kaf', Tig', and Tend', respectively, calculated last in the S-F/B mode process, and those values are maintained until the tailing coefficient value KS becomes 1.0 (between times t34 and t35 of FIG. 29).

Kaf=Kaf',

Tig=Tig',

Tend=Tend'.

During this transition from the S-F/B mode to the first-term lean mode, the engine control is continued in the S-F/B mode as the tailing coefficient value KS is changed from 0 into 1.0. When the tailing coefficient value KS becomes 1.0, the target air-fuel ratio correction factor value Kaf, ignition timing Tig, and injection end period Tend are changed over to the values for the first-term lean mode, whereupon the transition to the first-term lean mode control is completed. In the control for the transition from the S-F/B mode to the first-term lean mode, these combustion parameters may be gradually changed in accordance with the tailing coefficient value in order to prevent a changeover shock. If they are gradually changed, however, the exhaust gas characteristics (NOx delivery in particular) may possibly be lowered during changeover. In this embodiment, therefore, the changeover shock is prevented by gradually changing the volumetric efficiency Ev. When the volumetric efficiency Ev reaches a value suited for the first-term lean mode (or when the tailing coefficient value KS reaches 1.0), the target air-fuel ratio correction factor value Kaf, ignition timing Tig, and injection end period Tend are changed at a stroke from the values suitable for the S-F/B mode into the values suited for the first-term lean mode. whereby production of NOx and the like can be minimized.

In the control for the transition from the S-F/B mode to the first-term lean mode, moreover, the valve opening Legr of the EGR valve 45 is set at the value calculated for the first-term lean mode the moment the mode transition request is discriminated (see time t34 of FIG. 29). In the S-F/B mode control operation for controlling the air-fuel ratio close to the theoretical air-fuel ratio, the delivery of nitrogen oxides NOx is restrained by means of the three-way catalyst 42 shown in FIG. 1. In the case where lean combustion is effected with a lean air-fuel ratio (e.g., air-fuel ratio of 22) leaner than the theoretical air-fuel ratio, plenty of exhaust gas should preferably be introduced into the engine 1 in an early stage, so that the valve opening Legr of the EGR valve 45 is modified the moment the mode transition request is discriminated.

When the setup of the various combustion parameter values and the like is completed in this manner, the ECU 70 advances to Step S48 of FIG. 18, whereupon it executes the engine control in the first-term injection mode.

In the embodiment described above, as is evident from the comparison between the timing charts shown in FIGS. 27 to 29, the dead period (period corresponding to XN2) is provided so that the second-term lean mode is changed over to the first-term injection mode after the response delay in the suction pipe pressure Pb is canceled, in changing the map for calculating the target average effective pressure Pe. In the case of the transition from the first-term injection mode (S-F/B mode or first-term lean mode) to the second-term lean mode, however, the changeover is made immediately when the mode transition is discriminated. During the second-term lean mode control, the EGR valve 45 and the ABV 27 are opened to allow plenty of exhaust gas and bypass air to be supplied to the engine 1, and the overall air-fuel ratio is set at a very large value (e.g., 30 to 35). Since the output of the engine 1 is controlled by adjusting the fuel injection quantity irrespective of the EGR quantity or the suction air quantity, the driver's operational intention can be reflected in the control without delay by detecting the valve opening θth of the throttle valve 28, which is different from the parameters, such as the suction pipe pressure Pb, that are subject to delay in detection.

The following is an enumeration of the functions and advantages of the control apparatus according to the present embodiment.

(1) A changeover shock is effectively prevented by changing at least one of the parameters that influence the combustion state in the combustion chamber, from a value suitable for a mode before change into a value suitable for a mode after change at a timing corresponding to the modes before and after change, in accordance with the engine operation state.

(2) Fuel injection in a first mode (first-term mode) is carried out to secure operation performance that requires an engine output as high as the one for accelerative operation or medium- or high-load operation, while fuel injection in a second mode (second-term mode) is effected to improve the exhaust gas characteristics and fuel-efficiency for low-load operation.

(3) After the passage of a predetermined period from the point of time when a request for mode change is made, the parameter values are changed to prevent a changeover shock accurately.

(4) While a specific parameter value for the mode change is gradually changed from the value suitable for the mode before change into the value suitable for the mode after change at a predetermined changing rate in accordance with a tentative correction factor value in a predetermined period, other parameter values are also changed in accordance with this tentative correction factor value. By doing this, the changeover timings for the other parameter values can be made to correspond to the change of the specific parameter value, so that accurate control free from a changeover shock can be effected with ease.

(5) Accurate changeover control is carried out by changing the tentative correction factor value from a first predetermined value into a second predetermined value while delaying the setup of the tentative correction factor value for a period suited for the prevention of a changeover shock after the mode change request. Elaborate changeover control is carried out by setting the required period for the change of the first predetermined value over to the second value in accordance with the modes before and after change.

(6) The fuel injection quantity, which most influences the combustion state in the combustion chamber, is selected as the specific parameter, and the fuel injection quantity is changed at a timing that depends on the tentative correction factor value, whereby a changeover shock is prevented.

Before the tentative correction factor value reaches a reference value (e.g., rich misfire limit value) during the change of the second mode over to a first sub-mode, for example, the fuel injection quantity is gradually changed from a value suitable for the second mode toward a value (value substantially corresponding to the theoretical air-fuel ratio) suitable for the first sub-mode. When the tentative correction factor value reaches the reference value, the fuel injection quantity is immediately changed into the value suitable for the first sub-mode. When the tentative correction factor value reaches the rich misfire limit value, a misfire may be caused if the engine is controlled in the second mode, so that the control mode is changed into the first sub-mode.

When the first sub-mode is changed over to the second mode, in contrast, the fuel injection quantity is kept at the value suitable for the first sub-mode until the tentative correction factor value reaches the reference value. When the tentative correction factor value reaches the reference value, the fuel injection quantity is changed into a value intermediate between the values suitable for the first sub-mode and the second mode and corresponding to the tentative correction factor value. Thereafter, the fuel injection quantity is gradually changed from the intermediate value toward the value suitable for the second mode after change in accordance with the tentative correction factor value.

(7) Alternatively, a changeover shock is prevented by changing the fuel injection quantity and the other parameter values at timings that are linked on the basis of the tentative correction factor value.

When the tentative correction factor value reaches a predetermined value during the mode change between the first and second modes, for example, the fuel injection end timing is changed from a value suitable for the mode before change into a value suitable for the mode after change. Also, the fuel injection end timing is changed at a timing that is made to correspond to the fuel injection quantity by means of the tentative correction factor value.

The ignition timing is kept at a value suitable for the second mode before the tentative correction factor value reaches the reference value during the change of the second mode over to the first mode. When the tentative correction factor value reaches the reference value, the ignition timing is changed into a value intermediate between the value suitable for the second mode and a value suitable for the first mode and corresponding to the tentative correction factor value. Thereafter, the ignition timing is gradually changed from the intermediate value toward the value suitable for the first mode.

During the change of the first mode over to the second mode, in contrast, the ignition timing is gradually changed from the value suitable for the first mode toward the value suitable for the second mode in accordance with the tentative correction factor value before the tentative correction factor value reaches the reference value, and is changed into the value suitable for the second mode when the tentative correction factor value reaches the reference value.

(8) During the control in the second mode, the ignition timing is always set at its optimum value, so that combustion can be effected in an extremely lean air-fuel ratio state, and the engine output is inevitably lowered if the ignition timing is subject to an advance or retard. In other words, the engine output cannot be adjusted by regulating the ignition timing during the second-mode control. In the case of the first-mode control, on the other hand, the engine output can be adjusted by regulating the ignition timing.

In the first mode, therefore, the engine output is increased by setting the air-fuel ratio at a value on the fuel-rich side of a set value for the second mode, while the engine output is adjusted by effecting a retard control of the ignition timing. For example, the correction retard value is set at a maximum retard value when the tentative correction factor value reaches the reference value during the change of the second mode (operation state in which the air-fuel ratio is extremely lean) over to the second mode (state in which operation is made at substantially the theoretical air-fuel ratio), and thereafter, it is gradually reduced from the maximum retard value toward 0 in accordance with the tentative correction factor value. A changeover shock is prevented by further correcting the ignition timing on the basis of the correction retard value.

During the change of the first sub-mode over to the second mode, the correction retard value is gradually increased from 0 in accordance with the tentative correction factor value, set at the maximum retard value when the tentative correction factor value reaches the reference value, and thereafter, set at 0. The ignition timing is further corrected by means of the correction retard value, and the engine output for the first sub-mode is gradually restricted by the retard control of the ignition timing, whereupon the mode is smoothly changed into the second mode.

(9) In the case where the fuel injection quantity is set in accordance with an effective suction parameter value, the effective suction parameter value is gradually changed from a value suitable for the mode before change toward a value suitable for the mode after change in accordance with the tentative correction factor value during the mode change between the first and second modes. By doing this, the effective suction parameter value is made to correspond to the fuel injection quantity set in accordance with the tentative correction factor value, and the combustion state in the combustion chamber is smoothly changed to prevent a changeover shock.

(10) In order to change the exhaust gas recirculation quantity to alter the combustion state, the EGR valve opening is changed. However, the change in the exhaust gas recirculation quantity involves a delay in response to the EGR valve change. In changing the mode, therefore, the exhaust gas quantity is immediately changed from a value suitable for the mode before change into a value suitable for the mode after change at the time when the mode change is requested, whereby the aforesaid response delay is minimized.

In the case of the change of the first sub-mode over to a second sub-mode, for example, the exhaust gas recirculation quantity is changed into a value suitable for the second sub-mode at the time when the request is made for the change, in order to improve the exhaust gas characteristics (NOx in particular).

In changing the mode from the first sub-mode (engine operation substantially in the theoretical air-fuel ratio state) into the second mode in which plenty of exhaust gas is recirculated for the purpose of improving the exhaust gas characteristics, however, the exhaust gas quantity is changed into a value suitable for the second mode after the passage of a predetermined period since the point of time of the mode change, in order to prevent excessive exhaust gas recirculation during the mode transition, and hence, a changeover shock.

(11) In the case of the change of the first sub-mode over to the second sub-mode (engine operation with an air-fuel ratio on the fuel-lean side of the theoretical air-fuel ratio), it is advisable to gradually to change the parameter values in order to prevent a changeover shock. To avoid a bad influence upon the exhaust gas characteristics, however, it might be better to change the parameter values at a stroke when there is no possibility of a changeover shock, in some cases.

In changing the first sub-mode over to the second sub-mode, therefore, the fuel injection quantity is kept at the value suitable for the first sub-mode (or value corresponding substantially to the theoretical air-fuel ratio) before the tentative correction factor value reaches the second predetermined value, and is changed into a value suitable for the second sub-mode (or value corresponding to the lean air-fuel ratio) when there is no possibility of a changeover shock. In the case where the fuel injection quantity is set in accordance with the effective suction parameter value, for example, the effective suction parameter value is gradually changed from the value suitable for the mode before change toward the value suitable for the mode after change in accordance with the tentative correction factor value during the mode change between the first and second sub-modes, and the fuel injection quantity is changed from the value suitable for the first sub-mode into the value suitable for the second sub-mode when the tentative correction factor value reaches the second predetermined value.

(12) In the case where the parameter values include the fuel injection end timing or ignition timing, the value of the fuel injection end timing or ignition timing is kept at a value suitable for the first sub-mode before the tentative correction factor value reaches the second predetermined value, and is changed into a value suitable for the second sub-mode when the tentative correction factor value reaches the second predetermined value, during the change of the first sub-mode over to the second sub-mode.

In the case where the parameter values include the exhaust gas recirculation quantity, moreover, the exhaust gas recirculation quantity is changed into the value suitable for the second sub-mode when the request is made for the change of the first sub-mode over to the second sub-mode. Since the response delay is caused before the exhaust gas recirculation quantity reaches the value suitable for the second sub-mode, the recirculation of the exhaust gas is carried out at the same time with the mode change, in order to improve the exhaust gas characteristics (NOx in particular).

(13) When the driver makes the request for the change from the second sub-mode over to the first sub-mode, he often intends to accelerate the vehicle, and expects a rapid increase of the engine output. Accordingly, the fuel injection quantity is changed into the value suitable for the first sub-mode when the request is made for the change of the second sub-mode over to the first sub-mode. In the case where the parameter values include the fuel injection end timing or ignition timing, each parameter value is changed into the value suitable for the first sub-mode when the request is made for the change from the second sub-mode over to the first sub-mode. In the case where the parameter values include the exhaust gas recirculation quantity, on the other hand, the exhaust gas recirculation quantity is changed into the value suitable for the first sub-mode after the passage of a predetermined period since the point of time when the request is made for the change of the second sub-mode over to the first sub-mode, whereby the control for the mode transition is stabilized.

(14) When the accelerating state of the engine is detected, the control mode is changed compulsorily into the first mode to improve the response during the accelerative operation. When the termination of the engine accelerating state is detected, the first mode is changed over to a required mode to improve the exhaust gas characteristics and the fuel-efficiency.

We claim:

1. A control apparatus for a cylinder-injection spark-ignition internal combustion engine, in which a fuel is injected directly into a combustion chamber of the internal combustion engine, comprising:

operation state detecting means for detecting an operation state of the internal combustion engine;

injection mode setting means for setting one of a first injection mode for injecting the fuel mainly in a suction stroke and a second injection mode for injecting the fuel mainly in a compression stroke, in accordance with said detected operation state;

combustion parameter setting means for setting a value of at least one of parameters, that influence a combustion state in the combustion chamber, at a value for an injection mode set by said injection mode setting means;

combustion parameter changeover means for gradually changing the value of at least one of parameters, from a parameter value for an injection mode prior to a mode change towards a parameter value for an injection mode after the mode change, when a request for an injection mode change is set by said injection mode setting means; and combustion state control means for controlling the combustion state of the internal combustion engine in accordance with the parameter value set by said combustion parameter setting means and changed by said combustion parameter changeover means in response to the injection mode change request.

2. A control apparatus for a cylinder-injection spark-ignition internal combustion engine according to claim 1, wherein said combustion parameter setting means, said combustion parameter changeover means, and said combustion state control means establish a first air-fuel ratio state in the internal combustion engine when the first injection mode is set by said injection mode setting means, and said parameter setting means, said combustion parameter changeover means, and said combustion state control means establish a second air-fuel ratio state, which is more fuel-lean than the first air-fuel ratio state, in the internal combustion engine when the second injection mode is set by said injection mode setting means.

3. A control apparatus for a cylinder-injection spark-ignition internal combustion engine according to claim 2, wherein the first injection mode includes a first sub-injection mode, and said combustion parameter setting means, said combustion parameter changeover means, and said combustion state control means establish a theoretical air-fuel ratio state as the first air-fuel ratio state in the internal combustion engine when the first sub-injection mode is set by said injection mode setting means.

4. A control apparatus for a cylinder-injection spark-ignition internal combustion engine according to claim 3, wherein the first injection mode includes a second sub-injection mode, and said combustion parameter setting means, said combustion parameter changeover means, and said combustion state control means establish an air-fuel ratio state, as the first air-fuel ratio state, more fuel-lean than the theoretical air-fuel ratio state and more fuel-rich than the second air-fuel ratio state in the internal combustion engine when the second sub-injection mode is set.

5. A control apparatus for a cylinder-injection spark-ignition internal combustion engine according to claim 1, wherein said combustion parameter changeover means changes the parameter value from the parameter value before the mode change into the parameter value after the mode change at a timing corresponding to the injection mode before change and the injection mode after change when the injection mode change request is discriminated.

6. A control apparatus for a cylinder-injection spark-ignition internal combustion engine according to claim 5, wherein said combustion parameter changeover means maintains the parameter value at the parameter value before mode change for a predetermined period when the injection mode change request is discriminated.

7. A control apparatus for a cylinder-injection spark-ignition internal combustion engine according to claim 6, wherein said combustion parameter changeover means immediately changes the parameter value from the parameter value prior to the mode change into the parameter value after the mode change when the predetermined period is over.

8. A control apparatus for a cylinder-injection spark-ignition internal combustion engine according to claim 6, wherein said combustion parameter changeover means immediately changes the parameter value from the parameter value prior to the mode change to an intermediate parameter value between the parameter value prior to the mode change and the parameter value after the mode change, and then gradually changes the parameter value from the intermediate parameter value toward the parameter value after the mode change when the predetermined period is over.

9. A control apparatus for a cylinder-injection spark-ignition internal combustion engine according to claim 6, wherein said combustion parameter changeover means gradually changes the parameter value from the parameter value prior to the mode change toward the parameter value after the mode change when the predetermined period is over.

10. A control apparatus for a cylinder-injection spark-ignition internal combustion engine according to claim 9, wherein said combustion parameter changeover means gradually changes the parameter value from the parameter value prior to the mode change toward an intermediate parameter value between the parameter value prior to the mode change and the parameter value after the mode change, and then immediately changes the parameter value from the intermediate parameter value into the parameter value after the mode change when the predetermined period is over.

11. A control apparatus for a cylinder-injection spark-ignition internal combustion engine according to claim 5, wherein said combustion parameter changeover means immediately changes the parameter value from the parameter value prior to the mode change toward the parameter value after the mode change when the injection mode change request is discriminated.

12. A control apparatus for a cylinder-injection spark-ignition internal combustion engine according to claim 5, wherein said combustion parameter changeover means gradually changes the parameter value from the parameter value prior to the mode change toward an intermediate parameter value between the parameter value before the mode change and the parameter value after the mode change, and then immediately changes the parameter value from the intermediate parameter value into the parameter value after the mode change when the injection mode change request is discriminated.

13. A control apparatus for a cylinder-injection spark-ignition internal combustion engine according to claim 5, wherein said combustion parameter changeover means immediately changes the parameter value from the parameter value prior to the mode change towards the parameter value after the mode change when the injection mode change request is discriminated.

14. A control apparatus for a cylinder-injection spark-ignition internal combustion engine according to claim 1, wherein said control apparatus includes
mode change discriminating means for discriminating the injection mode change request and a kind of the injection mode change in accordance with the changeover in the injection mode set by said injection mode setting means, and discrimination flag setting means for setting a mode change discrimination flag indicative of a result of discrimination by said mode change discriminating means, wherein said combustion parameter changeover means changes the parameter value prior to the mode change over to the parameter value after the mode change at a timing corresponding to the kind of the injection mode change indicated by the change discrimination flag set by said discrimination flag setting means.

15. A control apparatus for a cylinder-injection spark-ignition internal combustion engine according to claim 14, wherein said combustion parameter changeover means includes first correction factor setting means for setting a first correction factor associated with the changeover in the parameter value wherein the first correction factor is set at a first set value at a time of start of the injection mode change when the injection mode change request is discriminated by said mode change discriminating means, and changed thereafter to a second set value at a time of completion of the injection mode change.

16. A control apparatus for a cylinder-injection spark-ignition internal combustion engine according to claim 15, wherein said combustion parameter changeover means immediately changes the parameter value from the parameter value prior to the mode change towards the parameter value after the mode change when the first correction factor is changed from the first set value into the second set value.

17. A control apparatus for a cylinder-injection spark-ignition internal combustion engine according to claim 15, wherein said combustion parameter changeover means gradually changes a value of a specific parameter, among other parameters that influence the combustion state, from a specific parameter value for the injection mode the mode before change toward a specific parameter value for the injection mode after the mode change at a predetermined changing rate when the first correction factor is changed from the first set value into the second set value.

18. A control apparatus for a cylinder-injection spark-ignition internal combustion engine according to claim 15, wherein said combustion parameter changeover means includes parameter comparing and discriminating means for comparing a value of a specific parameter, among other parameters that influence the combustion state, with a preset reference value, and changes the parameter value from the parameter value prior to the mode change into the parameter value after the mode change in accordance with a result of discrimination by said parameter comparing and discriminating means.

19. A control apparatus for a cylinder-injection spark-ignition internal combustion engine according to claim 18, wherein said combustion parameter changeover means maintains the parameter value at the parameter value before mode change when it is concluded by said parameter comparing and discriminating means that the value of the specific parameter is not greater than the reference value, and immediately changes the parameter value from the parameter value prior to the mode change towards the parameter value after the mode change when it is concluded by said parameter comparing and discriminating means that the value of the specific parameter is greater than the reference value.

20. A control apparatus for a cylinder-injection spark-ignition internal combustion engine according to claim 18, wherein said combustion parameter changeover means maintains the parameter value at the parameter value prior to the mode change when it is concluded by said parameter comparing and discriminating means that the value of the specific parameter is not greater than the reference value, and immediately changes the parameter value from the parameter value prior to mode change into an intermediate value between the parameter value prior to the mode change and the parameter value after the mode change and then gradually changes the parameter value from the intermediate parameter value toward the parameter value after the mode change when it is concluded by said parameter comparing and discriminating means that the value of the specific parameter is greater than the reference value.

21. A control apparatus for a cylinder-injection spark-ignition internal combustion engine according to claim 18, wherein said combustion parameter changeover means gradually changes the parameter value from the parameter value prior to the mode change into the parameter value after the mode change at a predetermined changing rate as the first correction factor changes when it is concluded by said parameter comparing and discriminating means that the value of the specific parameter does not reach the reference value while the first correction factor changes from the first set value into the second set value, and immediately changes the parameter value from an intermediate value, varying between the parameter value prior to the mode change and the parameter value after the mode change, into the parameter value after the mode change when it is concluded by said parameter comparing and discriminating means that the value of the specific parameter reaches the reference value.

22. A control apparatus for a cylinder-injection spark-ignition internal combustion engine according to claim 18, wherein said combustion parameter changeover means includes second correction factor setting means for setting a second correction factor represented as a function of the first correction factor, and sets the second correction factor at a third set value at a time of start of the injection mode change after the discrimination of the injection mode change request while gradually changing the value of the specific parameter from a specific parameter value for the injection mode prior to the mode change toward a specific parameter value for the injection mode after the mode change at a predetermined changing rate when the injection mode change request is discriminated by said mode change discriminating means, and then changes the second correction factor from the third set value into a fourth set value at a time of completion of the injection mode change.

23. A control apparatus for a cylinder-injection spark-ignition internal combustion engine according to claim 18, wherein the specific parameter includes at least a target air-fuel ratio correction factor; and wherein said combustion parameter changeover means includes tentative target air-fuel ratio correction factor setting means for setting a value of a tentative target air-fuel ratio correction factor used to obtain the target air-fuel ratio correction factor, and changes the value of the target air-fuel ratio correction factor from a correction factor value for the injection mode prior to the change into a correction factor value for the injection mode after the mode change in accordance with the result of comparison between the value of the tentative target air-fuel ratio correction factor and the reference value by said parameter comparing and discriminating means.

24. A control apparatus for a cylinder-injection spark-ignition internal combustion engine according to claim 23, wherein said combustion parameter changeover means replaces the value of the target air-fuel ratio correction factor with the value of the tentative target air-fuel ratio correction factor when it is concluded by said parameter comparing and discriminating means that the value of the tentative air-fuel ratio correction factor is not greater than the reference value while the value of the tentative target air-fuel ratio correction factor is gradually changed from a second air-fuel ratio correction factor value for the second injection mode toward a first air-fuel ratio correction factor value for the first injection mode as the first correction factor changes, in a case where a first mode change state flag indicative of a request for the injection mode change from the second injection mode into the first injection mode discriminated by said mode change discriminating means is set by said discrimination flag setting means, and immediately changes the value of the target air-fuel ratio correction factor from an intermediate air-fuel ratio correction factor value between the second and first air-fuel ratio correction factor values into the first air-fuel ratio correction factor value when it is concluded that the tentative air-fuel ratio correction factor exceeds the reference value.

25. A control apparatus for a cylinder-injection spark-ignition internal combustion engine according to claim 24, wherein the parameters include a fuel injection end timing and an ignition timing;

wherein said combustion parameter changeover means maintains the respective values of the fuel injection end timing and ignition timing at a second injection end timing value and a second ignition timing value, respectively, suitable for the second injection mode when it is concluded by said parameter comparing and discriminating means that the value of the tentative air-fuel ratio correction factor is not greater than the reference value; and wherein said combustion parameter changeover means immediately changes the fuel injection end timing from the second fuel injection end timing value into a first fuel injection end timing value for the first injection mode, and immediately changes the value of the ignition timing into an intermediate ignition timing value between the second ignition timing value and a first ignition timing value for the first injection mode and further gradually changes the ignition timing value from the intermediate ignition timing value toward the first ignition timing value as the first correction factor changes when it is concluded that the tentative air-fuel ratio correction factor exceeds the reference value.

26. A control apparatus for a cylinder-injection spark-ignition internal combustion engine according to claim 23, wherein said combustion parameter changeover means maintains the target air-fuel ratio correction factor at a first air-fuel ratio correction factor value for the first injection mode when it is concluded by said parameter comparing and discriminating means that the tentative air-fuel ratio correction factor exceeds the reference value while the value of the tentative air-fuel ratio correction factor is gradually changed from the intermediate air-fuel ratio correction factor value toward a second air-fuel ratio correction factor value for the second injection mode as the first correction factor changes, in a case where a second mode change state flag indicative of a request for the injection mode change from the first injection mode into the second injection mode discriminated by said mode change discriminating means is set by said discrimination flag setting means, and said combustion parameter changeover means immediately changes the target air-fuel ratio correction factor from the first air-fuel ratio correction factor value into the intermediate air-fuel ratio correction factor value between the first air-fuel ratio value and the second air-fuel ratio correction factor value for the second injection mode and then replaces the value of the target air-fuel ratio correction factor with the tentative target air-fuel ratio correction factor when it is concluded that the value of the tentative air-fuel ratio correction factor is not greater than the reference value.

27. A control apparatus for a cylinder-injection spark-ignition internal combustion engine according to claim 26, wherein the combustion parameters include a fuel injection end timing and an ignition timing;

wherein said combustion parameter changeover means maintains a value of the fuel injection end timing at the first injection end timing value for the first injection mode and gradually changes the ignition timing from the first ignition timing value for the first injection mode toward the second ignition timing value for the second injection mode as the first correction factor changes when it is concluded by said parameter comparing and discriminating means that the tentative air-fuel ratio correction factor exceeds the reference value; and wherein said combustion parameter changeover means immediately changes the fuel injection end timing from the first fuel injection end timing value into the second fuel injection end timing value for the second injection mode and immediately changes the ignition timing from an intermediate ignition timing value between the first ignition timing value and the second ignition timing value into the second ignition timing value when it is concluded that the tentative air-fuel ratio correction factor is not greater than the reference value.

28. A control apparatus for a cylinder-injection spark-ignition internal combustion engine according to claim 1, wherein the parameters that influence the combustion state include at lease one of a target air-fuel ratio correction factor, fuel injection end timing, fuel injection quantity, ignition timing, volumetric efficiency, and a quantity of exhaust gas recirculated in a suction system of the internal combustion engine.

29. A control apparatus for a cylinder-injection spark-ignition internal combustion engine, in which a fuel is injected directly into a combustion chamber of the internal combustion engine, comprising:

operation state detecting means for detecting an operation state of the internal combustion engine;

injection mode setting means for setting one of a first injection mode for injecting the fuel mainly in a suction stroke and a second injection mode for injecting the fuel mainly in a compression stroke, in accordance with said operation state;

combustion parameter setting means for setting a value of at least one of parameters, that influence a combustion state in the combustion chamber, at a value for an injection mode set by said injection mode setting means;

combustion parameter changeover means for changing the value of at least one of parameters, from a parameter value for an injection mode before a mode change to a parameter value for an injection mode after the mode change, when a request for an injection mode change is set by said injection mode setting means; and combustion state control means for controlling the combustion of the internal combustion engine in accordance with the parameter value set by said combustion parameter setting means and changed by said combustion parameter changeover means in response to the injection mode change request, wherein said combustion parameter changeover means changes the parameter value from the parameter value before mode change into the parameter value after mode change at a timing corresponding to the injection mode before change and the injection mode after change when the injection mode change request is discriminated.

* * * * *